(12) United States Patent
Miyama et al.

(10) Patent No.: US 9,678,913 B2
(45) Date of Patent: Jun. 13, 2017

(54) CONTROL APPARATUS, ELECTRONIC DEVICE, AND CONTROL METHOD

(71) Applicant: FUJITSU LIMITED, Kawasaki-shi, Kanagawa (JP)

(72) Inventors: Kenichi Miyama, Ashikaga (JP); Masato Hori, Oyama (JP)

(73) Assignee: Fujitsu Limited, Kawasaki (JP)

( * ) Notice: Subject to any disclaimer, the term of this patent is extended or adjusted under 35 U.S.C. 154(b) by 58 days.

(21) Appl. No.: 14/886,209

(22) Filed: Oct. 19, 2015

(65) Prior Publication Data

US 2016/0150428 A1    May 26, 2016

(30) Foreign Application Priority Data

Nov. 20, 2014 (JP) ................................ 2014-235896
Jul. 9, 2015 (JP) ................................ 2015-137580

(51) Int. Cl.
| | |
|---|---|
| G06F 13/40 | (2006.01) |
| H04W 24/08 | (2009.01) |
| H04W 72/08 | (2009.01) |

(52) U.S. Cl.
CPC ......... *G06F 13/4068* (2013.01); *H04W 24/08* (2013.01); *H04W 72/085* (2013.01)

(58) Field of Classification Search
CPC .. G06F 13/4068; H04W 24/08; H04W 72/085
See application file for complete search history.

(56) References Cited

U.S. PATENT DOCUMENTS

2001/0026519 A1* 10/2001 Lin ..................... G11B 7/08541
                                                         369/53.28
2007/0097985 A1*  5/2007 Lee ....................... H04L 1/0009
                                                         370/395.21

FOREIGN PATENT DOCUMENTS

| JP | 7-162898 | 6/1995 |
| JP | 2006-53968 | 2/2006 |
| JP | 2007-115355 | 5/2007 |

* cited by examiner

*Primary Examiner* — Christopher Grey
(74) *Attorney, Agent, or Firm* — Staas & Halsey LLP

(57) ABSTRACT

A control apparatus that controls one or more first communication apparatuses and one or more second communication apparatuses configured to identify a logic level of a signal, the control apparatus includes a memory; and a processor coupled to the memory and configured to: acquire, from one of the one or more second communication apparatuses, a length of an undefined time period during which a level of the signal is undefined; determine, based on the length of the undefined time period, a length of a protection time period indicating a time period during which a logic level of the signal received by the second communication apparatus is maintained at a same level; and determine, based on the length of the protection time period, a rate of a signal transmitted to one of the one or more second communication apparatuses by one of the one or more first communication apparatuses.

11 Claims, 33 Drawing Sheets

| ITEM | STATE OF CURRENT OPERATION MODE | TRANSITION CONDITION | STATE OF SUBSEQUENT OPERATION MODE |
|---|---|---|---|
| (1) | DURING NO MEASUREMENT | MEASUREMENT START NOTICE IS RECEIVED | DURING MEASUREMENT OF UNDEFINED AREA |
| (2) | DURING MEASUREMENT OF UNDEFINED AREA | MEASUREMENT COMPLETION NOTICE IS RECEIVED | DURING NO MEASUREMENT |

FIG. 24

| TRANSMITTING END CIRCUIT | Tr | Tf |
|---|---|---|
| TRANSMITTING END CIRCUIT #1 | 0.7 [mS] | 0.7 [mS] |
| TRANSMITTING END CIRCUIT #2 | 0.4 [mS] | 0.4 [mS] |
| TRANSMITTING END CIRCUIT #3 | 0.6 [mS] | 0.6 [mS] |
| TRANSMITTING END CIRCUIT #4 | 0.7 [mS] | 0.7 [mS] |
| TRANSMITTING END CIRCUIT #5 | 0.4 [mS] | 0.4 [mS] |
| TRANSMITTING END CIRCUIT #6 | 0.3 [mS] | 0.3 [mS] |
| TRANSMITTING END CIRCUIT #7 | 0.8 [mS] | 0.8 [mS] |
| TRANSMITTING END CIRCUIT #8 | 0.9 [mS] | 0.9 [mS] |
| TRANSMITTING END CIRCUIT #9 | 0.5 [mS] | 0.5 [mS] |
| TRANSMITTING END CIRCUIT #10 | 0.5 [mS] | 0.5 [mS] |

| TRANSMITTING END CIRCUIT | Tr | Tf | TRANSMISSION RATE |
|---|---|---|---|
| TRANSMITTING END CIRCUIT #1 | 0.7 [mS] | 0.7 [mS] | 303.0 [bps] |
| TRANSMITTING END CIRCUIT #2 | 0.4 [mS] | 0.4 [mS] | 476.2 [bps] |
| TRANSMITTING END CIRCUIT #3 | 0.6 [mS] | 0.6 [mS] | 344.8 [bps] |
| TRANSMITTING END CIRCUIT #4 | 0.7 [mS] | 0.7 [mS] | 303.0 [bps] |
| TRANSMITTING END CIRCUIT #5 | 0.4 [mS] | 0.4 [mS] | 476.2 [bps] |
| TRANSMITTING END CIRCUIT #6 | 0.3 [mS] | 0.3 [mS] | 588.2 [bps] |
| TRANSMITTING END CIRCUIT #7 | 0.8 [mS] | 0.8 [mS] | 270.3 [bps] |
| TRANSMITTING END CIRCUIT #8 | 0.9 [mS] | 0.9 [mS] | 243.9 [bps] |
| TRANSMITTING END CIRCUIT #9 | 0.5 [mS] | 0.5 [mS] | 400.0 [bps] |
| TRANSMITTING END CIRCUIT #10 | 0.5 [mS] | 0.5 [mS] | 400.0 [bps] |

CONTROL APPARATUS, ELECTRONIC DEVICE, AND CONTROL METHOD

CROSS-REFERENCE TO RELATED APPLICATION

This application is based upon and claims the benefit of priority of the prior Japanese Patent Application No. 2014-235896, filed on Nov. 20, 2014, and the prior Japanese Patent Application No. 2015-137580, filed on Jul. 9, 2015, the entire contents of which are incorporated herein by reference.

FIELD

The embodiments discussed herein are related to a control apparatus, an electronic device, and a control method.

BACKGROUND

In the past, in a transmission apparatus, plug-in units and a motherboard that controls the relevant plug-in units have been coupled to each other via a shared signal line such as, for example, a bus line, which is used in common by the plug-in units. The shared signal line is branched within the motherboard and is coupled to the plug-in units.

As for a noise generated in such a shared signal line, there has been proposed a method for measuring the number of times a noise greater than or equal to a predetermined level and included in an output of a synchronization separation unit is generated while a generated mask pulse is active (see, for example, Japanese Laid-open Patent Publication No. 7-162898).

There has been proposed an apparatus that suppresses a noise at a track jump position within a measured jitter by generating a mask pulse set to a predetermined duration and triggered by a generated delayed pulse (see, for example, Japanese Laid-open Patent Publication No. 2007-115355).

There has been proposed an apparatus that does not perform binarization in a portion of a signal component, the portion being likely to be buried in a noise component, in a tracking error signal generation circuit related to an optical disk recording medium (see, for example, Japanese Laid-open Patent Publication No. 2006-053968).

In such a configuration as described above, a reflection noise in a shared signal line fluctuates depending on states (the number of connections, or connection points) of mounted plug-in units. As a result, depending on connection states of the mounted plug-in units, the length of an undefined time period during which a level of a signal is unstable and a logic level is not confirmed changes. Therefore, in a transmission apparatus, a worst case of a maximum undefined time period is assumed, and control tailored to the undefined time period in the worst case is performed. Therefore, there is a problem that the transmission rate of a signal transmitted through the shared signal line is uniformly suppressed to a low level regardless of connection states of the plug-in units. From the above, it is desirable to be able to optimize, in conformity with the connection states of the plug-in units, the transmission rate of a signal transmitted through the shared signal line.

SUMMARY

According to an aspect of the invention, a control apparatus that controls one or more first communication apparatuses connectable to communication apparatuses via a shared signal line and one or more second communication apparatuses configured to be coupled to the shared signal line and to identify a logic level of a signal received via the shared signal line, the control apparatus includes a memory; and a processor coupled to the memory and configured to: acquire, from one of the one or more second communication apparatuses, a length of an undefined time period during which a level of the signal is undefined; determine, based on the length of the undefined time period, a length of a protection time period indicating a time period during which a logic level of the signal received by the second communication apparatus is maintained at a same level; and determine, based on the length of the protection time period, a rate of a signal transmitted to one of the one or more second communication apparatuses by one of the one or more first communication apparatuses.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 24 is a diagram illustrating examples of measurement results of undefined time periods for each of transmitting end circuits according to the fifth embodiment;

FIG. 25 is a diagram illustrating an example of a calculation result of a transmission rate for each of the transmitting end circuits according to the fifth embodiment;

DESCRIPTION OF EMBODIMENTS

Hereinafter, first to fifth preferred embodiments of the disclosed technology will be described in detail with reference to drawings.

First Embodiment

Figure 1:
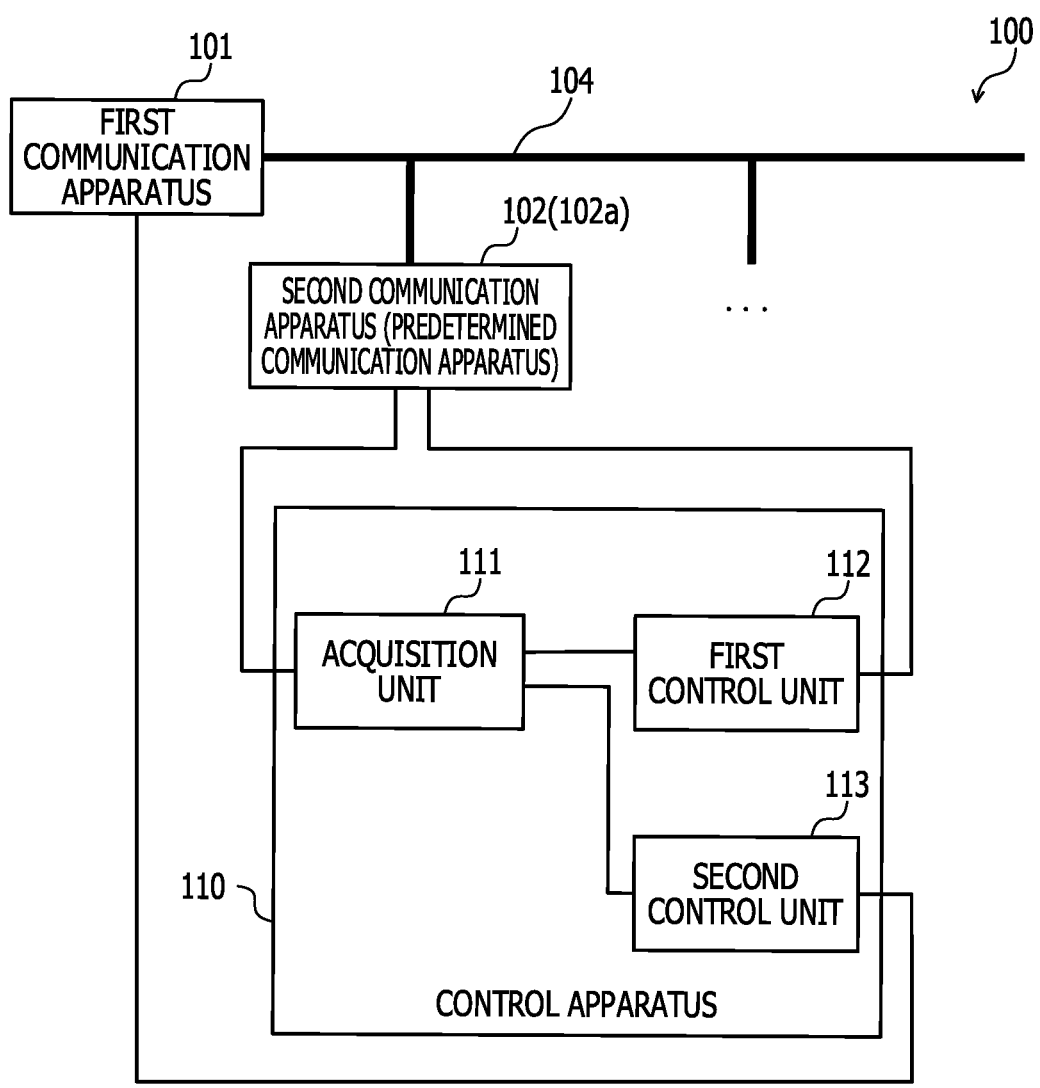
FIG. 1 is a diagram illustrating an example of a configuration of a transmission apparatus according to a first embodiment.

FIG. 1 is a diagram illustrating an example of a configuration of a transmission apparatus according to the first embodiment. A transmission apparatus 100 is an electronic device including a first communication apparatus 101, second communication apparatuses 102, and a control apparatus 110.

Communication apparatuses are connectable to the first communication apparatus 101 via a common signal line 104. The common signal line 104 is a signal line in which a reflection noise is generated in a boundary surface with the first communication apparatus 101 or each of the second communication apparatuses 102. The common signal line 104 is a signal line in, for example, a bus connection. The first communication apparatus 101 is, for example, a motherboard. In the example illustrated in FIG. 1, the second communication apparatuses 102 are coupled to the first communication apparatus 101. The first communication apparatus 101 transmits a signal to each of the second communication apparatuses 102.

Each of the second communication apparatuses 102 is, for example, a plug-in unit coupled to the first communication apparatus 101 via the common signal line 104. By performing level determination on a signal received from the first communication apparatus 101, the second communication apparatuses 102 each demodulate the signal from the first communication apparatus 101. The level determination is, for example, determination of whether the level of the signal is a high (H) level or a low (L) level.

Here, in the common signal line 104, a reflection noise is generated in a boundary surface with the first communication apparatus 101 or each of the second communication apparatuses 102 whose characteristic impedance is different. In a case where the reflection noise is generated, when a change in a level of a signal transmitted by the first communication apparatus 101, such as rise-up, fall-down, or the like thereof, occurs, the signal is disturbed, and an undefined time period, during which the level of the signal is undefined in each of the second communication apparatuses 102, occurs.

The undefined time period during which the level of the signal is undefined is, for example, a time period during which a signal received by each of the second communication apparatuses 102 does not become a certain level even though the first communication apparatus 101 transmits a signal of a certain level. For example, by plugging a communication apparatus into or out of the first communication apparatus 101, the number or arrangement of communication apparatuses coupled to the first communication apparatus 101 changes, thereby causing a state of a bus connection to change. If the state of the bus connection changes, a reflection noise in the common signal line 104 changes. From this, the undefined time period in each of the second communication apparatuses 102 changes.

In response to this, at the time of a change in the level of the signal received from the first communication apparatus 101 by each of the second communication apparatuses 102, the relevant second communication apparatus 102 sets a time period during which the relevant second communication apparatus 102 keeps a certain result of the level determination. In what follows, a time period during which each of the second communication apparatuses 102 keeps a certain result of the level determination is called a "protection time period". In the protection time period, regardless of the level of the signal received from the first communication apparatus 101, each of the second communication apparatuses 102 outputs, for example, a determination result indicating a certain level, as a determination result of the level of the signal received from the first communication apparatus 101.

The control apparatus 110 is a control apparatus that controls the first communication apparatus 101 and the second communication apparatuses 102. The control apparatus 110 is provided in, for example, one of the first communication apparatus 101 and the second communication apparatuses 102. Alternatively, the control apparatus 110 may be an apparatus different from the first communication apparatus 101 and the second communication apparatuses 102. In the example illustrated in FIG. 1, the control apparatus 110 is an apparatus different from the first communication apparatus 101 and the second communication apparatuses 102.

The control apparatus 110 includes an acquisition unit 111, a first control unit 112, and a second control unit 113. The acquisition unit 111 acquires, via the common signal line 104, a measurement result of the length of an undefined time period in a predetermined communication apparatus 102a out of communication apparatuses coupled to the first communication apparatus 101. In the example illustrated in FIG. 1, the predetermined communication apparatus 102a is one of the second communication apparatuses 102. In this regard, however, the predetermined communication apparatus 102a may be a communication apparatus different from the second communication apparatuses 102.

In a case where the control apparatus 110 is, for example, a communication apparatus different from the predetermined communication apparatus 102a, the acquisition unit 111 acquires a measurement result by receiving, from the predetermined communication apparatus 102a, the measurement result obtained in the predetermined communication apparatus 102a. The measurement result may be received using the common signal line 104 or may be received using a signal line different from the common signal line 104. In a case where the control apparatus 110 is provided in the predetermined communication apparatus 102a, the acquisition unit 111 acquires the measurement result from the predetermined communication apparatus 102a serving as the apparatus itself.

The acquisition unit 111 acquires, for example, a measurement result of the length of the undefined time period due to switching of the level of a signal transmitted by the first communication apparatus 101 while defining the predetermined communication apparatus 102a as a destination. The acquisition unit 111 may acquire a measurement result of the length of the undefined time period in the predetermined communication apparatus 102a, due to switching of the level of a signal transmitted by the first communication apparatus 101 while defining, as a destination, another communication apparatus coupled to the first communication apparatus 101 via the common signal line 104. The above-mentioned signal transmitted by the first communication apparatus 101 may be, for example, a data signal or may be a signal for measurement.

Based on the measurement result acquired by the acquisition unit 111, the first control unit 112 controls the length of the protection time period of each of the second communication apparatuses 102. The first control unit 112 decreases the length of the protection time period with a decrease in, for example, the length of the undefined time period indicated by the measurement result acquired by the acquisition unit 111.

In a case where the control apparatus 110 is, for example, a communication apparatus different from the second communication apparatuses 102, the first control unit 112 controls the length of the protection time period of each of the second communication apparatuses 102 by transmitting a control signal to the relevant second communication apparatus 102. The control signal is, for example, a signal that includes an adjustment amount of the protection time period and that instructs to adjust, based on the relevant adjustment amount, the protection time period. Alternatively, the control signal may be a signal that includes a measurement result and that instructs to adjust, based on the measurement result, the protection time period. The control signal may be transmitted using the common signal line 104 or may be transmitted using a signal line different from the common signal line 104.

Based on the measurement result acquired by the acquisition unit 111, the second control unit 113 controls the rate of each of signals transmitted to the second communication apparatuses 102 by the first communication apparatus 101. The second control unit 113 increases the rate of each of the signals transmitted to the second communication apparatuses 102 by the first communication apparatus 101 with a decrease in, for example, the length of the undefined time period indicated by the measurement result acquired by the acquisition unit 111.

In a case where the first communication apparatus 101 transmits a data signal whose rate corresponds to, for example, the frequency of a clock signal, the second control unit 113 is able to adjust, by adjusting the frequency of the clock signal, the rates of the signals transmitted to the second communication apparatuses 102 by the first communication apparatus 101.

In a case where the control apparatus 110 is, for example, a communication apparatus different from the first communication apparatus 101, the second control unit 113 controls the rate of the clock signal of the first communication apparatus 101 by transmitting a control signal to the first communication apparatus 101. The control signal is, for example, a signal that includes an adjustment amount of the clock signal and that instructs to adjust, based on the relevant adjustment amount, the clock signal. Alternatively, the control signal may be a signal that includes a measurement result and that instructs to adjust, based on the measurement result, the clock signal. The control signal may be transmitted using the common signal line 104 or may be transmitted using a signal line different from the common signal line 104.

In this way, the control apparatus 110 according to the first embodiment acquires the measurement result of the undefined time period and controls, in accordance with the acquired measurement result of the undefined time period, the protection time period in each of the second communication apparatuses 102 and the transmission rate of a signal in the first communication apparatus 101. From this, it is possible to set, in each of the second communication apparatuses 102, the protection time period corresponding to the undefined time period that changes depending on the number or arrangement of communication apparatuses coupled to the first communication apparatus 101 via the common signal line 104.

Accordingly, compared with a configuration in which the protection time period is preliminarily set to a longer time period under assumption of, for example, a maximum time period, it is possible to set the protection time period to a shorter time period and to increase, in conformity with the set shorter protection time period, the rate of a signal from the first communication apparatus 101. Therefore, it is possible to achieve an improvement in the transmission rate.

Next, acquisition of the measurement result and timings of individual control operations will be described. In a case where a connection of, for example, a communication apparatus to the first communication apparatus 101 occurs, the acquisition unit 111 acquires a measurement result after the connection of the relevant communication apparatus. Upon detecting a connection of, for example, a communication apparatus to the first communication apparatus 101, the acquisition unit 111 acquires a measurement result of the undefined time period after the connection of the relevant communication apparatus.

In a case where a disconnection of a communication apparatus from the first communication apparatus 101 occurs, the acquisition unit 111 may acquire a measurement result after the disconnection of the relevant communication apparatus. Upon detecting a disconnection of, for example, a communication apparatus from the first communication apparatus 101, the acquisition unit 111 acquires a measurement result of the undefined time period after the disconnection of the relevant communication apparatus. In this case, the second communication apparatuses 102 and the predetermined communication apparatus 102a are communication apparatuses different from the communication apparatus disconnected from the first communication apparatus 101.

From this, in a case where the number or arrangement of communication apparatuses coupled to the first communication apparatus 101 via the common signal line 104 changes, it is possible to swiftly acquire a measurement result of the undefined time period after the change. Therefore, in a case where the number or arrangement of communication apparatuses coupled to the first communication apparatus 101 via the common signal line 104 changes, it is possible to swiftly set the protection time period and the transmission rate of a signal, which correspond to the undefined time period after the change. From this, for example, in a case where the undefined time period is lengthened, it is possible to avoid an occurrence of erroneous determination due to the insufficient length of the protection time period. In addition, in a case where the undefined time period is shortened, it is possible to improve the transmission rate of a signal.

In this regard, however, the acquisition of the measurement result and the timings of individual control operations are not limited to these. In a case where, for example, a predetermined time period has elapsed since a connection or disconnection of a communication apparatus to or from the first communication apparatus 101, the acquisition unit 111 may acquire a measurement result. Alternatively, in a case where a user performs an operation to instruct to acquire a measurement result, the acquisition unit 111 may acquire a measurement result.

Next, the undefined time period will be described. The acquisition unit 111 acquires, for example, a measurement result of the length of the undefined time period due to rise-up of a signal transmitted by the first communication apparatus 101 and a measurement result of the length of the undefined time period due to fall-down of the signal transmitted by the first communication apparatus 101.

In this case, based on the measurement result of the length of the undefined time period due to the rise-up of the signal transmitted by the first communication apparatus 101, the first control unit 112 controls the length of the protection time period in rise-up of a signal received by each of the second communication apparatuses 102. Based on the measurement result of the length of the undefined time period due to the fall-down of the signal transmitted by the first communication apparatus 101, the first control unit 112 controls the length of the protection time period in fall-down of the signal received by each of the second communication apparatuses 102.

Based on, for example, the measurement result of the length of the undefined time period due to the rise-up of the signal transmitted by the first communication apparatus 101, the second control unit 113 controls the time period of the H level of a clock signal used by the first communication apparatus 101 to transmit the signal to each of the second communication apparatuses 102. Based on the measurement result of the length of the undefined time period due to the fall-down of the signal transmitted by the first communication apparatus 101, the second control unit 113 controls the time period of the L level of the clock signal used by the first communication apparatus 101 to transmit the signal to each of the second communication apparatuses 102.

In this regard, however, the acquisition unit 111 may acquire one measurement result from among the measurement result of the length of the undefined time period due to the rise-up of the signal transmitted by the first communication apparatus 101 and the measurement result of the length of the undefined time period due to the fall-down of the signal transmitted by the first communication apparatus 101.

In this case, based on one of the measurement results acquired by the acquisition unit 111, the first control unit 112 controls the length of the protection time period in each of the rise-up and fall-down of the signal received by each of the second communication apparatuses 102. Based on one of the measurement results acquired by the acquisition unit 111, the second control unit 113 controls the rate of the signal transmitted to each of the second communication apparatuses 102 by the first communication apparatus 101.

Next, a case where the second communication apparatuses 102 each perform level determination by using a continuous coincidence protection circuit will be described. Each of the second communication apparatuses 102, which includes the continuous coincidence protection circuit, keeps a result of the level determination at a first level from when the level of a signal received by the relevant second communication apparatus 102 changes from the first level to a second level till when the level of the relevant signal is continuously kept at the second level during a predetermined time period. The first level and the second level are levels different from each other. If the first level is at, for example, an H level, the second level is at an L level. If the first level is at the L level, the second level is at the H level.

The protection time period in this case is, for example, a continuous coincidence protection time period. Regardless of the level of the signal received by each of the second communication apparatuses 102, the relevant second communication apparatus 102 keeps a result of the level determination at the first level from when the level of the received signal changes from the first level to the second level till when the level of the received signal is continuously kept at the second level during the predetermined time period.

In addition, after the elapse of the predetermined time period, each of the second communication apparatuses 102 performs level determination according to the level of the signal received by the relevant second communication apparatus 102. After the elapse of the predetermined time period, each of the second communication apparatuses 102 determines that the level of the signal received by the relevant second communication apparatus 102 is at, for example, the first level if the level of the received signal is at the first level. After the elapse of the predetermined time period, each of the second communication apparatuses 102 determines that the level of the signal received by the relevant second communication apparatus 102 is at the second level if the level of the received signal is at the second level. By controlling, based on the measurement result acquired by the acquisition unit 111, the length of the predetermined time period, the first control unit 112 controls the protection time period.

Next, a case where each of the second communication apparatuses 102 performs level determination by using a mask protection circuit will be described. Each of the second communication apparatuses 102, which includes the mask protection circuit, keeps a result of the level determination at the second level from when the level of the signal received by the relevant second communication apparatus 102 changes from the first level to the second level till when a predetermined time period elapses.

The protection time period in this case is, for example, a mask protection time period. Regardless of the level of the signal received by each of the second communication apparatuses 102, the relevant second communication apparatuses 102 keeps a result of the level determination at the second level from when the level of the received signal changes from the first level to the second level till when the predetermined time period elapses.

In addition, after the elapse of the predetermined time period, each of the second communication apparatuses 102 performs level determination according to the level of the signal received by the relevant second communication apparatuses 102. After the elapse of the predetermined time period, each of the second communication apparatuses 102 determines that the level of the signal received by the relevant second communication apparatus 102 is at, for example, the first level if the level of the received signal is at the first level. After the elapse of the predetermined time period, each of the second communication apparatuses 102 determines that the level of the signal received by the relevant second communication apparatus 102 is at the second level if the level of the received signal is at the second level. By controlling, based on the measurement result acquired by the acquisition unit 111, the length of the predetermined time period, the first control unit 112 controls the protection time period.

Next, a measurement result acquired by the acquisition unit 111 will be described. The acquisition unit 111 acquires a measurement result indicating results of measurements of the length of the undefined time period in, for example, the one predetermined communication apparatus 102a. In this case, based on, for example, a maximum length out of the lengths of the undefined time period indicated by the measurement result acquired by the acquisition unit 111, the first control unit 112 controls the length of the protection time period in each of the second communication apparatuses 102.

Based on, for example, the maximum length out of the lengths of the undefined time period indicated by the measurement result acquired by the acquisition unit 111, the second control unit 113 controls the rate of a signal transmitted to each of the second communication apparatuses 102 by the first communication apparatus 101. From this, it is possible to set the protection time period and the rate of a signal, which correspond to the length of the maximum undefined time period. Therefore, it is possible to improve the transmission rate while further suppressing erroneous determination of a signal level, and it is possible to improve communication quality.

Since a communication apparatus whose transmission distance from the first communication apparatus 101 on the common signal line 104 is a minimum is most susceptible to the influence of a reflection noise and a time period during which a signal is disturbed tends to be lengthened, the undefined time period is lengthened. Therefore, for example, the predetermined communication apparatus 102a may be defined as the communication apparatus whose transmission distance from the first communication apparatus 101 on the common signal line 104 is a minimum, from among communication apparatus coupled to the first communication apparatus 101. From this, it is possible to set the protection time period and the rate of a signal, which correspond to the length of the maximum undefined time period. Therefore, it is possible to improve the transmission rate while further suppressing erroneous determination of a signal level, and it is possible to improve the communication quality.

In a case where the predetermined communication apparatuses 102a are communication apparatuses coupled to the first communication apparatus 101, the acquisition unit 111 may acquire a measurement result of the length of the undefined time period for each of the predetermined communication apparatuses 102a. In this case, based on, for example, a maximum length out of the lengths of the undefined time period indicated by a measurement result acquired by the acquisition unit 111, the first control unit 112 controls the length of the protection time period in each of the second communication apparatuses 102.

Based on, for example, a maximum length out of the lengths of the undefined time period indicated by a measurement result acquired by the acquisition unit 111, the second control unit 113 controls the rate of a signal transmitted to each of the second communication apparatuses 102 by the first communication apparatus 101. From this, it is possible to set the protection time period and the rate of a signal, which correspond to the length of the maximum undefined time period. Therefore, it is possible to improve the transmission rate while further suppressing erroneous determination of a signal level, and it is possible to improve the communication quality.

Second Embodiment

Next, the second embodiment of the transmission apparatus 100 (electronic device) will be described. In the second embodiment, a case of setting the continuous coincidence protection time period by using a continuous coincidence protection circuit 304 will be described in detail. In the second embodiment, a case where the first communication apparatus 101 illustrated in the first embodiment is realized by a transmitting end circuit of a motherboard and the second communication apparatuses 102 illustrated in the first embodiment are each realized by a receiving end circuit of a plug-in unit will be described. In the second embodiment, a case where the predetermined communication apparatus 102a and the control apparatus 110, illustrated in the first embodiment, are realized by a receiving end circuit of a plug-in unit will be described.

Figure 2:
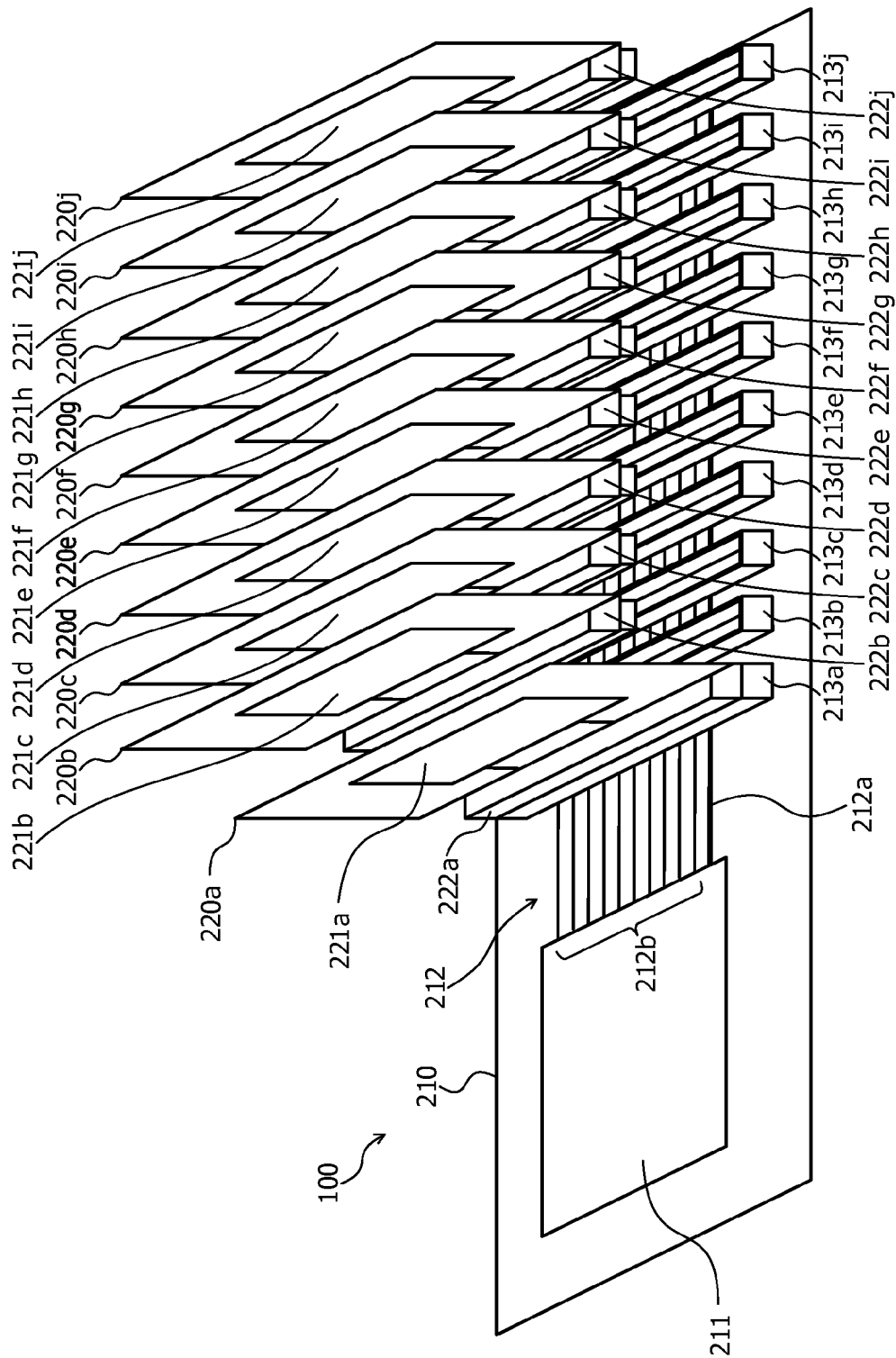
FIG. 2 is a diagram illustrating an example of an apparatus configuration of a transmission apparatus according to a second embodiment.

FIG. 2 is a diagram illustrating an example of an apparatus configuration of a transmission apparatus according to the second embodiment. As illustrated in FIG. 2, the transmission apparatus 100 includes a motherboard 210 and plug-in units 220 (220a to 220j). The motherboard 210 includes a transmitting end circuit 211, a transmission path 212, and connectors 213 (213a to 213j).

The transmitting end circuit 211 is a circuit that generates a transmission signal and that transmits the generated transmission signal to each of the plug-in units 220. The transmission path 212 is a bus that connects the transmitting end circuit 211 and each of the plug-in units 220 and that transmits signals therebetween.

The transmission path 212 includes a common signal line 212a and individual signal lines 212b. The common signal line 212a is, for example, a signal line that sends a data signal from the transmitting end circuit 211 to receiving end circuits 221 (221a to 221j) in the plug-in units 220. The common signal line 104 illustrated in FIG. 1 may be realized by the common signal line 212a.

The individual signal lines 212b are allocated to the respective plug-in units 220. The individual signal lines 212b are, for example, signal lines that send, from the respective receiving end circuits 221 to the transmitting end circuit 211, measurement results of undefined time periods during which the level of the data signal transmitted from the transmitting end circuit 211 via the common signal line 212a is undefined in the respective receiving end circuits 221. While, in FIG. 2, being allocated to the respective plug-in units 220, the individual signal lines 212b may be shared in common by the individual plug-in units 220.

For example, the 10 connectors 213 (213a to 213j) are arranged on the motherboard 210. The connectors 213 are connection units connectable to connectors 222 (222a to 222j) in the respective plug-in units 220.

The plug-in units 220 each include the corresponding receiving end circuit 221 and the corresponding connector 222. Each of the receiving end circuits 221 is a circuit that receives a signal from the motherboard 210. Each of the connectors 222 is a connection unit connectable to the corresponding connector 213 in the motherboard 210.

Each of the plug-in units 220 is attachable and detachable to and from the motherboard 210. For example, in the operation of the transmission apparatus 100, the plug-in units 220 are connected to the motherboard 210 or disconnected from the motherboard 210. For example, up to 10 plug-in units 220 are connected to the motherboard 210. The plug-in units 220 may be realized by, for example, optical modules.

Figure 3:
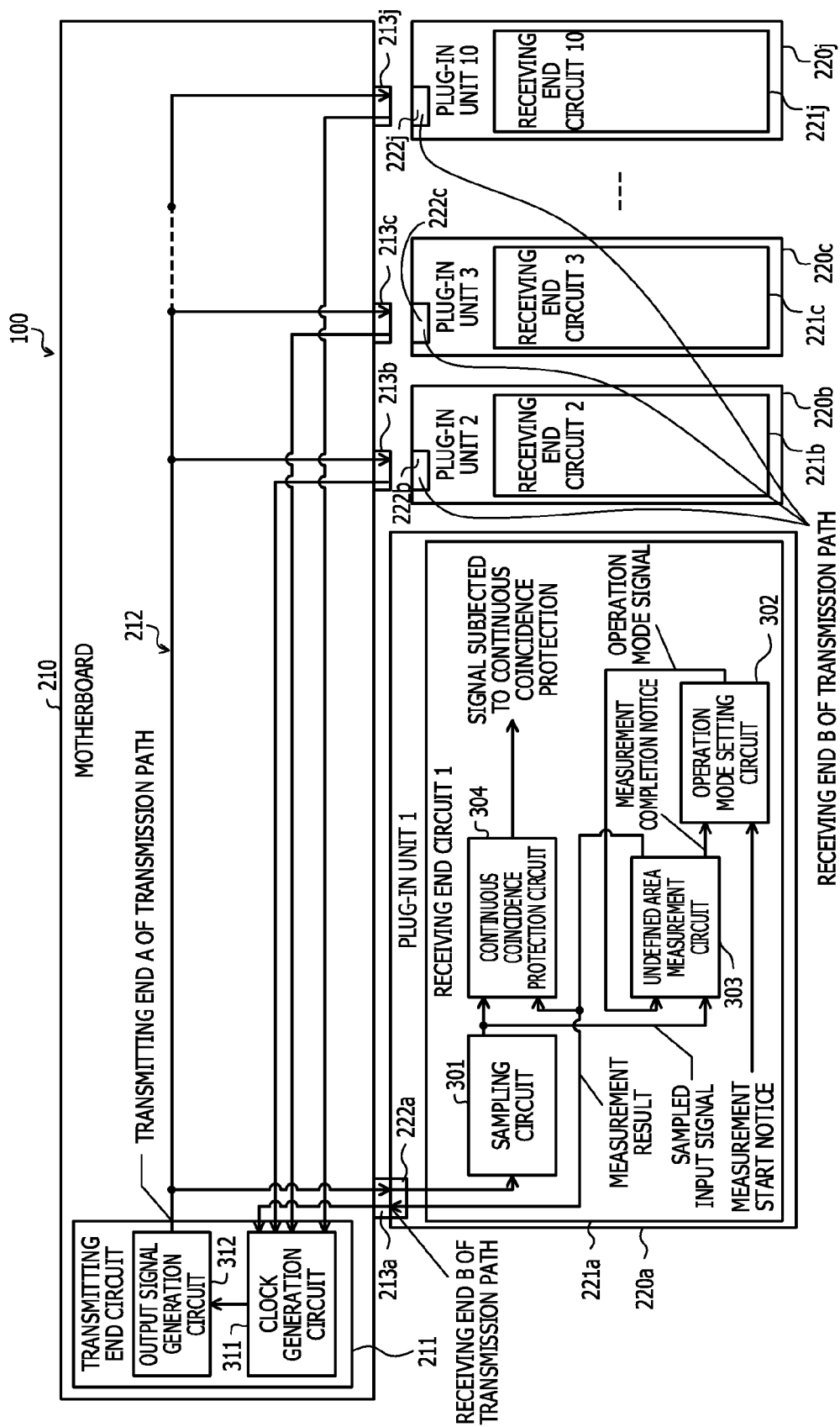
FIG. 3 is a diagram illustrating an example of a circuit configuration of the transmission apparatus according to the second embodiment.

FIG. 3 is a diagram illustrating an example of a circuit configuration of the transmission apparatus according to the second embodiment. As illustrated in FIG. 3, the receiving end circuit 221 in each of the plug-in units 220 includes a sampling circuit 301, an operation mode setting circuit 302, an undefined area measurement circuit 303, and the continuous coincidence protection circuit 304. The transmitting end circuit 211 in the motherboard 210 includes a clock generation circuit 311 and an output signal generation circuit 312.

The sampling circuit 301 samples a signal output from a transmitting end A of the transmitting end circuit 211 and outputs a sampled input signal to the continuous coincidence protection circuit 304 and the undefined area measurement circuit 303.

The operation mode setting circuit 302 is put into an operation mode of one of "during measurement of an undefined area" and "during no measurement of an undefined area". Upon receiving a measurement start notice such as, for example, an increase or decrease notice indicating that one of the plug-in units 220 is attached or detached, the operation mode setting circuit 302 transitions from an operation mode of "during no measurement of an undefined area" to an operation mode of "during measurement of an undefined area". Upon transitioning, for example, from the operation mode of "during no measurement of an undefined area" to the operation mode of "during measurement of an undefined area", the operation mode setting circuit 302 outputs, to the undefined area measurement circuit 303, an operation mode signal indicating the operation mode.

In a case where the operation mode indicated by the operation mode signal output by the operation mode setting circuit 302 corresponds to "during measurement of an undefined area", the undefined area measurement circuit 303 measures undefined time periods Tr and Tf of the input signal by using the sampled input signal output by the sampling circuit 301.

Here, at a receiving end B of each of the receiving end circuits 221, a reflection noise is generated in a boundary surface between two different components of the transmitting end circuit 211 and the relevant receiving end circuit 221 whose characteristic impedances are different. Reflection noises generated at the receiving ends B of the respective receiving end circuits 221 become a composite wave and disturb in a complicated manner. During, for example, a time period during which a reflection noise generates a disturbance at the time of a change in a signal value, the level of a signal becomes unstable. Therefore, time periods during which disturbances are generated cause individual time periods of the undefined time period Tr of the input signal and the undefined time period Tf of the input signal to change.

The undefined time period Tr of the input signal is a time period during which the level of the signal becomes unstable in the rise-up of a received signal. The undefined time period Tf of the input signal is a time period during which the level of the signal becomes unstable in the fall-down of a received signal. An H level protection time period is a time period equivalent to, for example, the undefined time period Tr of the input signal. An L level protection time period is a time period equivalent to, for example, the undefined time period Tf of the input signal.

If measurements of the undefined time periods Tr and Tf of the input signal are completed, the undefined area measurement circuit 303 transmits a measurement completion notice to the operation mode setting circuit 302. Upon receiving the measurement completion notice from the undefined area measurement circuit 303, the operation mode setting circuit 302 transitions from the operation mode of "during measurement of an undefined area" to the operation mode of "during no measurement of an undefined area". In addition, if the measurements of the undefined time periods Tr and Tf of the input signal are completed, the undefined area measurement circuit 303 transmits measurement results to the clock generation circuit 311 and the continuous coincidence protection circuit 304.

The sampled input signal, output by the sampling circuit 301, and the measurement results of the undefined time periods Tr and Tf of the input signal, output by the undefined area measurement circuit 303, are input to the continuous coincidence protection circuit 304. Using the measurement results output by the undefined area measurement circuit 303, the continuous coincidence protection circuit 304 performs continuous coincidence protection on the sampled input signal output by the sampling circuit 301. In addition, the continuous coincidence protection circuit 304 outputs a signal subjected to the continuous coincidence protection to a signal processing circuit located at a subsequent stage.

Using the undefined time period Tr of the input signal and the undefined time period Tf of the input signal, measured by the undefined area measurement circuit 303, the continuous coincidence protection circuit 304 sets the continuous coincidence protection time period at the H level and the continuous coincidence protection time period at the L level. In what follows, the continuous coincidence protection time period at the H level is called an "H level protection time period". In addition, the continuous coincidence protection time period at the L level is called an "L level protection time period".

In a case of receiving a signal before the elapse of the H level protection time period, the continuous coincidence protection circuit 304 outputs the L level. In addition, in a case of receiving a signal at the H level after the elapse of the H level protection time period, the continuous coincidence protection circuit 304 outputs the H level. In a case of receiving a signal before the elapse of the L level protection time period, the continuous coincidence protection circuit 304 outputs the H level. In addition, in a case of receiving a signal at the L level after the elapse of the L level protection time period, the continuous coincidence protection circuit 304 outputs the L level. The continuous coincidence protection circuit 304 outputs a signal subjected to the continuous coincidence protection to the signal processing circuit located at a subsequent stage.

Upon receiving a measurement result of the undefined time period Tr of the input signal from the undefined area measurement circuit 303, the continuous coincidence protection circuit 304 controls the H level protection time period by using the received measurement result. Upon receiving a measurement result of the undefined time period Tf of the input signal from the undefined area measurement circuit 303, the continuous coincidence protection circuit 304 controls the L level protection time period by using the received measurement result.

Based on such a continuous coincidence protection circuit 304, it is possible to avoid switching of a level in the determination of a signal level during the undefined time periods Tr and Tf of the input signal during which a signal is disturbed. Therefore, it is possible to suppress erroneous determination of a signal level, and it is possible to suppress an incorrect operation of each of the receiving end circuits 221.

Upon receiving measurement results of the undefined time periods Tr and Tf of the input signal from the undefined area measurement circuit 303, the clock generation circuit 311 controls the rate of a clock by using the received measurement results. The clock generation circuit 311 generates the clock whose rate is controlled using the measurement results. In addition, the clock generation circuit 311 transmits the generated clock to the output signal generation circuit 312.

Using the clock generated by the clock generation circuit 311, the output signal generation circuit 312 generates a signal. In addition, the output signal generation circuit 312 outputs the generated signal to the sampling circuit 301. By outputting or not outputting, for example, the clock generated by the clock generation circuit 311, the output signal generation circuit 312 generates a signal. In a case of transmitting data of, for example, "1", the output signal generation circuit 312 outputs a clock signal. On the other hand, in a case of transmitting data of, for example, "0", the output signal generation circuit 312 does not output the clock signal.

In this way, the transmission apparatus 100 is able to set the rate of a signal, which corresponds to the measurement results of the undefined time periods Tr and Tf of the input signal. Therefore, it is possible to improve the transmission rate of a signal transmitted to each of the receiving end circuits 221 by the transmitting end circuit 211.

The acquisition unit 111 illustrated in FIG. 1 is realized by, for example, the undefined area measurement circuit 303. The first control unit 112 illustrated in FIG. 1 is realized by the continuous coincidence protection circuit 304. The second control unit 113 illustrated in FIG. 1 is realized by the undefined area measurement circuit 303. The undefined area measurement circuit 303 transmits, to the clock generation circuit 311, for example, a signal that includes the undefined time periods Tr and Tf of the input signal and that instructs to adjust the clock signal in accordance with the measurement results, thereby realizing the function of the second control unit 113.

Figure 4:
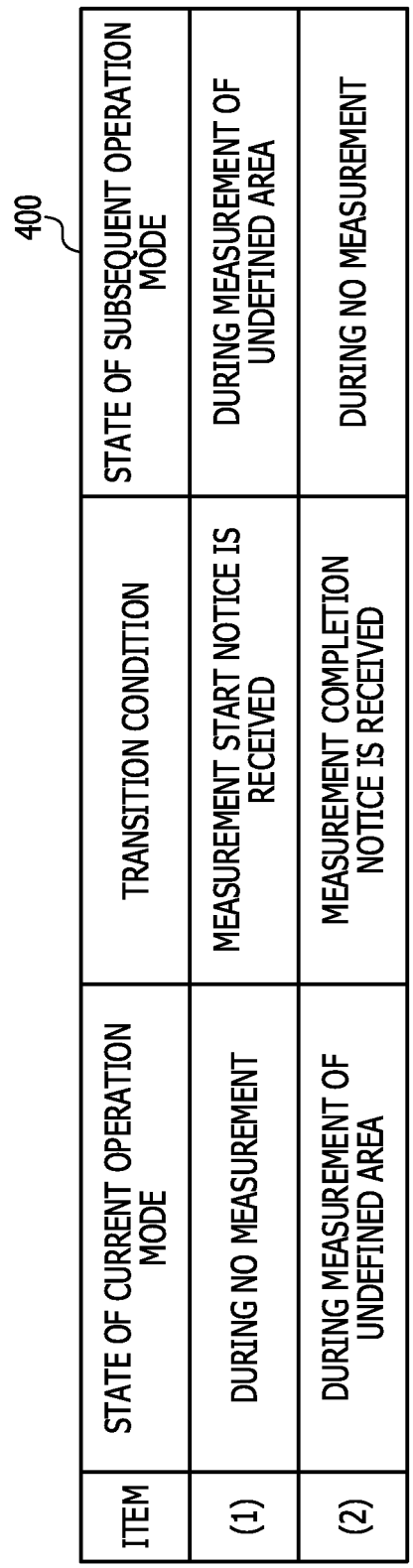
FIG. 4 is a diagram illustrating an example of a state transition of an operation mode in an operation mode setting circuit.

FIG. 4 is a diagram illustrating an example of a state transition of an operation mode in an operation mode setting circuit. As illustrated in a state transition diagram 400 in FIG. 4, the operation mode setting circuit 302 is put into an operation mode of one of "during no measurement of an undefined area" and "during measurement of an undefined area". The operation mode setting circuit 302 is realized by, for example, a state machine.

In the operation mode of "during no measurement of an undefined area", upon receiving, as a transition condition, a measurement start notice from, for example, a central processing unit (CPU), not illustrated, the operation mode setting circuit 302 transitions to the operation mode of "during measurement of an undefined area". The CPU detects, for example, a connection or a disconnection between the motherboard 210 and one of the plug-in units 220, thereby transmitting the measurement start notice from the CPU. In the operation mode of "during measurement of an undefined area", upon receiving, as a transition condition, a measurement completion notice from the undefined area measurement circuit 303, the operation mode setting circuit 302 transitions to the operation mode of "during no measurement of an undefined area".

Here, the transmission rate Th of a signal in a case of using the continuous coincidence protection circuit 304 is calculated in accordance with the following Expression (1).

$$Th \text{ [bps]}=1/(Tr \text{ [S]+an } H \text{ level protection time period [S]}+Tf \text{ [S]+an } L \text{ level protection time period [S]+a margin [S])} \qquad (1)$$

The above-mentioned Expression (1) will be described using FIG. 5.

Figure 5:
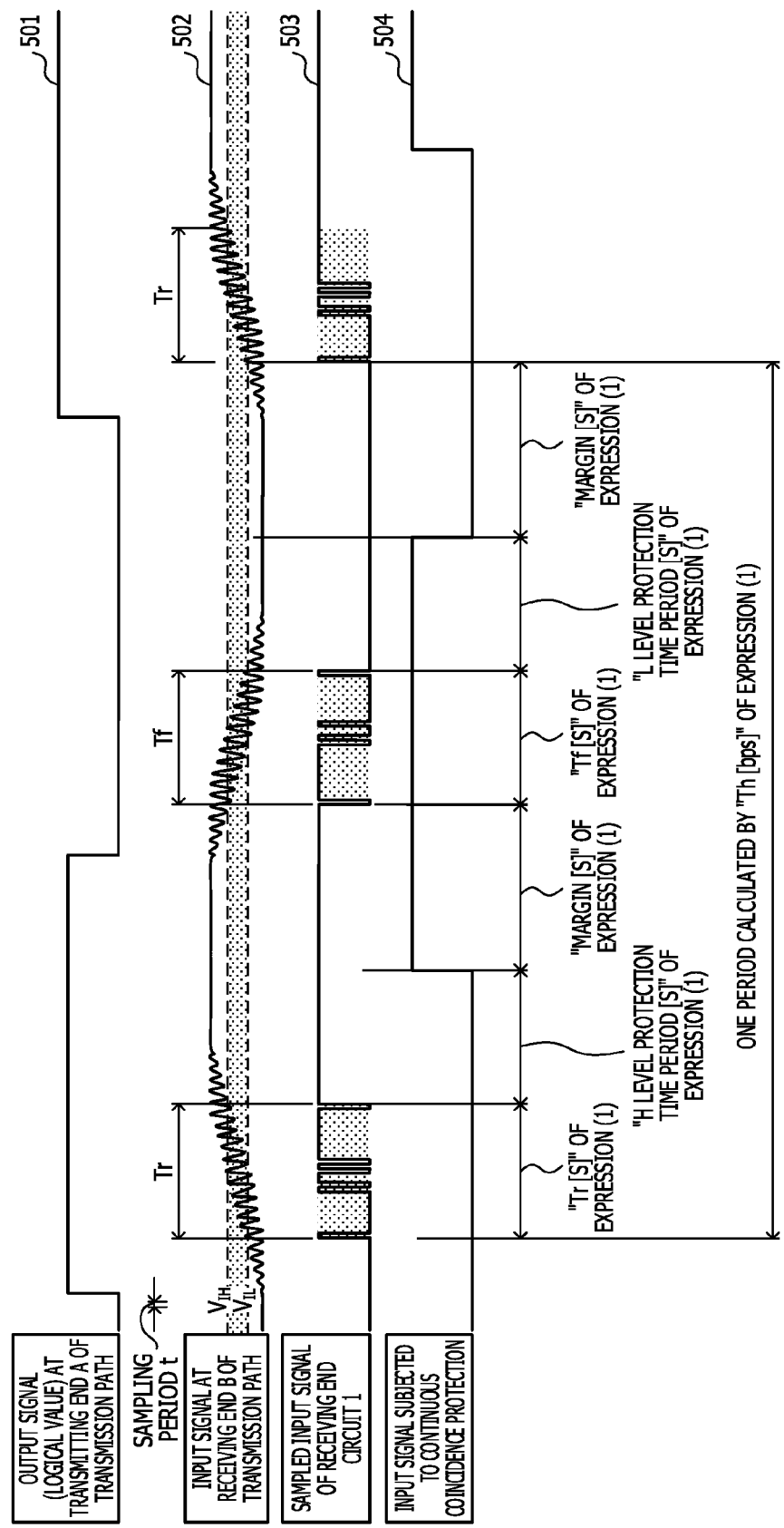
FIG. 5 is a diagram illustrating an example of a waveform of a signal transmitted by a transmitting end circuit of the second embodiment and an example of a waveform of a signal received by a receiving end circuit of the second embodiment.

FIG. 5 is a diagram illustrating an example of a waveform of a signal transmitted by a transmitting end circuit of the second embodiment and an example of a waveform of a signal received by a receiving end circuit of the second embodiment. In FIG. 5, an output signal 501 indicates the logical value of an output signal at the transmitting end A of the transmitting end circuit 211. An input signal 502 indicates an input signal prior to sampling at the receiving end B of the corresponding receiving end circuit 221.

A sampling period in the receiving end circuit 221 is t. In the input signal 502, voltages $V_{IL}$ and $V_{IH}$ are reference voltages for detecting whether a sampled input signal 503 is at the H level or at the L level. For example, the voltage $V_{IL}$ has a value lower than that of the voltage $V_{IH}$. A time period during which the input signal 502 is situated between the voltage $V_{IL}$ and the voltage $V_{IH}$ corresponds to the undefined time period Tr of the input signal or the undefined time period Tf of the input signal, during which whether the input signal 503 is at the L level or at the H level is undefined.

An input signal 504 indicates the input signal whose signal value is subjected to the continuous coincidence protection. The input signal 504 indicates that, at the L level, the input signal switches to the H level after the elapse of the undefined time period Tr [S] of the input signal and the H level protection time period [S]. The H level protection time period [S] is a time period determined by the undefined time period Tr of the input signal. While being a time period approximately equal to, for example, the undefined time period Tr of the input signal, the H level protection time period [S] only has to be a time period greater than or equal to the undefined time period Tr of the input signal.

At the level H, the input signal 504 switches from the level H to the level L after the elapse of the margin [S], the undefined time period Tf [S] of the input signal, and the L level protection time period [S]. The L level protection time period [S] is a time period determined by the undefined time period Tf of the input signal. While being a time period approximately equal to, for example, the undefined time period Tf of the input signal, the L level protection time period [S] only has to be a time period greater than or equal to the undefined time period Tf of the input signal.

In addition, at the L level, the input signal 504 switches from the level L to the level H after the elapse of the margin [S], the undefined time period Tr [S] of the input signal, and the H level protection time period [S]. After this, in the same way, the input signal 504 switches between the H level and the L level.

Figure 6:
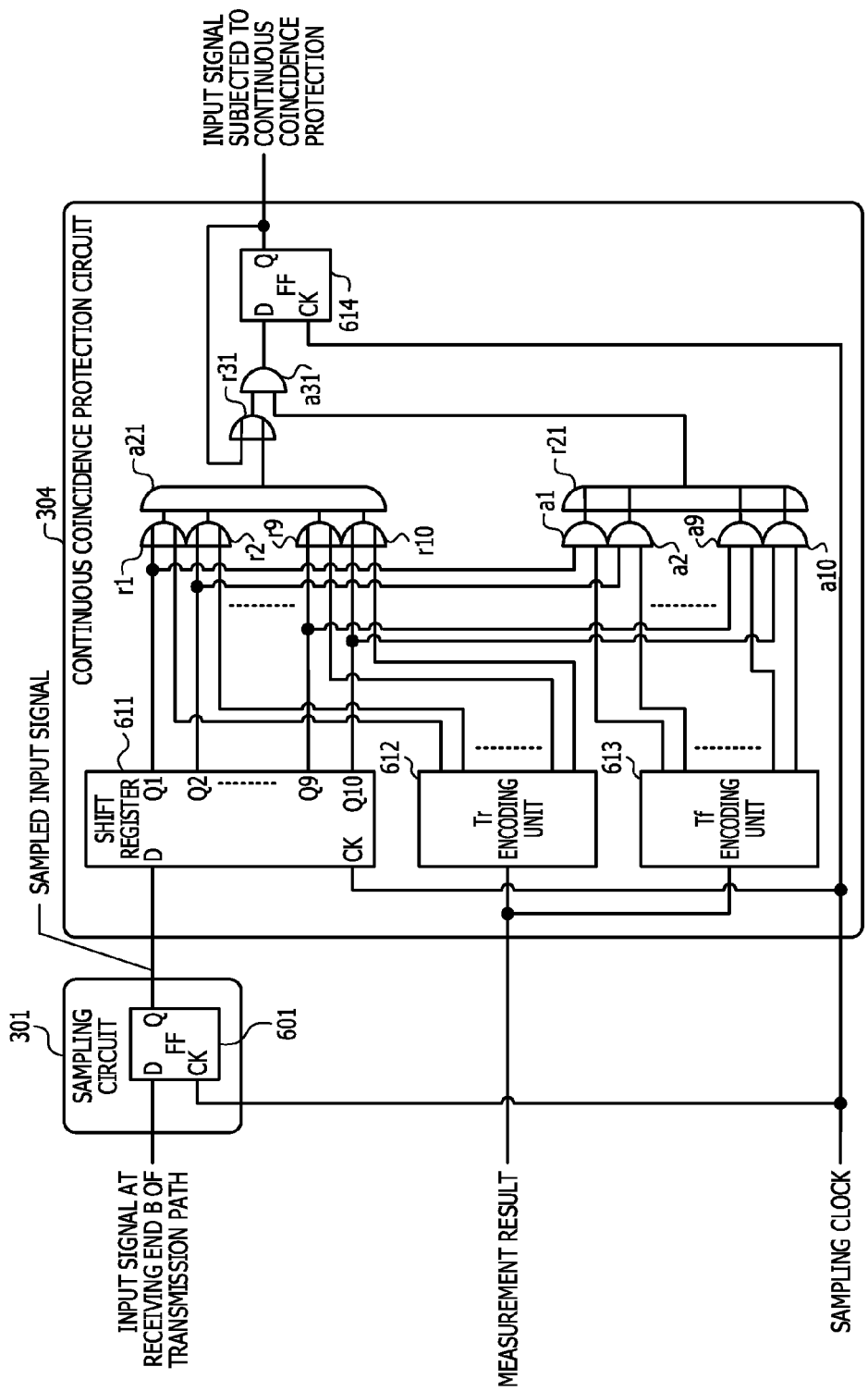
FIG. 6 is a diagram illustrating examples of hardware configurations of a sampling circuit and a continuous coincidence protection circuit.

FIG. 6 is a diagram illustrating examples of hardware configurations of a sampling circuit and a continuous coincidence protection circuit. As illustrated in FIG. 6, the sampling circuit 301 includes a flip-flop (FF) circuit 601. A signal at the receiving end B is input to the flip-flop circuit 601. A sampling clock (CK) is input to the flip-flop circuit 601.

The flip-flop circuit 601 reads the value of a D input in synchronization with, for example, the sampling clock and holds the value during a time period until inputting of the subsequent sampling clock. At, for example, the rise-up or fall-down of the sampling clock, the flip-flop circuit 601 latches the D input. The flip-flop circuit 601 transmits a sampled output signal to the continuous coincidence protection circuit 304.

The continuous coincidence protection circuit 304 includes a shift register 611, a Tr encoding unit 612, a Tf encoding unit 613, a flip-flop circuit 614, AND circuits a, and OR circuits r. The output signal from the flip-flop circuit 601 is input to the shift register 611.

The sampling clock is input to the shift register 611. The shift register 611 includes, for example, flip-flop circuits. The shift register 611 shifts the input of each of the flip-flop circuits by, for example, 1 bit for each of the sampling clocks. From this, in each of the flip-flop circuits in the shift register 611, edge detection turns out to be performed by a shift of 1 bit.

The shift register 611 outputs output signals in Q1 to Q10 to OR circuits r1 to r10 and AND circuits a1 to a10, respectively. Measurement results of the undefined time periods Tr and Tf of the input signal, output by the undefined area measurement circuit 303, are input to the Tr encoding unit 612. The Tr encoding unit 612 encodes a signal indicating, for example, the measurement result of the undefined time period Tr of the input signal. In addition, the Tr encoding unit 612 outputs an encoded signal to the OR circuits r1 to r10.

The measurement results of the undefined time periods Tr and Tf of the input signal, output by the undefined area measurement circuit 303, are input to the Tf encoding unit 613. The Tf encoding unit 613 encodes a signal indicating, for example, the measurement result of the undefined time period Tf of the input signal. In addition, the Tf encoding unit 613 outputs an encoded signal to the AND circuits a1 to a10.

The OR circuits r1 to r10 output, using the output signals of the Q1 to Q10, respectively, from the shift register 611 and the signal output by the Tr encoding unit 612, signals each indicating the H level or the L level, to the AND circuit a21. The AND circuits a1 to a10 output, using the output signals of the Q1 to Q10, respectively, from the shift register 611 and the signal output by the Tf encoding unit 613, signals each indicating the H level or the L level, to an OR circuit r21. Using the signals output by the OR circuits r1 to r10, an AND circuit a21 outputs, to an OR circuit r31, a signal indicating the H level or the L level.

Using the signal output by the AND circuit a21 and the signal output by the flip-flop circuit 614, the OR circuit r31 outputs, to an AND circuit a31, a signal indicating the H level or the L level. Using the signals output by the AND circuits a1 to a10, the OR circuit r21 outputs, to the AND circuit a31, a signal indicating the H level or the L level.

Using the signals output by the OR circuit r21 and OR circuit r31, the AND circuit a31 outputs, to the flip-flop circuit 614, a signal indicating the H level or the L level. The signal output by the AND circuit a31 is input to the flip-flop circuit 614. The sampling clock is input to the flip-flop circuit 614. Using the signal output by the AND circuit a31 and the sampling clock, the flip-flop circuit 614 performs the continuous coincidence protection. The flip-flop circuit 614 outputs a signal subjected to the continuous coincidence protection to the OR circuit r31 and a signal processing circuit located at a subsequent stage.

Based on such a sampling circuit 301 and a continuous coincidence protection circuit 304, in the determination of a signal level during the undefined time periods Tr and Tf of the input signal during which a signal is disturbed, it is possible to avoid switching of a level. Therefore, it is possible to suppress erroneous determination of a signal level during the undefined time periods Tr and Tf of the input signal, and it is possible to suppress an incorrect operation of each of the receiving end circuits 221.

Figure 7:
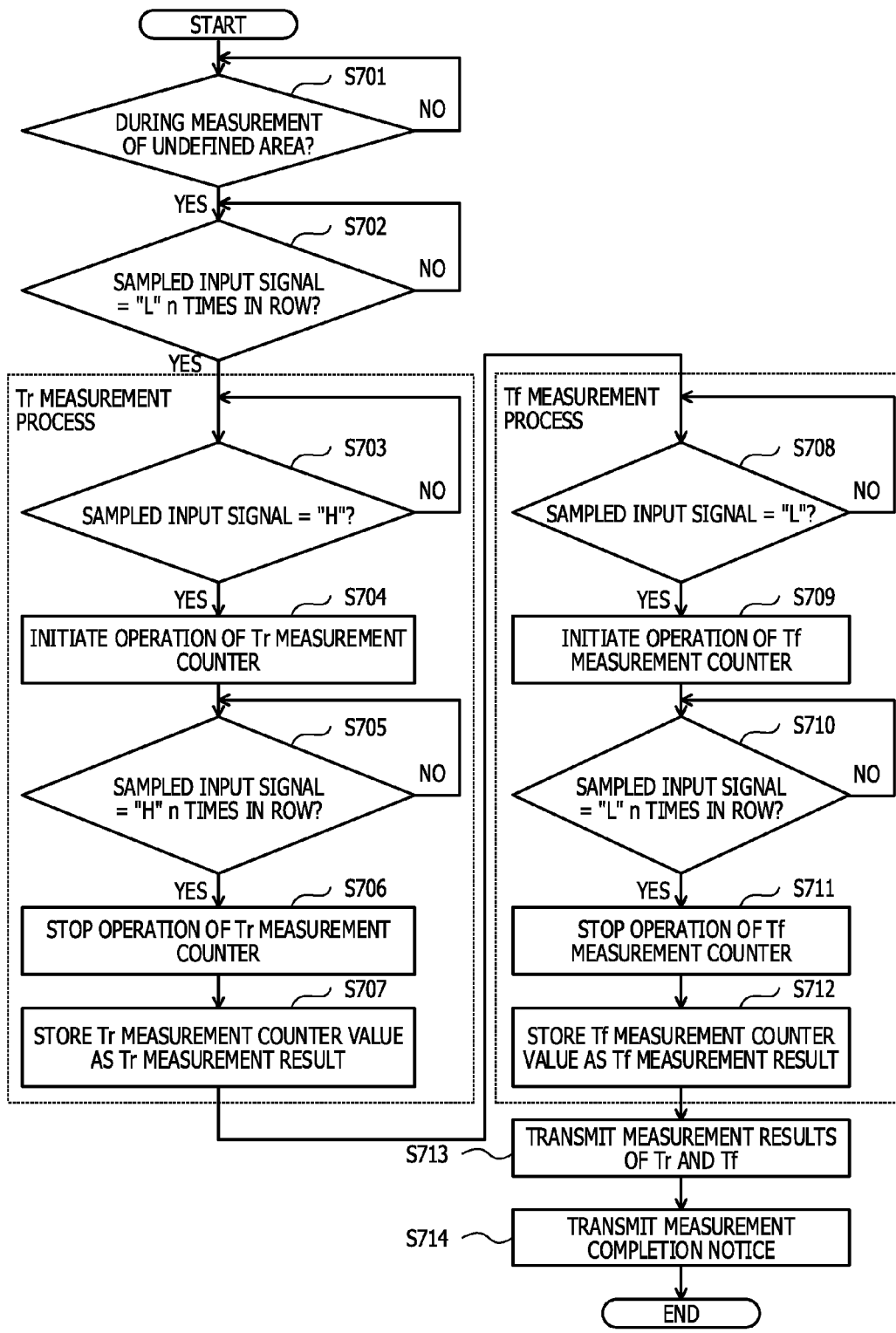
FIG. 7 is a flowchart illustrating an example of an operation of an undefined area measurement circuit.

FIG. 7 is a flowchart illustrating an example of an operation of an undefined area measurement circuit. In FIG. 7, the undefined area measurement circuit 303 determines whether or not an operation mode indicated by the operation mode signal output by the operation mode setting circuit 302 is "during measurement of an undefined area" (S701). The undefined area measurement circuit 303 serving as a measurement target of an undefined area is included in, for example, one of the plug-in units 220, whose transmission distance from the transmitting end circuit 211 on the common signal line 212a is a minimum.

The undefined area measurement circuit 303 waits until the operation mode becomes "during measurement of an undefined area" (S701: No). If the operation mode becomes "during measurement of an undefined area" (S701: Yes), the undefined area measurement circuit 303 determines whether or not the sampled input signal is at the L level n times in a row (S702). "n" is the number of measurement protection stages of the undefined time period Tr of the input signal. "n" is, for example, an integer able to be arbitrarily set.

The undefined area measurement circuit 303 waits until the sampled input signal is at the L level n times in a row (S702: No). If the sampled input signal is at the L level n times in a row (S702: Yes), the undefined area measurement circuit 303 determines whether or not the sampled input signal is at the H level (S703). The undefined area measurement circuit 303 waits until the sampled input signal reaches the H level (S703: No).

If the sampled input signal reaches the H level (S703: Yes), the undefined area measurement circuit 303 initiates an operation of a Tr measurement counter (see FIG. 8) included in the undefined area measurement circuit 303 (S704). Next, the undefined area measurement circuit 303 determines whether or not the sampled input signal is at the H level n times in a row (S705).

The undefined area measurement circuit 303 waits until the sampled input signal is at the H level n times in a row (S705: No). If the sampled input signal is at the H level n times in a row (S705: Yes), the undefined area measurement circuit 303 stops the operation of the Tr measurement counter (S706). Next, the undefined area measurement circuit 303 stores therein a Tr measurement counter value as a measurement result of the undefined time period Tr of the input signal (S707).

Next, the undefined area measurement circuit 303 determines whether or not the sampled input signal is at the L level (S708). The undefined area measurement circuit 303 waits until the sampled input signal reaches the L level (S708: No).

If the sampled input signal reaches the L level (S708: Yes), the undefined area measurement circuit 303 initiates an operation of a Tf measurement counter (see FIG. 8) included in the undefined area measurement circuit 303 (S709). Next, the undefined area measurement circuit 303 determines whether or not the sampled input signal is at the L level n times in a row (S710).

The undefined area measurement circuit 303 waits until the sampled input signal is at the L level n times in a row (S710: No). If the sampled input signal is at the L level n times in a row (S710: Yes), the undefined area measurement circuit 303 stops the operation of the Tf measurement counter (S711). Next, the undefined area measurement circuit 303 stores therein a Tf measurement counter value as a measurement result of the undefined time period Tf of the input signal (S712).

Next, the undefined area measurement circuit 303 transmits, to the clock generation circuit 311 and the continuous coincidence protection circuit 304, the stored measurement results of the undefined time periods Tr and Tf of the input signal (S713). In addition, the undefined area measurement circuit 303 transmits a measurement completion notice to the operation mode setting circuit 302 (S714) and terminates a series of processing operations.

Based on the above-mentioned flowchart, it is possible to obtain measurement results of the undefined time periods Tr and Tf of the input signal. If the continuous coincidence protection circuit 304 receives the measurement results, the continuous coincidence protection circuit 304 sets the H level protection time period equal to, for example, the undefined time period Tr of the input signal and sets the L level protection time period equal to the undefined time period Tf of the input signal. In addition, if the operation mode setting circuit 302 receives the measurement completion notice, the operation mode setting circuit 302 causes the operation mode of the operation mode setting circuit 302 to transition to the operation mode of "during no measurement of an undefined area".

As for identification of the corresponding undefined area measurement circuit 303 that serves as an execution subject of the present flowchart and whose transmission distance from the transmitting end circuit 211 is a minimum, the location information of, for example, the connectors 213 into which the respective plug-in units 220 are inserted on the motherboard 210 may be used. For example, one of the undefined area measurement circuits 303 or the transmitting end circuit 211 may acquire the location information and may identify the corresponding undefined area measurement circuit 303 whose transmission distance from the transmitting end circuit 211 is a minimum on the signal line 212a.

Figure 8:
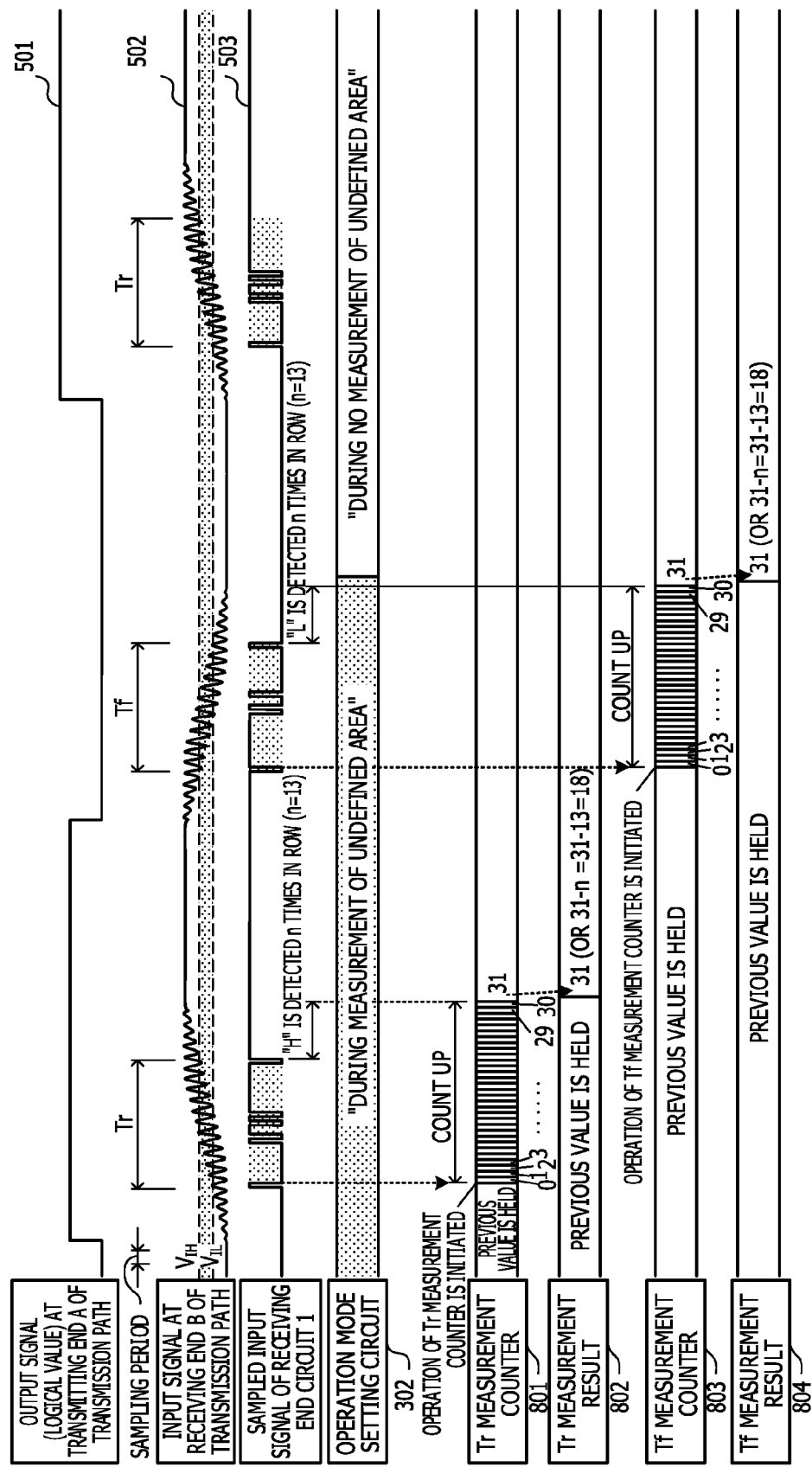
FIG. 8 is a timing chart illustrating an example of an operation of the receiving end circuit.

FIG. 8 is a timing chart illustrating an example of an operation of a receiving end circuit. The output signal 501 illustrated in FIG. 8 indicates the logical value of an output signal at the transmitting end A of the transmitting end circuit 211. The input signal 502 indicates an input signal at the receiving end B of the corresponding receiving end circuit 221. The input signal 503 indicates a sampled input signal in the corresponding receiving end circuit 221.

The operation mode setting circuit 302 indicates the operation mode of, for example, "during measurement of an undefined area". In a case where the operation mode of the operation mode setting circuit 302 is "during measurement of an undefined area" (see S701 in FIG. 7), the undefined area measurement circuit 303 waits until the input signal 503 is at the L level n times in a row (see S702 in FIG. 7).

In addition, in a case where the operation mode setting circuit 302 is in the operation mode of "during measurement of an undefined area" (see S701 in FIG. 7), a Tr measurement counter 801 holds a previous value until the H level of the sampled input signal 503 is detected (see S703 in FIG. 7). If the H level of the sampled input signal 503 is detected, the Tr measurement counter 801 initiates an operation of counting up (see S704 in FIG. 7).

The Tr measurement counter 801 continues counting up after the H level of the sampled input signal is detected until the H level thereof is detected n times (for example, 13 times in the graphical illustration) in a row (see S705 in FIG. 7). If the H level is detected n times in a row, the Tr measurement counter 801 stops the counting up (see S706 in FIG. 7).

A Tr measurement result 802 included in the corresponding undefined area measurement circuit 303 holds a previous value until the counting up of the Tr measurement counter 801 is stopped. If the counting up of the Tr measurement counter 801 is stopped, the Tr measurement result 802 holds the Tr measurement counter value (for example, 31) as a measurement result of the undefined time period Tr of the input signal (see S707 in FIG. 7).

A time period of n (13) serving as the number of measurement protection stages functions as a margin. The Tr measurement result 802 may hold, as the measurement result of the undefined time period Tr of the input signal, a value (18) obtained by subtracting, from the Tr measurement counter value (31), n (13) serving as the number of measurement protection stages of the undefined time period Tr of the input signal. From this, it is possible to reduce the margin, and it is possible to reduce the period of the clock by the amount. Therefore, it is possible to achieve an improvement in the transmission rate. In a case where the number of measurement protection stages of the undefined time period Tr of the input signal is not subtracted from the Tr measurement counter value, it is possible to set the H level protection time period to a longer time period. Therefore, it is possible to suppress erroneous determination of a signal level, and it is possible to improve communication quality.

A Tf measurement counter 803 included in the corresponding undefined area measurement circuit 303 holds a previous value until the L level of the sampled input signal 503 is detected (see S708 in FIG. 7). If the L level of the sampled input signal 503 is detected, the Tf measurement counter 803 initiates an operation of counting up (see S709 in FIG. 7).

The Tf measurement counter 803 continues counting up after the L level of the sampled input signal is detected until the L level thereof is detected n times (for example, 13 times in the graphical illustration) in a row (see S710 in FIG. 7). If the L level is detected n times in a row, the Tf measurement counter 803 stops the counting up (see S711 in FIG. 7).

A Tf measurement result 804 included in the corresponding undefined area measurement circuit 303 holds a previous value until the counting up of the Tf measurement counter 803 is stopped. If the counting up of the Tf measurement counter 803 is stopped, the Tf measurement result 804 holds the Tf measurement counter value (for example, 31) as a measurement result of the undefined time period Tr of the input signal (see S712 in FIG. 7).

A time period of n (13) serving as the number of measurement protection stages functions as a margin. The Tf measurement result 804 may hold, as the measurement result of the undefined time period Tf of the input signal, a value (18) obtained by subtracting, from the Tf measurement counter value (31), n (13) serving as the number of measurement protection stages of the undefined time period Tf of the input signal. From this, it is possible to reduce the margin, and it is possible to reduce the period of the clock by the amount. Therefore, it is possible to achieve an improvement in the transmission rate. In a case where the number of measurement protection stages of the undefined time period Tf of the input signal is not subtracted from the Tf measurement counter value, it is possible to set the L level protection time period to a longer time period. Therefore, it is possible to suppress erroneous determination of a signal level, and it is possible to improve communication quality.

Figure 9:
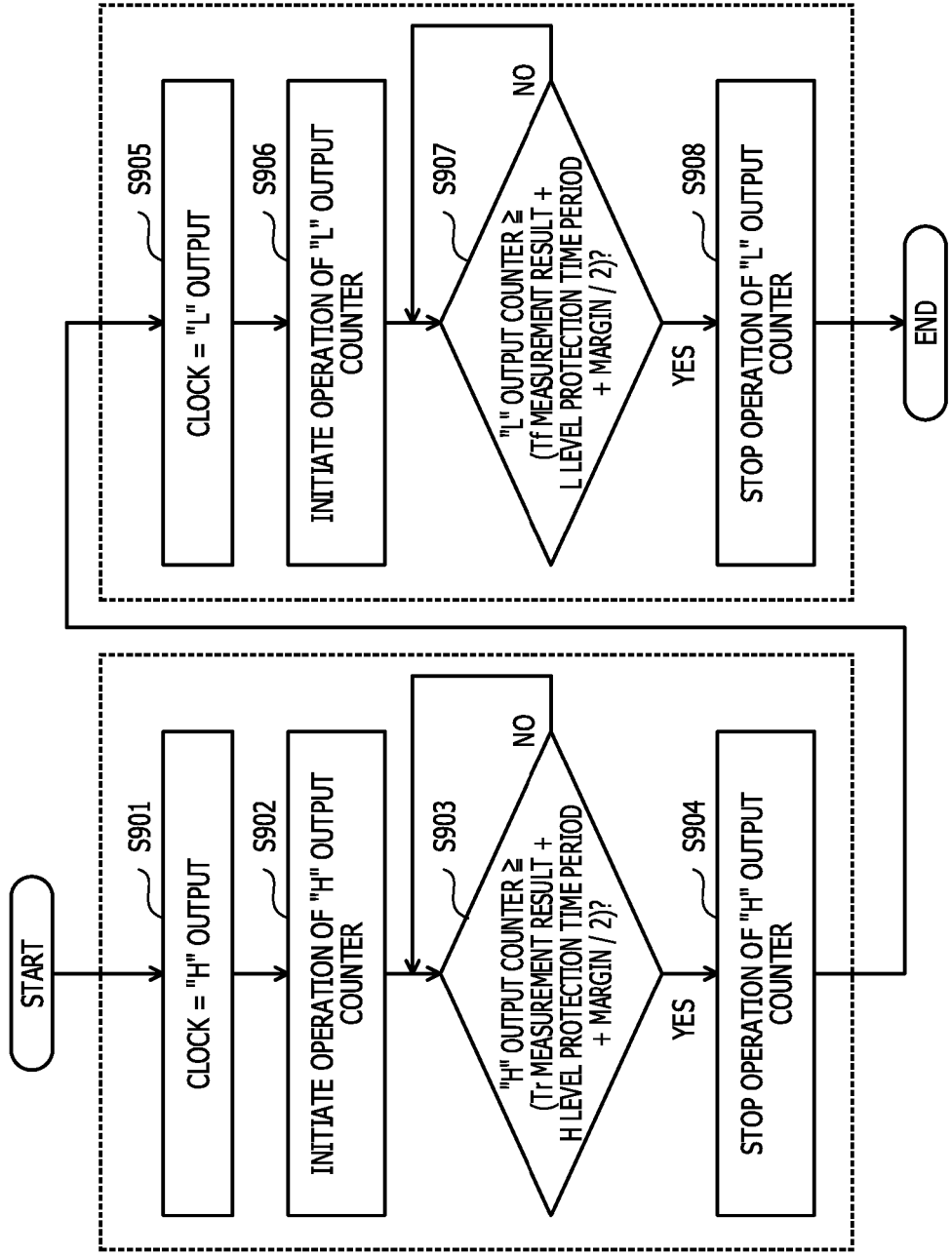
FIG. 9 is a flowchart illustrating an example of an operation of a clock generation circuit according to the second embodiment.

FIG. 9 is a flowchart illustrating an example of an operation of a clock generation circuit according to the second embodiment. In FIG. 9, the clock generation circuit 311 outputs the clock of the H level (S901). Next, the clock generation circuit 311 initiates an operation of an output counter of the H level (S902). Next, the clock generation circuit 311 determines whether or not the output counter of the H level is greater than or equal to a value obtained by adding a measurement result of the undefined time period Tr of the input signal, the H level protection time period, and a half of the margin (S903).

The clock generation circuit 311 waits until the output counter of the H level becomes greater than or equal to a value obtained by adding the measurement result of the undefined time period Tr of the input signal, the H level protection time period, and a half of the margin (S903: No). If the output counter of the H level becomes greater than or equal to a value obtained by adding the measurement result of the undefined time period Tr of the input signal, the H level protection time period, and a half of the margin (S903: Yes), the clock generation circuit 311 stops the operation of the output counter of the H level (S904).

Next, the clock generation circuit 311 outputs the clock of the L level (S905). Next, the clock generation circuit 311 initiates an operation of an output counter of the L level (S906). Next, the clock generation circuit 311 determines whether or not the output counter of the L level is greater than or equal to a value obtained by adding a measurement result of the undefined time period Tf of the input signal, the L level protection time period, and a half of the margin (S907).

The clock generation circuit 311 waits until the output counter of the L level becomes greater than or equal to a value obtained by adding the measurement result of the undefined time period Tf of the input signal, the L level protection time period, and a half of the margin (S907: No). If the output counter of the L level becomes greater than or equal to a value obtained by adding the measurement result of the undefined time period Tf of the input signal, the L level protection time period, and a half of the margin (S907: Yes), the clock generation circuit 311 stops the operation of the output counter of the L level (S908). In addition, the clock generation circuit 311 terminates a series of processing operations.

Based on the above-mentioned flowchart, it is possible to output the clock of the H level corresponding to each of measurement results of the undefined time period Tr of the input signal. In addition, it is possible to output the clock of the L level corresponding to each of measurement results of the undefined time period Tf of the input signal. Therefore, it is possible to set the rate of a signal corresponding to the measurement results of the undefined time periods Tr and Tf of the input signal, and it is possible to improve a transmission rate.

Figure 10:
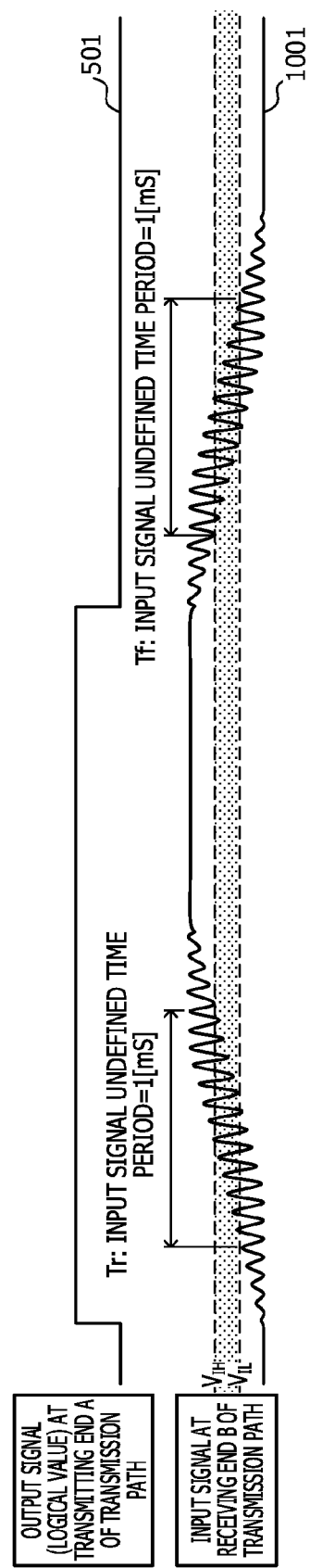
FIG. 10 is a diagram illustrating an example of a reflection noise in a case where the receiving end circuit is disconnected.

FIG. 10 is a diagram illustrating an example of a reflection noise in a case where a receiving end circuit is disconnected. FIG. 10 illustrates a case where, for example, only one receiving end circuit 221 is connected due to disconnections of the other receiving end circuits 221, associated with detachment of some of the plug-in units 220. In a case where only one receiving end circuit 221 is connected, a reflection noise becomes a maximum.

In FIG. 10, the output signal 501 indicates the logical value of an output signal at the transmitting end A of the transmitting end circuit 211. An input signal 1001 indicates an input signal at the receiving end B of the corresponding receiving end circuit 221.

At the time of a disconnection of the corresponding receiving end circuit 221, a characteristic impedance becomes infinite, and a voltage level becomes a maximum. In a case where the other receiving end circuits 221 are disconnected, for the logical value of an output signal at the transmitting end A, a reflection noise is generated in the input signal at the corresponding receiving end B, and both the undefined time periods Tr and Tf of the input signal are, for example, 1 [mS].

Figure 11:
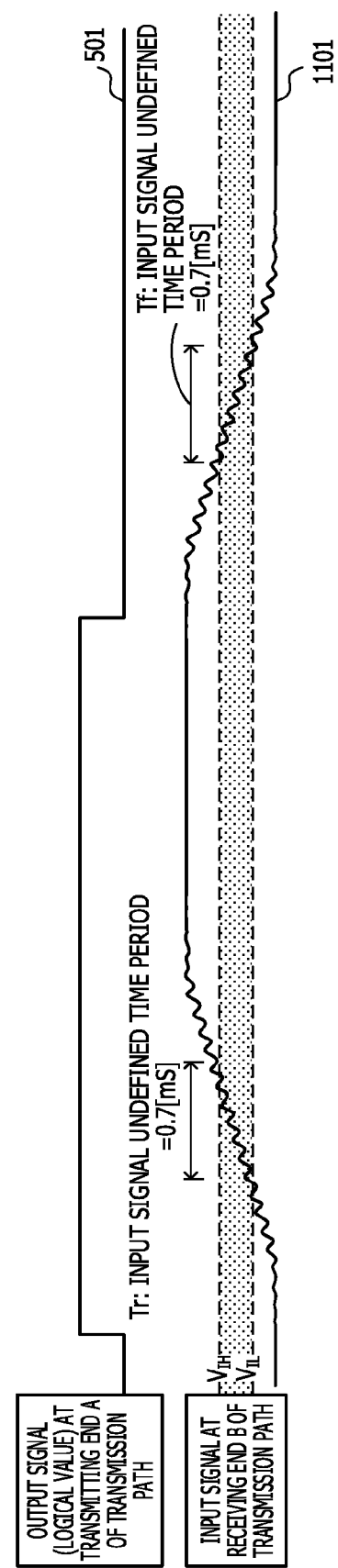
FIG. 11 is a diagram illustrating an example of a reflection noise in a case where the receiving end circuit is connected.

FIG. 11 is a diagram illustrating an example of a reflection noise in a case where the corresponding receiving end circuit is connected. FIG. 11 illustrates a case where, for example, the receiving end circuits 221 in all the 10 receiving end circuits 221 are connected due to connections of some of the receiving end circuits 221, associated with attachment of some of the plug-in units 220. In a case where all the 10 receiving end circuits 221 are connected, a reflection noise becomes a minimum.

In FIG. 11, the output signal 501 indicates the logical value of an output signal at the transmitting end A of the transmitting end circuit 211. An input signal 1101 indicates an input signal at the receiving end B of the corresponding receiving end circuit 221.

At the time of connections of the receiving end circuits 221, the voltage level of a reflection noise is small compared with disconnections of, for example, some of the receiving end circuits 221 (see FIG. 10). Both the undefined time periods Tr and Tf of the input signal at the time of connections of the receiving end circuits 221 are, for example, 0.7 [mS].

Next, comparison between the transmission rates of the second embodiment and the related art will be described. First, in a digital signal transmission circuit of the related art, the rate of a clock is preliminarily calculated under the assumption of a condition in which a voltage level of a reflection noise becomes a maximum. The condition in which a voltage level of a reflection noise becomes a maximum is, for example, a condition in which one receiving end circuit 221 is left and the other receiving end circuits 221 are disconnected from the transmitting end circuit 211. For example, the one receiving end circuit 221 is the corresponding receiving end circuit 221 most susceptible to the influence of a reflection noise. The one receiving end circuit 221 is, for example, the receiving end circuit 221a whose transmission distance from the transmitting end circuit 211 on the common signal line 212a is a minimum.

It is assumed that, for example, both the undefined time periods Tr and Tf of the input signal are 1 [mS], both the H level protection time period and the L level protection time period are 1 [mS], and the margin is 0.5 [mS]. In this case, the transmission rate Th of a signal in the digital signal transmission circuit of the related art is calculated as follows by using the above-mentioned Expression (1).

$Th$ [bps]=1/($Tr$ [S]+an $H$ level protection time period [S]+$Tf$ [S]+an $L$ level protection time period [S]+a margin [S])=1/(1 [mS]+1 [mS]+1 [mS]+0.5 [mS])≈222.2 [bps]     (2)

In a case where the receiving end circuits 221 in all the 10 plug-in units 220 are connected to the transmitting end circuit 211 at such a rate of a clock, the average of transmission rates of signals receivable by the receiving end circuit 221 in one plug-in unit 220 may be calculated in accordance with the following Expression.

$Th$/1 unit [bps]=a transmission rate [bps]/the number of connected receiving end circuits [units] =222.2 [bps]/10 [units]=22.22 [bps]

On the other hand, in the receiving end circuits 221 according to the second embodiment, it is possible to set the rate of a clock in a case where, due to attachment of all the 10 plug-in units 220, all the receiving end circuits 221 are connected to the transmitting end circuit 211.

It is assumed that, for example, both the undefined time periods Tr and Tf of the input signal are 0.7 [mS], both the H level protection time period and the L level protection time period are 0.7 [mS], and the margin is 0.5 [mS]. The transmission rate of a signal in the transmission apparatus 100 in this case is calculated as follows by using the above-mentioned Expression (1).

$Th$ [bps]=1/($Tr$ [S]+an $H$ level protection time period [S]+$Tf$ [S]+an $L$ level protection time period [S]+a margin [S])=1/(0.7 [ms]+0.7 [mS]+0.7 [mS]+0.7 [mS]+0.5 [mS])≈303.0 [bps]

In a case where the receiving end circuits 221 in all the 10 plug-in units 220 are connected to the transmitting end circuit 211, the average of transmission rates of signals receivable by the receiving end circuit 221 in one plug-in unit 220 may be calculated in accordance with the following Expression.

$Th$/1 unit [bps]=a transmission rate [bps]/the number of connected receiving end circuits [units] =303.0 [bps]/10 [units]=30.30 [bps]

In this way, according to the second embodiment, in a case where all the receiving end circuits 221 are connected to the transmitting end circuit 211, it is possible to improve a transmission signal amount receivable by one receiving end circuit 221.

In this regard, however, the transmission rate of a signal in a case where only one receiving end circuit 221 is connected, in other words, in a case where the voltage level of a reflection noise becomes a maximum becomes equal to, for example, that of the digital signal transmission circuit of the related art. If it is assumed that, for example, both the undefined time periods Tr and Tf of the input signal are measured as 1 [mS] and the margin is 0.5 [mS], 222.2 [bps] is calculated in accordance with the same calculation expression as the above-mentioned Expression (2).

In this way, only in a case where one receiving end circuit 221 is connected and the voltage level of a reflection noise becomes a maximum, a transmission rate receivable by the corresponding receiving end circuit 221 becomes 222.2 [bps] and becomes equal to that of the digital signal transmission circuit of the related art. On the other hand, in a case where, for example, at least 2 receiving end circuits 221 are connected to the transmitting end circuit 211, it is possible to improve the transmission rate, compared with the digital signal transmission circuit of the related art.

Figure 12A:
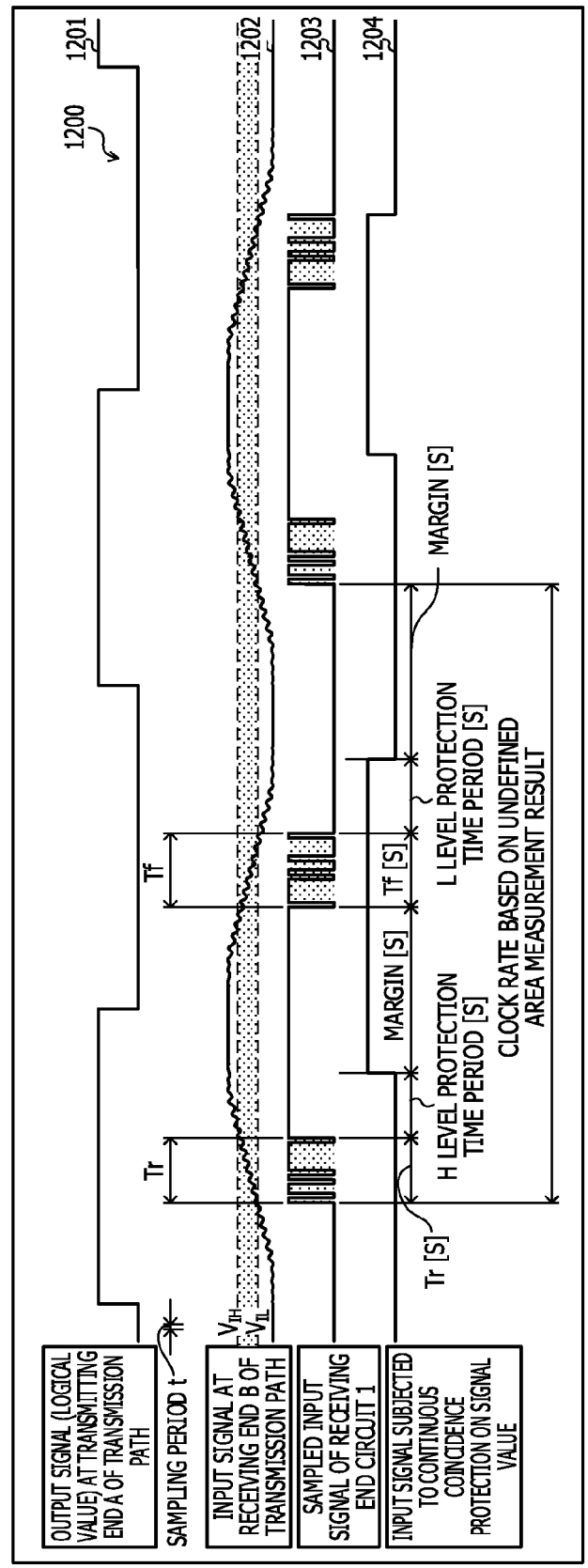
FIG. 12A and FIG. 12B are diagrams illustrating comparative examples of a signal waveform of the second embodiment and a signal waveform of the related art.
Figure 12B:
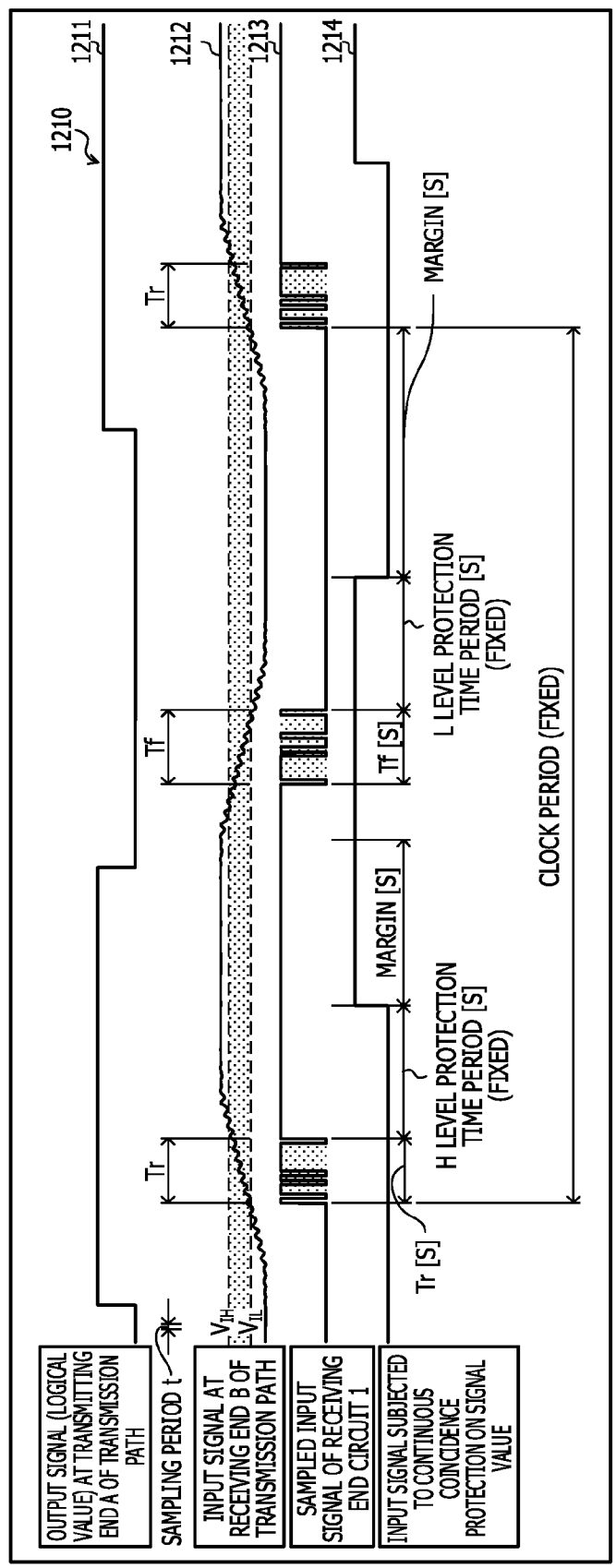

FIG. 12A and FIG. 12B are diagrams illustrating comparative examples of a signal waveform of the second embodiment and a signal waveform of the related art. In FIG. 12A, an example of an operation 1200 indicates a waveform of a signal of the second embodiment. In FIG. 12B, an example of an operation 1210 indicates a waveform of a signal of the related art.

Output signals 1201 and 1211 each indicate the logical value of an output signal at the transmitting end A of the transmitting end circuit 211. Input signals 1202 and 1212 each indicate an input signal at the receiving end B of the corresponding receiving end circuit 221. Input signals 1203 and 1213 each indicate a sampled input signal in the corresponding receiving end circuit 221.

Input signals 1204 and 1214 each indicate an input signal whose signal value is subjected to the continuous coincidence protection.

The H level protection time period and the L level protection time period in the input signal 1214 in the example of an operation 1210 are certain values preliminarily set under the assumption of a condition in which the voltage level of a reflection noise becomes a maximum. On the other hand, the H level protection time period of the input signal 1204 in the example of an operation 1200 is calculated based on a measurement result of the undefined time period Tr of an input signal. The H level protection time period of the input signal 1204 is a time period equal to, for example, a measurement result of the undefined time period Tr of the input signal. As seen from a comparison with the H level protection time period of the input signal 1214, the H level protection time period of the input signal 1204 may be set to an H level protection time period shorter than the input signal 1214.

The L level protection time period of the input signal 1204 is calculated based on a measurement result of the undefined time period Tf of the input signal. The L level protection time period of the input signal 1204 is a time period equal to, for example, a measurement result of the undefined time period Tf of the input signal. As seen from a comparison with the L level protection time period of the input signal 1214, the L level protection time period of the input signal 1204 may be set to an L level protection time period shorter than the input signal 1214.

As seen from a comparison between the input signal 1204 and the input signal 1214, the input signal 1204 has a shorter period of switching between the H level and the L level than the input signal 1214. Therefore, the clock rate of the output signal 1201 may be increased compared with the clock rate of the output signal 1211.

In the second embodiment, in accordance with the undefined time periods Tr and Tf of an input signal, which change due to a state of a bus connection between the transmitting end circuit 211 and the corresponding receiving end circuit 221, the protection time periods in the corresponding receiving end circuit 221 and the rate of a signal in the transmitting end circuit 211 are controlled. From this, it is possible to set a transmission rate according to a connection state between the motherboard 210 and the corresponding plug-in unit 220. It is possible to shorten the protection time periods in, for example, the corresponding receiving end circuit 221, and it is possible to increase the rate of a signal in the transmitting end circuit 211. Therefore, it is possible to increase a transmission amount per unit time, and it is possible to improve a transmission rate.

First Example of Modification

Figure 13:
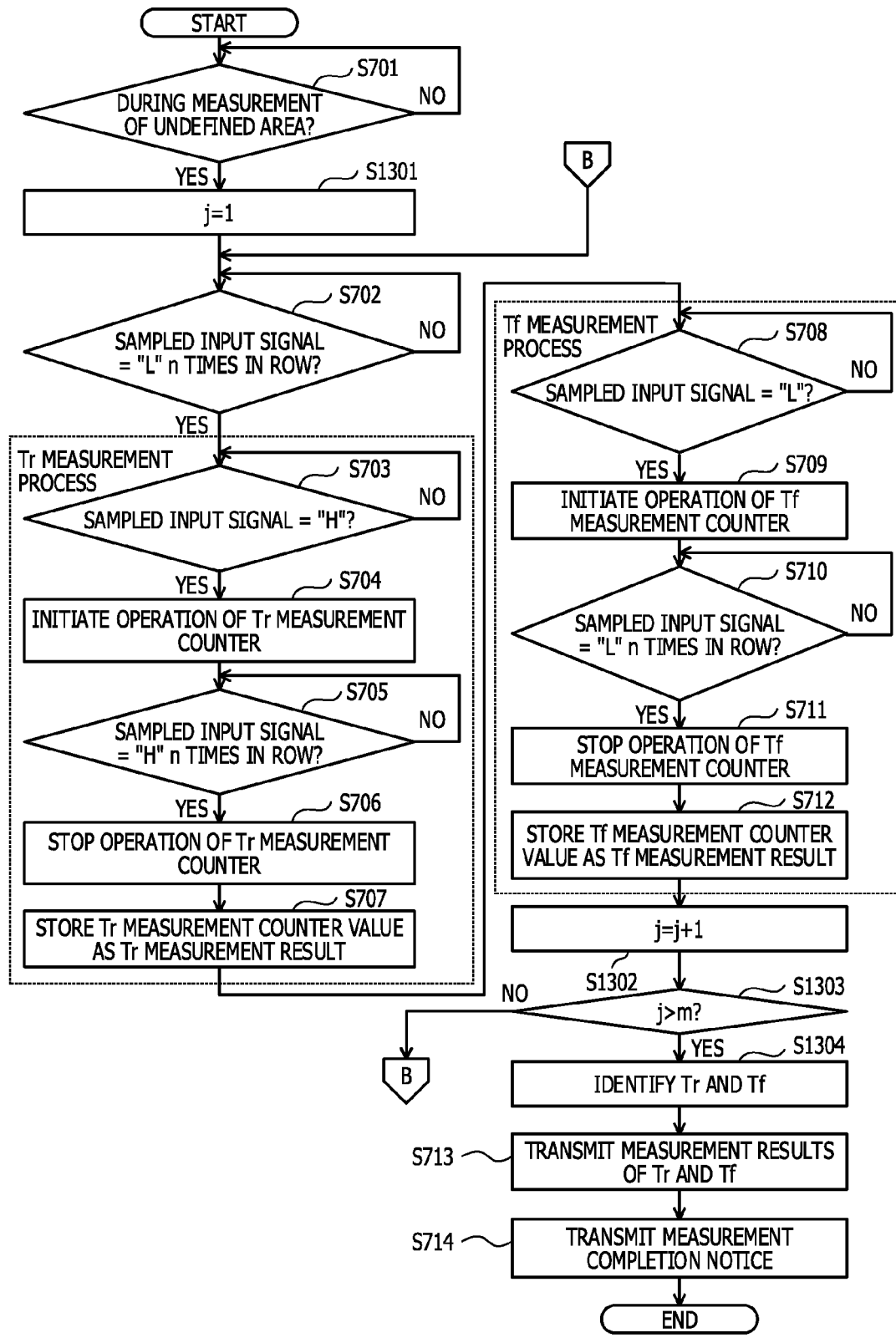
FIG. 13 is a flowchart illustrating a first example of a modification to an operation of identifying an undefined time period of an input signal.

FIG. 13 is a flowchart illustrating a first example of a modification to the operation of identifying an undefined time period of an input signal. In the first example of a modification, illustrated in FIG. 13, there will be described a case where the undefined area measurement circuit 303 in, for example, the receiving end circuit 221 whose transmission distance from the transmitting end circuit 211 is a minimum on the common signal line 212a measures the undefined time periods Tr and Tf of an input signal more than once. In individual processing operations illustrated in FIG. 13, the same symbol is assigned to the same processing operation as a processing operation illustrated in FIG. 7, and processing operations different from the processing operations illustrated in FIG. 7 will be described.

In FIG. 13, in a case where an operation mode of the operation mode setting circuit 302 is an operation mode of "during measurement of an undefined area" (S701: Yes), the corresponding undefined area measurement circuit 303 sets "1" in "j" indicating a value of one of "1 to m" of the number m of times a measurement is made (S1301). The number m of times a measurement is made is the arbitrary number of times.

After S712, the corresponding undefined area measurement circuit 303 adds "1" to "j" (S1302) and determines whether or not "j" is greater than the number m of times a measurement is made (S1303). In a case where "j" is less than or equal to the number m of times a measurement is made (S1303: No), the corresponding undefined area measurement circuit 303 makes a transition to S702. In a case where "j" is greater than the number m of times a measurement is made (S1303: Yes), the corresponding undefined area measurement circuit 303 identifies the undefined time period Tr corresponding to a maximum time period from among m measurement results of the undefined time period Tr of the input signal and identifies the undefined time period Tf corresponding to a maximum time period from among m measurement results of the undefined time period Tf of the input signal (S1304). After that, the corresponding undefined area measurement circuit 303 makes a transition to S713.

According to the first example of a modification, it is possible to set protection time periods according to the maximum undefined time periods Tr and Tf of the input signal from among the undefined time periods Tr and Tf of the input signal, measured more than once. In addition, in the transmitting end circuit 211, it is possible to set the rate of a signal according to the maximum undefined time periods Tr and Tf of the input signal. Accordingly, since it is possible to improve a transmission rate while suppressing erroneous determination of a signal level, it is possible to improve communication quality.

Second Example of Modification

Figure 14:
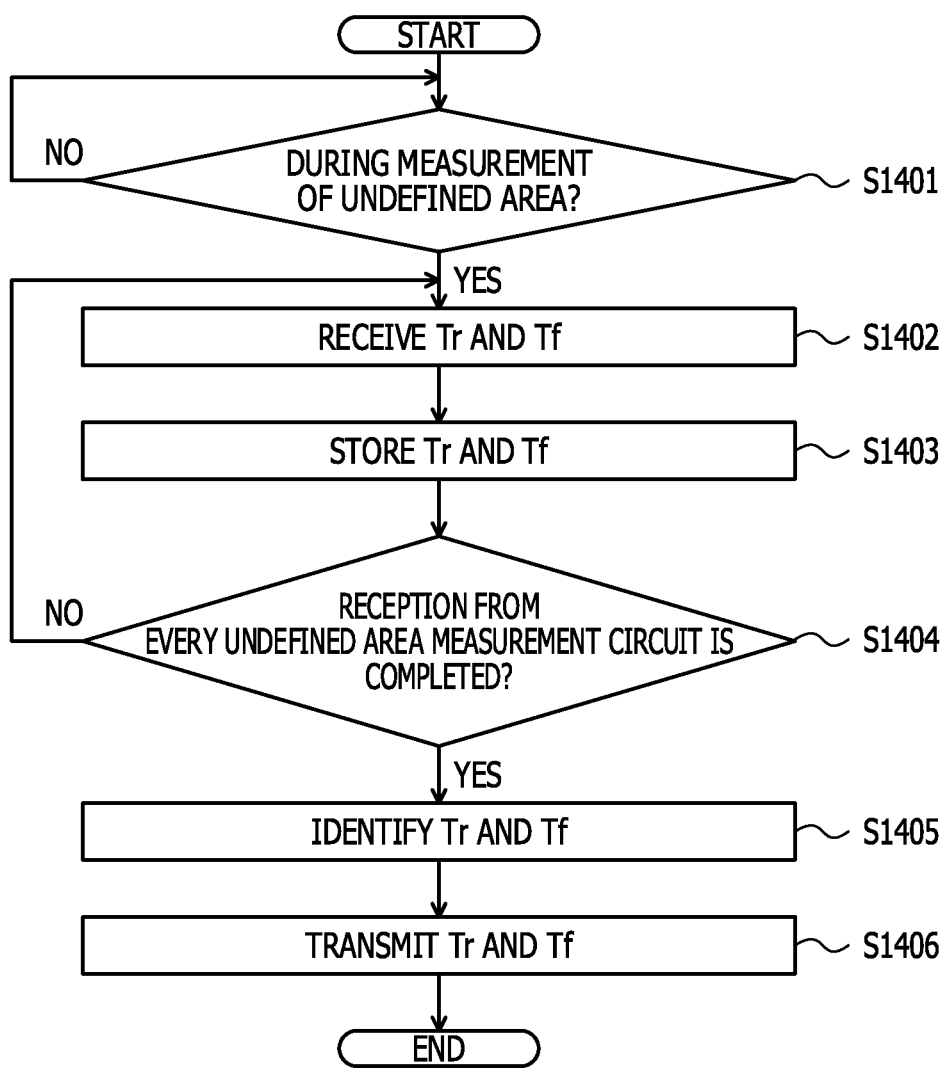
FIG. 14 is a flowchart illustrating a second example of a modification to the operation of identifying an undefined time period of an input signal.

FIG. 14 is a flowchart illustrating a second example of a modification to the operation of identifying an undefined time period of an input signal. In the second example of a modification, illustrated in FIG. 14, a case where the undefined time periods Tr and Tf of an input signal of each of the plug-in units 220 connected to the motherboard 210 are measured will be described. In the second example of a modification, it is assumed that, in the undefined area measurement circuit 303 in each of the plug-in units 220, the individual operations of the flowchart illustrated in, for example, FIG. 7 are performed. While it is assumed that a performance subject of the present flowchart is, for example, one of the receiving end circuits 221, the performance subject thereof may be the transmitting end circuit 211.

In FIG. 14, the corresponding receiving end circuit 221 determines whether or not the operation mode of the corresponding operation mode setting circuit 302 is "during measurement of an undefined area" (S1401). The corresponding receiving end circuit 221 waits until the operation mode becomes "during measurement of an undefined area" (S1401: No). If the operation mode becomes "during measurement of an undefined area" (S1401: Yes), the corresponding receiving end circuit 221 receives the undefined time periods Tr and Tf of an input signal from the undefined area measurement circuit 303 in each of the plug-in units 220 (S1402).

Next, the corresponding receiving end circuit 221 stores the undefined time periods Tr and Tf of a received input signal (S1403). Next, the corresponding receiving end circuit 221 determines whether or not the undefined time periods Tr and Tf of an input signal is received from every undefined area measurement circuit 303 (S1404). In a case where it is determined that the undefined time periods Tr and Tf of an input signal is not received from every undefined area measurement circuit 303 (S1404: No), the corresponding receiving end circuit 221 makes a transition to S1402.

In a case where it is determined that the undefined time periods Tr and Tf of an input signal is received from every undefined area measurement circuit 303 (S1404: Yes), the corresponding receiving end circuit 221 identifies the undefined time period Tr of an input signal and the undefined time period Tf of an input signal, which correspond to respective maximum time periods (S1405). In S1405, the corresponding receiving end circuit 221 identifies the undefined time period Tr of an input signal and the undefined time period Tf of an input signal, which correspond to respective maximum time periods, from among, for example, stored measurement results of the undefined time periods Tr and Tf of input signals. Next, the receiving end circuit 221 transmits the identified undefined time period Tr of an input signal and the identified undefined time period Tf of an input signal to the clock generation circuit 311 in the transmitting end circuit 211 and the continuous coincidence protection circuit 304 in each of the receiving end circuits 221 (S1406) and terminates a series of processing operations.

According to the second example of a modification, it is possible to set protection time periods according to the maximum undefined time period Tr of an input signal and the maximum undefined time period Tf of an input signal from among the undefined time periods Tr and Tf of input signals of the individual receiving end circuits 221. In addition, in the transmitting end circuit 211, it is possible to set the rate of a signal according to the maximum undefined time period Tr of an input signal and the maximum undefined time period Tf of an input signal. Accordingly, since it is possible to improve a transmission rate while suppressing erroneous determination of a signal level, it is possible to improve communication quality.

In addition, in the second example of a modification, it is assumed that the individual operations of the flowchart illustrated in FIG. 7 are performed in the undefined area measurement circuit 303 in each of the plug-in units 220. However, it may be assumed that the individual operations of the flowchart illustrated in FIG. 13 are performed therein. In other words, the maximum undefined time periods Tr and Tf of an input signal out of the undefined time periods Tr and Tf of an input signal measured more than once in the undefined area measurement circuits 303 in each of the plug-in units 220 are received, and from thereamong, the maximum undefined time period Tr of an input signal and the maximum undefined time period Tf of an input signal may be further identified. From this, it is possible to set the protection time periods according to the maximum undefined time period Tr of an input signal and the maximum undefined time period Tf of an input signal. Therefore, it is possible to further improve communication quality.

Third Embodiment

Next, the third embodiment of the transmission apparatus 100 will be described. While, in the above-mentioned second embodiment, the continuous coincidence protection time periods are set using the continuous coincidence protection circuit 304, a case where the mask protection time period is set using a signal change point mask pulse generation circuit will be described in the third embodiment. In the third embodiment, portions different from the first and second embodiments will be described.

Figure 15:
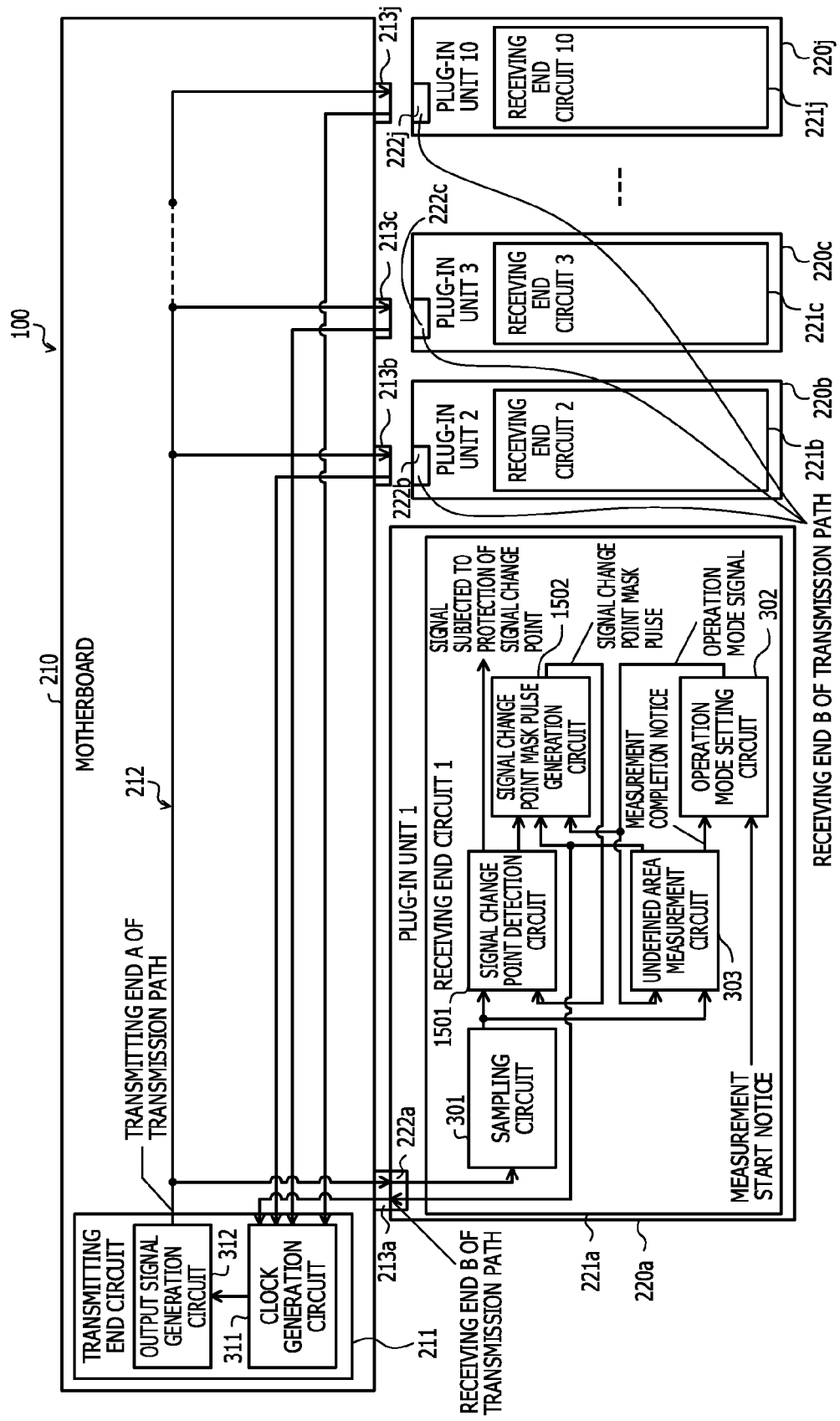
FIG. 15 is a diagram illustrating an example of a circuit configuration of a transmission apparatus according to a third embodiment.

FIG. 15 is a diagram illustrating an example of a circuit configuration of a transmission apparatus according to the third embodiment. As illustrated in FIG. 15, the receiving end circuit 221 in each of the plug-in units 220 includes the sampling circuit 301, the operation mode setting circuit 302, the undefined area measurement circuit 303, a signal change point detection circuit 1501, and a signal change point mask pulse generation circuit 1502.

The sampling circuit 301 samples a signal output from the transmitting end A of the transmitting end circuit 211 and outputs a sampled input signal to the signal change point detection circuit 1501 and the undefined area measurement circuit 303.

The sampled input signal output by the sampling circuit 301 and a signal change point mask pulse output by the signal change point mask pulse generation circuit 1502 are input to the signal change point detection circuit 1501. The signal change point detection circuit 1501 includes a latch circuit. Using the signal change point mask pulse output by the signal change point mask pulse generation circuit 1502, the signal change point detection circuit 1501 performs protection on a signal change point of a signal output by the sampling circuit 301 and outputs the signal subjected to the protection of the signal change point to a signal processing circuit located at a subsequent stage.

Using the signal output by the sampling circuit 301 and the signal change point mask pulse output by the signal change point mask pulse generation circuit 1502, the signal change point detection circuit 1501 generates a signal change point detection pulse. In addition, the signal change point detection circuit 1501 outputs the generated signal change point detection pulse to the signal change point mask pulse generation circuit 1502.

Upon receiving a measurement start notice, the operation mode setting circuit 302 transitions from the operation mode of "during no measurement of an undefined area" to the operation mode of "during measurement of an undefined area". In addition, the operation mode setting circuit 302 outputs an operation mode signal indicating the operation mode to the undefined area measurement circuit 303 and the signal change point mask pulse generation circuit 1502. If measurements of the undefined time periods Tr and Tf of the input signal are completed, the undefined area measurement circuit 303 transmits measurement results to the clock generation circuit 311 and the signal change point mask pulse generation circuit 1502.

Using the measurement results of the undefined time periods Tr and Tf of the input signal, output by the undefined area measurement circuit 303, "during measurement of an undefined area" indicated by the operation mode signal from the operation mode setting circuit 302, the signal change point mask pulse generation circuit 1502 generates the signal change point mask pulse.

The signal change point detection pulse output by the signal change point detection circuit 1501, the measurement results output by the undefined area measurement circuit 303, and the operation mode signal output by the operation mode setting circuit 302 are input to the signal change point mask pulse generation circuit 1502. Using the measurement results output by the undefined area measurement circuit 303 in the operation mode of "during measurement of an undefined area" and the signal change point detection pulse output by the signal change point detection circuit 1501, the signal change point mask pulse generation circuit 1502 generates the signal change point mask pulse. The signal change point mask pulse generation circuit 1502 outputs the generated signal change point mask pulse to the signal change point detection circuit 1501.

Using measurement results of the undefined time periods Tr and Tf of an input signal, due to a reflection noise generated at each of the receiving ends B, the signal change point mask pulse generation circuit 1502 calculates an H level signal mask protection time period and an L level signal mask protection time period. In what follows, the H level signal mask protection time period is called the "H level protection time period". In addition, the L level signal mask protection time period is called the "L level protection time period". For example, the signal change point mask pulse generation circuit 1502 outputs the H level during the H level protection time period regardless of the level of an input signal and outputs a signal corresponding to the level of the input signal after the elapse of the H level protection time period. In addition, the signal change point mask pulse generation circuit 1502 outputs the L level during the L level protection time period regardless of the level of the input signal and outputs a signal corresponding to the level of the input signal after the elapse of the L level protection time period.

In this way, the transmission apparatus 100 outputs certain levels during the undefined time periods Tr and Tf of an input signal. Therefore, even if a signal is disturbed, it is possible to avoid switching of the level of a signal output by the signal change point mask pulse generation circuit 1502. Therefore, it is possible to suppress erroneous determination of a signal level, due to, for example, a disturbed signal, and it is possible to suppress an incorrect operation of each of the receiving end circuits 221.

The acquisition unit 111 illustrated in FIG. 1 is realized by, for example, the undefined area measurement circuit 303. The first control unit 112 illustrated in FIG. 1 is realized by the signal change point detection circuit 1501 and the signal change point mask pulse generation circuit 1502. The second control unit 113 illustrated in FIG. 1 is realized by the undefined area measurement circuit 303. The undefined area measurement circuit 303 transmits, to the clock generation circuit 311, for example, a signal that includes the undefined time periods Tr and Tf of the input signal and that instructs to adjust the clock signal in accordance with the measurement results, thereby realizing the function of the second control unit 113.

Here, the transmission rate Th of a signal in a case of using the signal change point mask pulse generation circuit 1502 is calculated in accordance with the following Expression (3).

$$Th \text{ [bps]} = 1/(\text{an } H \text{ level protection time period [S]} + \text{an } L \text{ level protection time period [S]} + \text{a margin [S]}) \quad (3)$$

The above-mentioned Expression (3) will be described using FIG. 16.

Figure 16:
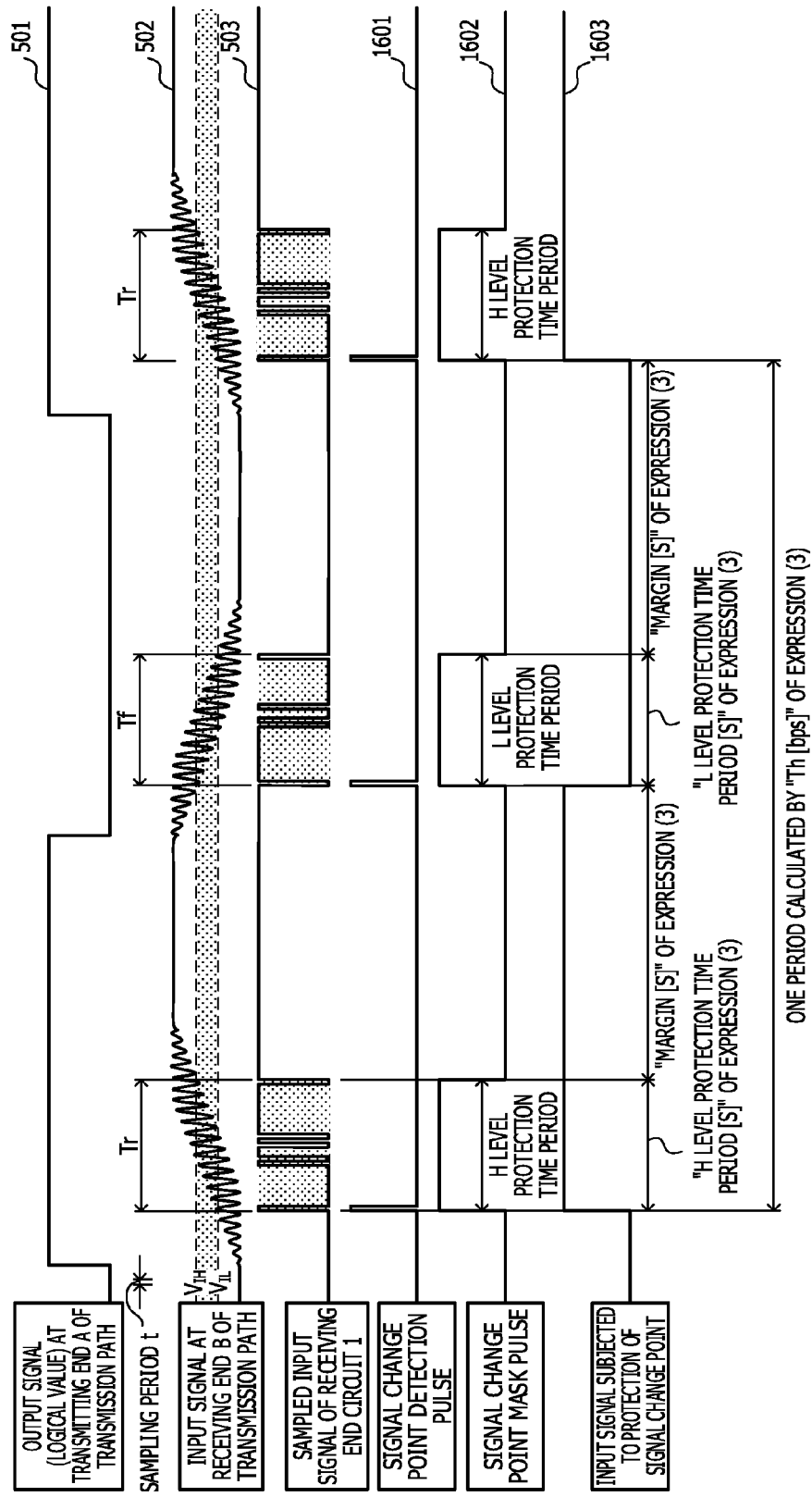
FIG. 16 is a diagram illustrating an example of a waveform of a signal transmitted by a transmitting end circuit of the third embodiment and an example of a waveform of a signal received by a receiving end circuit of the third embodiment.

FIG. 16 is a diagram illustrating an example of a waveform of a signal transmitted by a transmitting end circuit of the third embodiment and an example of a waveform of a signal received by a receiving end circuit of the third embodiment. In FIG. 16, a signal change point detection pulse 1601 is a pulse indicating detection of a signal change point and is a pulse indicating starts of the undefined time periods Tr and Tf of an input signal in, for example, the input signal 503.

A signal change point mask pulse 1602 is a pulse indicating the H level protection time period or the L level protection time period. The H level protection time period is a time period determined by the undefined time period Tr of an input signal and is, for example, a time period equal to the undefined time period Tr of the input signal. The L level protection time period is a time period determined by the undefined time period Tf of the input signal and is, for example, a time period equal to the undefined time period Tf of the input signal.

An input signal 1603 subjected to protection of a signal change point indicates an input signal subjected to protection of the signal change point. If rise-up of the signal change point detection pulse 1601 occurs in a state in which the L level continues, the input signal 1603 subjected to protection of a signal change point switches to the H level simultaneously with the rise-up. During the H level protection time period after switching to the H level, the input signal 1603 subjected to protection of a signal change point holds the H level regardless of the level of the sampled input signal. If rise-up of the signal change point detection pulse 1601 occurs after the elapse of the H level protection time period [S] and the margin [S] in a state in which the H level continues, the input signal 1603 subjected to protection of a signal change point switches to the L level simultaneously with the rise-up.

During the L level protection time period after switching to the L level, the input signal 1603 subjected to protection of a signal change point holds the L level regardless of the level of the sampled input signal. If rise-up of the signal change point detection pulse 1601 occurs after the elapse of the L level protection time period [S] and the margin [S] in a state in which the L level continues, the input signal 1603 subjected to protection of a signal change point switches to the H level simultaneously with the rise-up. After this, in the same way, the input signal 1603 subjected to protection of a signal change point switches between the H level and the L level.

Figure 17:
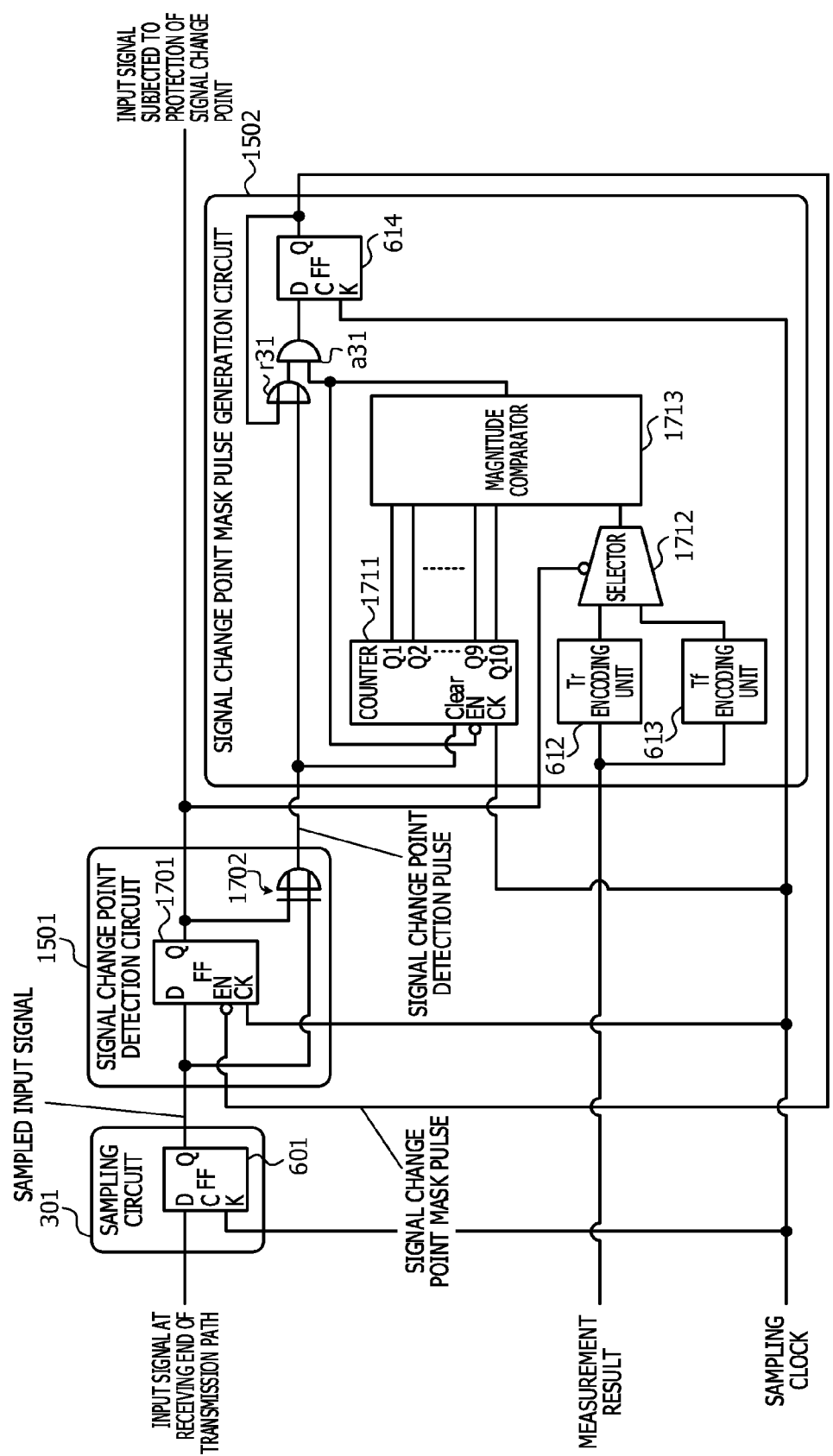
FIG. 17 is a diagram illustrating examples of hardware configurations of a sampling circuit, a latch circuit, and a mask pulse generation circuit.

FIG. 17 is a diagram illustrating examples of hardware configurations of a sampling circuit, a latch circuit, and a mask pulse generation circuit. As illustrated in FIG. 17, the flip-flop circuit 601 in the sampling circuit 301 transmits an output signal to the signal change point detection circuit 1501.

The signal change point detection circuit 1501 includes a flip-flop circuit 1701 and a logic circuit 1702. The signal output by the flip-flop circuit 601 and a sampling clock are input to the flip-flop circuit 1701. A signal change point mask pulse for enabling, sent from the flip-flop circuit 614 in the signal change point mask pulse generation circuit 1502, is input to the flip-flop circuit 1701 in an inverted manner.

Using the signal output by the flip-flop circuit 601, the signal change point mask pulse input by the flip-flop circuit 614 in an inverted manner, and the sampling clock, the flip-flop circuit 1701 performs protection of a signal change point. The flip-flop circuit 1701 output a signal subjected of the protection of a signal change point to the logic circuit 1702, the signal change point mask pulse generation circuit 1502, and a signal processing circuit located at a subsequent stage.

The signal output by the flip-flop circuit 601 and the signal output by the flip-flop circuit 1701 are input to the logic circuit 1702. The logic circuit 1702 is a circuit of exclusive OR. Based on the input signals, the logic circuit 1702 generates a signal change point detection pulse and outputs the generated signal change point detection pulse to the signal change point mask pulse generation circuit 1502.

The signal change point mask pulse generation circuit 1502 includes a counter 1711, a selector 1712, a magnitude comparator 1713, the Tr encoding unit 612, and the Tf encoding unit 613. The signal change point mask pulse generation circuit 1502 includes the OR circuit r31, the AND circuit a31, and the flip-flop circuit 614.

The signal change point detection pulse output by the logic circuit 1702 and the sampling clock are input to the counter 1711. The counter 1711 clears the input signal change point detection pulse. A signal for enabling, output by the magnitude comparator 1713, is input to the counter 1711 in an inverted manner. Based on various kinds of input signals, the counter 1711 outputs output signals of Q1 to Q10 to the magnitude comparator 1713.

The Tr encoding unit 612 encodes a signal indicating, for example, the measurement result of the undefined time period Tr of the input signal and outputs an encoded signal to the selector 1712. The Tf encoding unit 613 encodes a signal indicating, for example, the measurement result of the undefined time period Tf of the input signal and outputs an encoded signal to the selector 1712.

The input signal subjected to the protection of a signal change point, sent by the flip-flop circuit 1701, is input to the selector 1712 in an inverted manner. The signal output by the Tr encoding unit 612 and the signal output by the Tf encoding unit 613 are input to the selector 1712. Using the signal subjected to the protection of a signal change point and input in an inverted manner, the selector 1712 selects one of the signal output by the Tr encoding unit 612 and the signal output by the Tf encoding unit 613. In addition, the selector 1712 outputs a selected signal to the magnitude comparator 1713.

The signal output by the counter 1711 and the signal output by the selector 1712 are input to the magnitude comparator 1713. The magnitude comparator 1713 performs, for example, amplitude comparisons between various kinds of input signals and outputs a signal indicating a comparison result to the counter 1711 and the AND circuit a31.

Using the signal change point detection pulse output by the logic circuit 1702 and the signal output by the flip-flop circuit 614, the OR circuit r31 outputs, to the AND circuit a31, a signal indicating the H level or the L level. Using the signals output by the magnitude comparator 1713 and the OR circuit r31, the AND circuit a31 outputs, to the flip-flop circuit 614, a signal indicating the H level or the L level.

Using the signal output by the AND circuit a31 and the sampling clock, the flip-flop circuit 614 generates a signal change point mask pulse. The flip-flop circuit 614 outputs the generated signal change point mask pulse to the OR circuit r31 and the flip-flop circuit 1701 in the signal change point detection circuit 1501.

Based on such a sampling circuit 301, a signal change point detection circuit 1501, and a signal change point mask pulse generation circuit 1502, in the determination of a signal level during the undefined time periods Tr and Tf of the input signal during which a signal is disturbed, it is possible to avoid switching of a level. Therefore, it is possible to suppress erroneous determination of a signal level during the undefined time periods Tr and Tf of the input signal, and it is possible to suppress an incorrect operation of each of the receiving end circuits 221.

Figure 18:
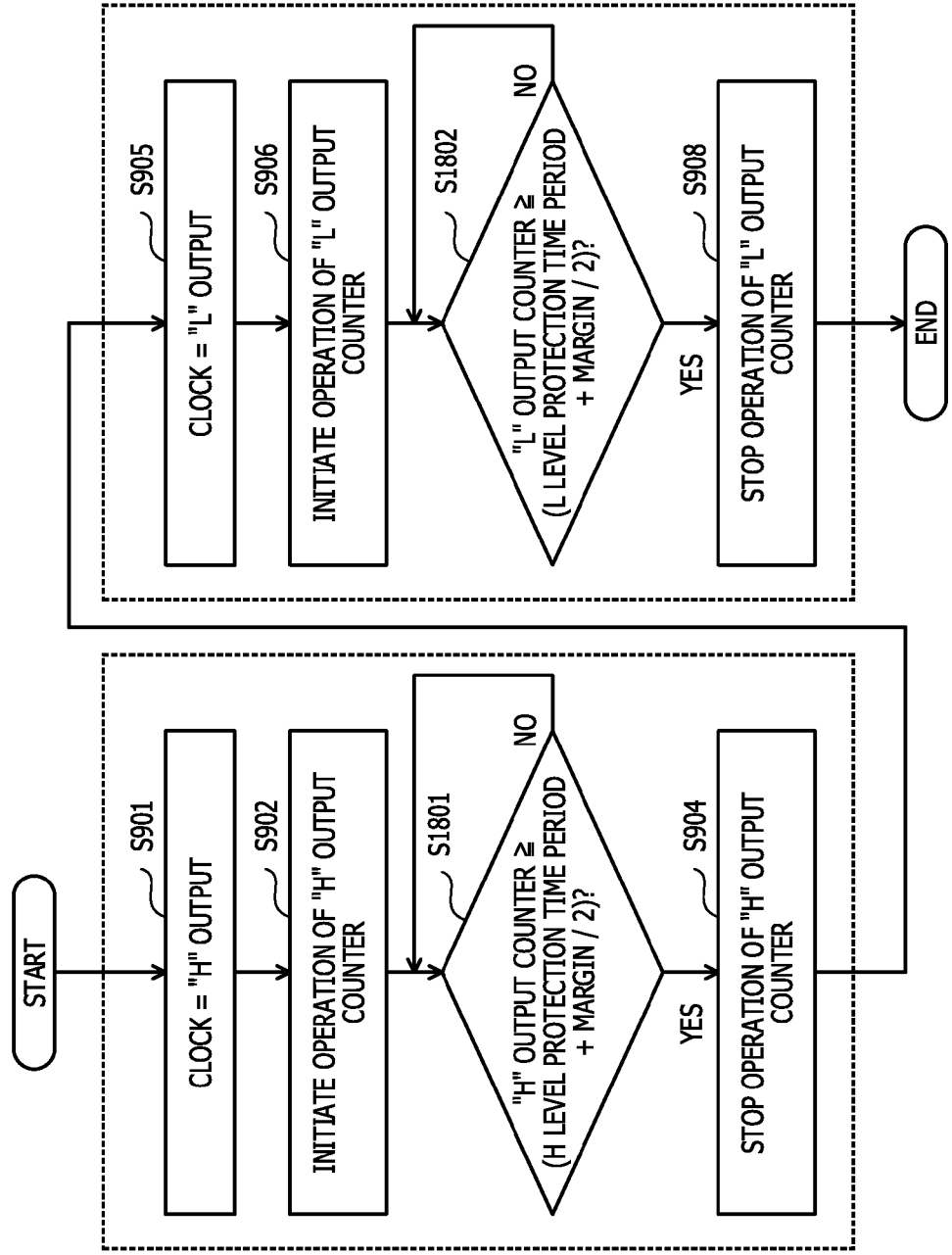
FIG. 18 is a flowchart illustrating an example of an operation of a clock generation circuit according to the third embodiment.

FIG. 18 is a flowchart illustrating an example of an operation of a clock generation circuit according to the third embodiment. In individual processing operations illustrated in FIG. 18, the same symbol is assigned to the same processing operation as a processing operation illustrated in FIG. 9, and processing operations different from the processing operations illustrated in FIG. 9 will be described.

As illustrated in FIG. 18, after S902, the clock generation circuit 311 determines whether or not the output counter of the H level is greater than or equal to a value obtained by adding the H level protection time period and a half of the margin (S1801). The clock generation circuit 311 waits until the output counter of the H level becomes greater than or equal to a value obtained by adding the H level protection time period and a half of the margin (S1801: No). If the output counter of the H level becomes greater than or equal to a value obtained by adding the H level protection time period and a half of the margin (S1801: Yes), the clock generation circuit 311 make a transition to S904.

After S906, the clock generation circuit 311 determines whether or not the output counter of the L level is greater than or equal to a value obtained by adding the L level protection time period and a half of the margin (S1802). The clock generation circuit 311 waits until the output counter of the L level becomes greater than or equal to a value obtained by adding the L level protection time period and a half of the margin (S1802: No). If the output counter of the L level becomes greater than or equal to a value obtained by adding the L level protection time period and a half of the margin (S1802: Yes), the clock generation circuit 311 make a transition to S908.

Next, comparative examples of transmission rates of the third embodiment and the related art will be described. First, in a digital signal transmission circuit of the related art, the rate of a clock is preliminarily calculated under the assumption of a condition in which a voltage level of a reflection noise becomes a maximum.

It is assumed that, for example, both the undefined time periods Tr and Tf of the input signal are 1 [mS], both the H level protection time period and the L level protection time period are 1 [mS], and the margin is 0.5 [mS]. In this case, the transmission rate Th of a signal in the digital signal transmission circuit of the related art is calculated as follows by using the above-mentioned Expression (3).

$$Th\ [bps]=1/(\text{an } H \text{ level protection time period [S]}+\text{an } L \text{ level protection time period [S]}+\text{a margin [S]})=1/(1\ [mS]+1\ [mS]+0.5\ [mS])=400\ [bps] \quad (4)$$

In a case where, due to attachment of all the 10 plug-in units 220, all the receiving end circuits 221 are connected to the transmitting end circuit 211, the average of transmission rates of signals receivable by one receiving end circuit may be calculated in accordance with the following Expression.

$$Th/1\ \text{unit [bps]}=\text{a transmission rate [bps]/the number of connected receiving end circuits [units]}=400\ [bps]/10\ [units]=40\ [bps]$$

On the other hand, in the receiving end circuits 221 according to the third embodiment, it is possible to set the rate of a clock in a case where, due to attachment of all the 10 plug-in units 220, all the receiving end circuits 221 are connected to the transmitting end circuit 211.

It is assumed that, for example, both the undefined time periods Tr and Tf of the input signal are 0.7 [mS], both the H level protection time period and the L level protection time period are 0.7 [mS], and the margin is 0.5 [mS]. The transmission rate of a signal in the transmission apparatus 100 in this case is calculated as follows by using the above-mentioned Expression (3).

$$Th\ [bps]=1/(\text{an } H \text{ level protection time period [S]}+\text{an } L \text{ level protection time period [S]}+\text{a margin [S]})=1/(0.7\ [ms]+0.7\ [mS]+0.5\ [mS])\approx 526\ [bps]$$

In a case where the receiving end circuits 221 in all the 10 plug-in units 220 are connected to the transmitting end circuit 211, the average of transmission rates of signals receivable by the receiving end circuit 221 in one plug-in unit 220 may be calculated in accordance with the following Expression.

$$Th/1\ \text{unit [bps]}=\text{a transmission rate [bps]/the number of connected receiving end circuits [units]}=526\ [bps]/10\ [units]=52.6\ [bps]$$

In this way, according to the third embodiment, in a case where all the receiving end circuits 221 are connected to the transmitting end circuit 211, it is possible to improve a transmission signal amount receivable by one receiving end circuit 221.

In this regard, however, the transmission rate of a signal in a case where only one receiving end circuit 221 is connected, in other words, in a case where the voltage level of a reflection noise becomes a maximum becomes equal to, for example, that of the digital signal transmission circuit of the related art. If it is assumed that, for example, both the undefined time periods Tr and Tf of the input signal are measured as 1 [mS] and the margin is 0.5 [mS], 400 [bps] is calculated in accordance with the same calculation expression as the above-mentioned Expression (4).

In this way, only in a case where one receiving end circuit 221 is connected and the voltage level of a reflection noise becomes a maximum, a transmission rate receivable by the corresponding receiving end circuit 221 becomes 400 [bps] and becomes equal to that of the digital signal transmission circuit of the related art. On the other hand, in a case where, for example, at least 2 receiving end circuits 221 are connected to the transmitting end circuit 211, it is possible to improve the transmission rate, compared with the digital signal transmission circuit of the related art.

Figure 19A:
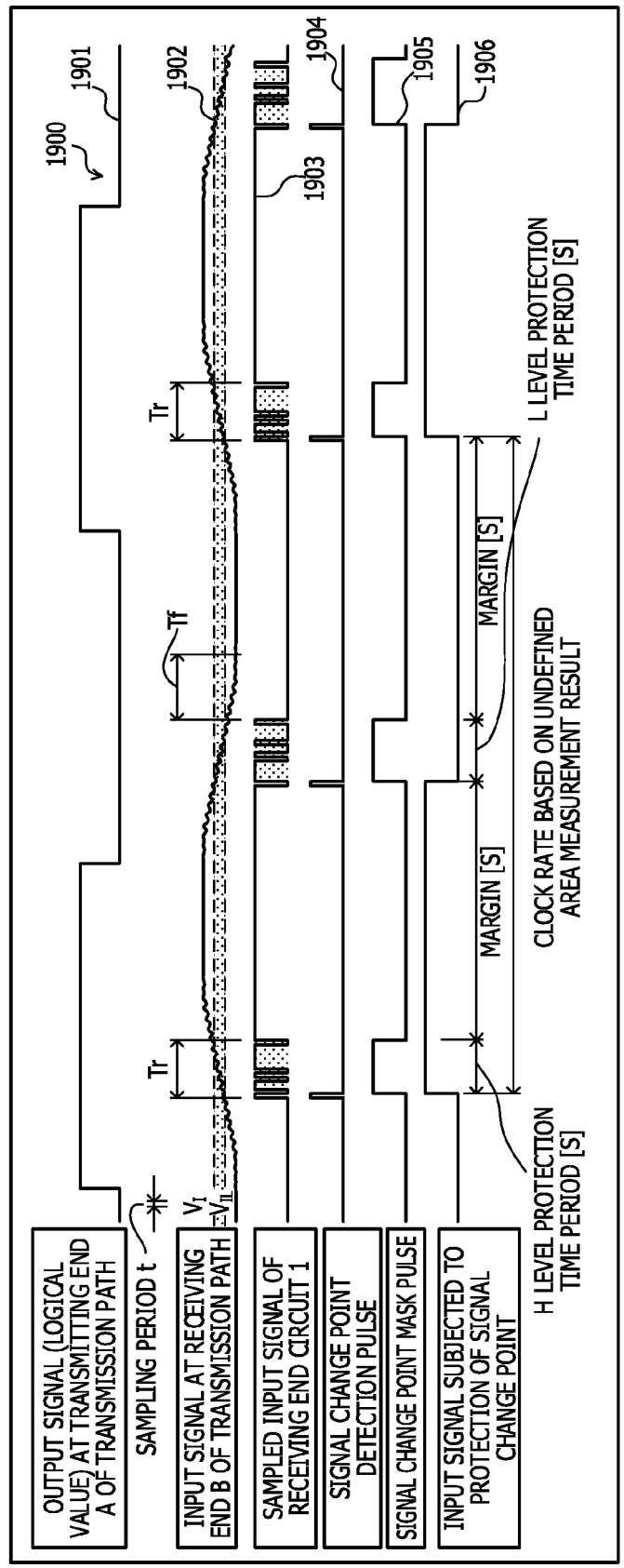
FIG. 19A and FIG. 19B are diagrams illustrating comparative examples of a signal waveform of the third embodiment and a signal waveform of the related art.
Figure 19B:
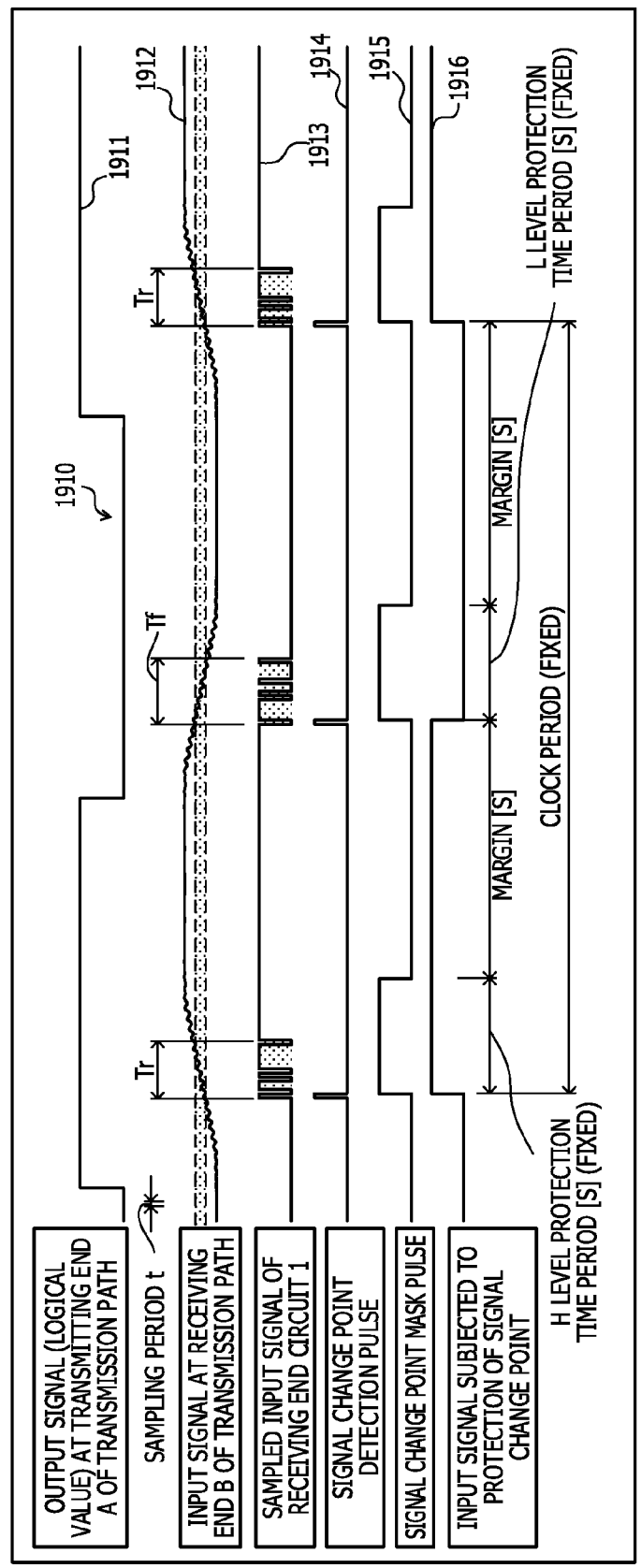

FIG. 19A and FIG. 19B are diagrams illustrating comparative examples of a signal waveform of the third embodiment and a signal waveform of the related art. In FIG. 19A, an example of an operation 1900 indicates a waveform of a signal of the third embodiment. In FIG. 19B, an example of an operation 1910 indicates a waveform of a signal of the related art.

Output signals 1901 and 1911 each indicate the logical value of an output signal at the transmitting end A of the transmitting end circuit 211. Input signals 1902 and 1912 each indicate an input signal at the receiving end B of the corresponding receiving end circuit 221. Input signals 1903 and 1913 each indicate a sampled input signal in the corresponding receiving end circuit 221.

Signal change point detection pulses 1904 and 1914 are pulses each indicating detection of a signal change point and are pulses each indicating, for example, the starts of the undefined time periods Tr and Tf of an input signal. Signal change point mask pulses 1905 and 1915 are pulses each indicating the H level protection time period or the L level protection time period. Input signals 1906 and 1916 subjected to protection of signal change points each indicate an input signal subjected to protection of a signal change point of a signal value.

The H level protection time period and the L level protection time period in the input signal 1916 subjected to protection of a signal change point are certain values preliminarily set under the assumption of a condition in which the voltage level of a reflection noise becomes a maximum. On the other hand, the H level protection time period of the signal change point mask pulse 1905 is calculated based on a measurement result of the undefined time period Tr of an input signal. The H level protection time period of the signal change point mask pulse 1905 is a time period equal to, for example, a measurement result of the undefined time period Tr of the input signal. The L level protection time period of the signal change point mask pulse 1905 is calculated based on a measurement result of the undefined time period Tf of the input signal. The L level protection time period of the signal change point mask pulse 1905 is a time period equal to, for example, a measurement result of the undefined time period Tf of the input signal.

As seen from a comparison with the signal change point mask pulse 1915, it is possible to set, in the signal change point mask pulse 1905, an H level protection time period shorter than the signal change point mask pulse 1915. As seen from a comparison with the signal change point mask pulse 1915, it is possible to set, in the signal change point mask pulse 1905, an L level protection time period shorter than the signal change point mask pulse 1915.

As seen from a comparison between the input signal 1906 subjected to protection of a signal change point and the input signal 1916 subjected to protection of a signal change point, the input signal 1906 subjected to protection of a signal change point has a shorter period of switching between the H level and the L level. Therefore, the clock rate of the output signal 1901 may be increased compared with the clock rate of the output signal 1911.

According to the third embodiment, it is possible to obtain the same effects as those in the first and second embodiments. In the third embodiment, protection time periods are set simultaneously with the starts of the undefined time periods Tr and Tf of an input signal. Therefore, compared with the period of the input signal 504 (see FIG. 5) after the continuous coincidence protection of the second embodiment, it is possible to shorten the period of the input signal 1603 (see FIG. 16) subjected to protection of a signal change point. It is possible to increase the rate of a signal, compared with the second embodiment. Therefore, it is possible to increase a transmission amount per unit time, and it is possible to further improve a transmission rate.

Fourth Embodiment

Next, the fourth embodiment of the transmission apparatus 100 will be described. While, in each of the second and third embodiments, a case where the operation mode setting circuit 302 and the undefined area measurement circuit 303 are included in the receiving end circuit 221 is described, a case of being included in the transmitting end circuit 211 will be described in the fourth embodiment. In the fourth embodiment, for example, a case where the predetermined communication apparatus 102a illustrated in the first embodiment is realized by the corresponding receiving end circuit 221 and the control apparatus 110 illustrated in the first embodiment is realized by the transmitting end circuit 211 will be described. In the fourth embodiment, portions different from the first to third embodiments will be described.

Figure 20:
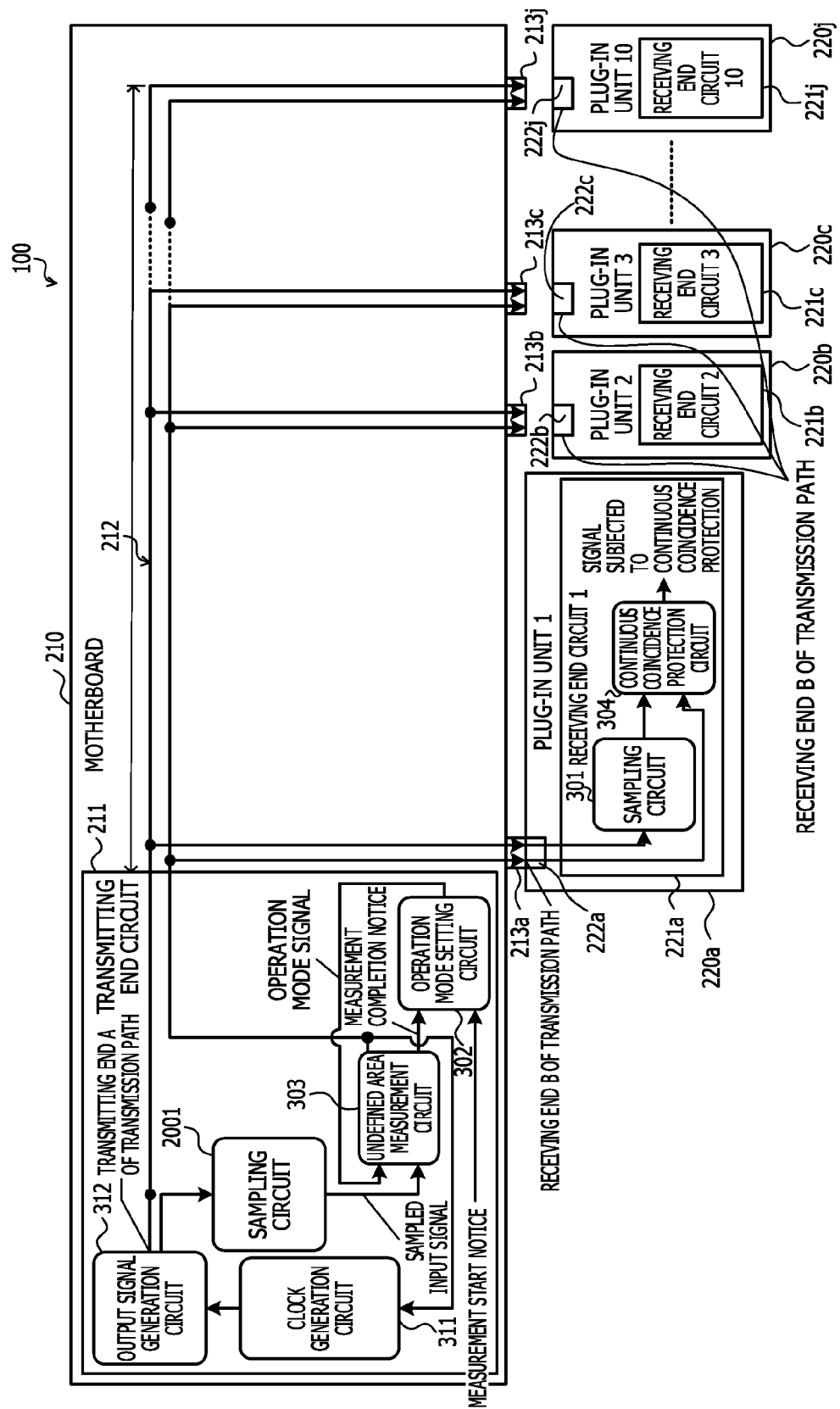
FIG. 20 is a diagram illustrating an example of a circuit configuration of a transmission apparatus according to a fourth embodiment.

FIG. 20 is a diagram illustrating an example of a circuit configuration of a transmission apparatus according to the fourth embodiment. As illustrated in FIG. 20, the transmitting end circuit 211 includes a sampling circuit 2001, the operation mode setting circuit 302, the undefined area measurement circuit 303, the clock generation circuit 311, and the output signal generation circuit 312.

Using the clock generated by the clock generation circuit 311, the output signal generation circuit 312 generates a signal and outputs the generated signal to the sampling circuit 301 in the corresponding receiving end circuit 221 and the sampling circuit 2001 in the transmitting end circuit 211. The sampling circuit 2001 samples a signal output by the output signal generation circuit 312 and outputs a sampled input signal to the undefined area measurement circuit 303.

In a case where the operation mode indicated by the operation mode signal output by the operation mode setting circuit 302 corresponds to "during measurement of an undefined area", the undefined area measurement circuit 303 measures the undefined time periods Tr and Tf of the input signal by using the sampled input signal output by the sampling circuit 2001. If measurements of the undefined time periods Tr and Tf of the input signal are completed, the undefined area measurement circuit 303 transmits measurement results to the clock generation circuit 311 and the continuous coincidence protection circuit 304 in the corresponding receiving end circuit 221. The undefined area measurement circuit 303 measures the undefined time periods Tr and Tf of an input signal in the vicinity of the transmitting end A most susceptible to the influence of a reflection noise.

Each of the corresponding receiving end circuits 221 includes the sampling circuit 301 and the continuous coincidence protection circuit 304. The sampling circuit 301 samples a signal output by the output signal generation circuit 312 in the transmitting end circuit 211 and outputs a sampled input signal to the continuous coincidence protection circuit 304.

The sampled input signal, output by the sampling circuit 301, and measurement results of the undefined time periods Tr and Tf of the input signal, output by the undefined area measurement circuit 303 in the transmitting end circuit 211, are input to the continuous coincidence protection circuit 304. Using the measurement results output by the undefined area measurement circuit 303 in the transmitting end circuit 211, the continuous coincidence protection circuit 304 performs continuous coincidence protection on the sampled input signal output by the sampling circuit 301. In addition, the continuous coincidence protection circuit 304 outputs a signal subjected to the continuous coincidence protection.

The acquisition unit 111 illustrated in FIG. 1 is realized by, for example, the undefined area measurement circuit 303. The first control unit 112 illustrated in FIG. 1 is realized by the undefined area measurement circuit 303. The undefined area measurement circuit 303 transmits, to the continuous coincidence protection circuit 304, for example, a signal that includes measurement results of the undefined time periods Tr and Tf of the input signal and that instructs to adjust protection time periods in accordance with the measurement results, thereby realizing the function of the first control unit 112. The second control unit 113 illustrated in FIG. 1 is realized by the clock generation circuit 311.

According to the fourth embodiment, it is possible to obtain the same effect as that in the first embodiment. In the fourth embodiment, the operation mode setting circuit 302 and the undefined area measurement circuit 303 do not have to be provided in each of the receiving end circuits 221, and the operation mode setting circuit 302 and the undefined area measurement circuit 303 only have to be provided in the transmitting end circuit 211.

According to the fourth embodiment, the undefined time periods Tr and Tf of an input signal are measured in the vicinity of the transmitting end A most susceptible to the influence of a reflection noise. Therefore, it is possible to set protection time periods according to the maximum undefined time periods Tr and Tf of the input signal. In the transmitting end circuit 211, it is possible to set the rate of a signal according to the maximum undefined time periods Tr and Tf of the input signal. Accordingly, it is possible to improve the transmission rate of a signal, and it is possible to improve communication quality.

While, in the fourth embodiment, a case where the continuous coincidence protection time periods are set in accordance with the undefined time periods Tr and Tf of an input signal is described, a case where the mask protection time periods are set in accordance with the undefined time periods Tr and Tf of an input signal may be realized in the same way. The operation mode setting circuit 302, the signal change point detection circuit 1501, and the signal change point mask pulse generation circuit 1502 may be included in, for example, the transmitting end circuit 211. From this, it is possible to obtain the same effect as that in the fourth embodiment, and it is possible to further increase the rate of the clock signal. Therefore, it is possible to further increase a transmission amount per unit time, and it is possible to improve a transmission rate.

Fifth Embodiment

In the fifth embodiment, portions different from the above-mentioned first to fourth embodiments will be described. In the fifth embodiment, a transmission apparatus in which transmitting end circuits are connected to a receiving end circuit will be described.

Figure 21:
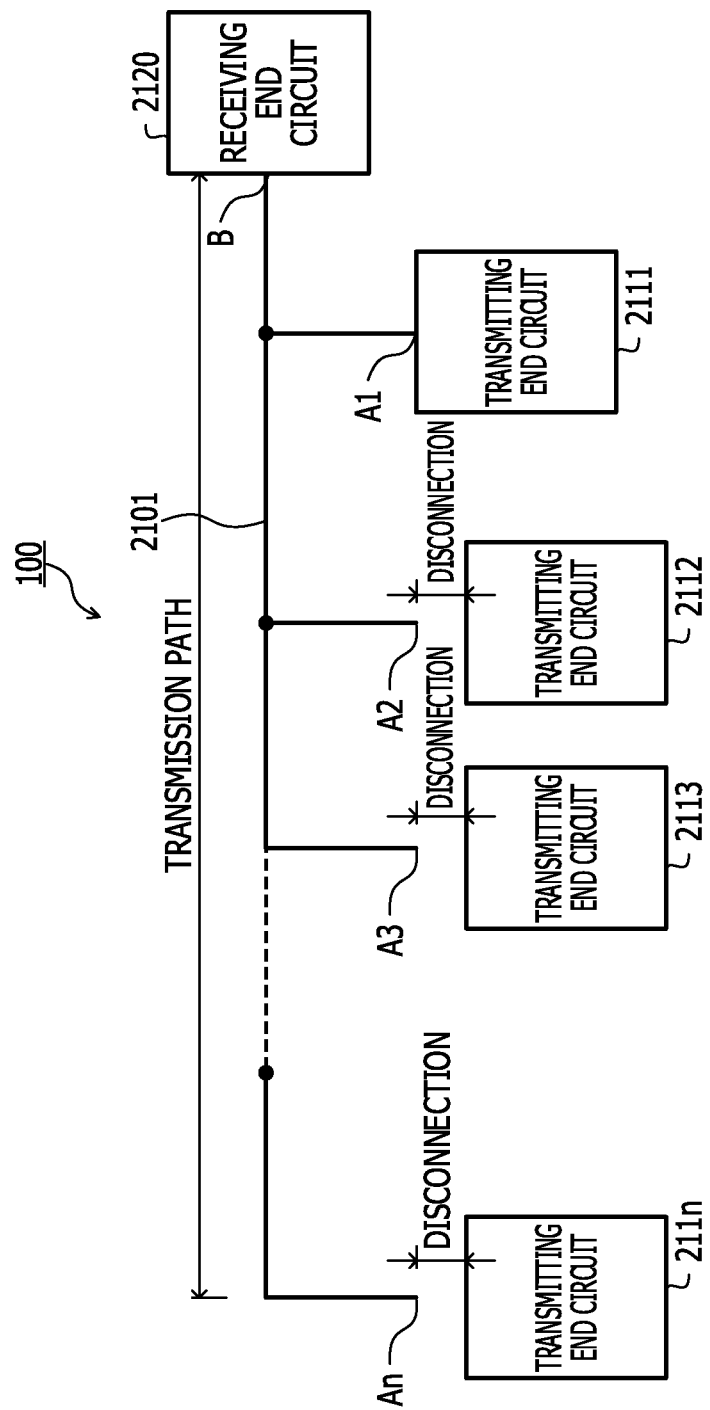
FIG. 21 is a diagram illustrating an example of a transmission apparatus according to a fifth embodiment.

FIG. 21 is a diagram illustrating an example of the transmission apparatus according to the fifth embodiment. As illustrated in FIG. 21, the transmission apparatus 100 according to the fifth embodiment includes n transmitting end circuits 2111 to 211n and a receiving end circuit 2120. "n" is, for example, a natural number greater than or equal to 2. The transmitting end circuits 2111 to 211n each correspond to the first communication apparatus 101 illustrated in FIG. 1. The receiving end circuit 2120 corresponds to one of the second communication apparatuses 102 illustrated in FIG. 1. In this way, as for the signal line 104 illustrated in FIG. 1, the first communication apparatuses 101 may be connectable to the signal line 104.

The transmitting end circuits 2111 to 211n are able to be connected and disconnected to and from transmitting ends A1 to An, respectively, of a transmission path 2101. The receiving end circuit 2120 is connected to a receiving end B of the transmission path 2101. In this way, in the transmission apparatus 100 in which the disconnectable transmitting end circuits 2111 to 211n and the one receiving end circuit 2120 are bus-connected, reflection noises are generated at the transmitting ends A1 to An and the receiving end B and become a composite wave, thereby disturbing in a more complicated manner.

A transmission path structure of a digital signal transmission circuit including the transmitting end circuits 2111 to 211n and the one receiving end circuit 2120 in such a manner as the transmission apparatus 100 illustrated in FIG. 21 is called a many-to-one bus connection. In the transmission apparatus 100, a reflection noise in a case where one transmitting end circuit out of the transmitting end circuits 2111 to 211n transmits a signal to the receiving end circuit 2120 is the same as a reflection noise illustrated in, for example, FIG. 10 or FIG. 11.

In the digital signal transmission circuit of the many-to-one bus connection, a characteristic impedance changes depending on which transmitting end circuit of the transmitting end circuits 2111 to 211n transmits a signal. Accordingly, depending on a transmitting end circuit out of the transmitting end circuits 2111 to 211n, which transmits a signal, the characteristic of a reflection noise changes, and the undefined time periods Tr and Tf of an input signal change. In this way, in the digital signal transmission circuit of the many-to-one bus connection, in which the transmitting end circuits 2111 to 211n are connectable in such a manner as in the transmission apparatus 100, the undefined time periods Tr and Tf of an input signal change depending on a transmitting end circuit, which transmits a signal, and the connection states of the transmitting end circuits.

It is assumed that, by temporarily using the undefined time periods Tr and Tf of an input signal, measured using a transmission signal from the transmitting end circuit 2111, the transmitting end circuit 2112 determines a clock rate and transmits a transmission signal and the receiving end circuit 2120 implements continuous coincidence protection. In this case, a characteristic impedance is different from that in a case where the transmitting end circuit 2111 transmits a signal, and a reflection noise is different. Therefore, in some cases, it is difficult to perform adequate protection, and it is difficult to remove an incorrect operation.

Figure 22:
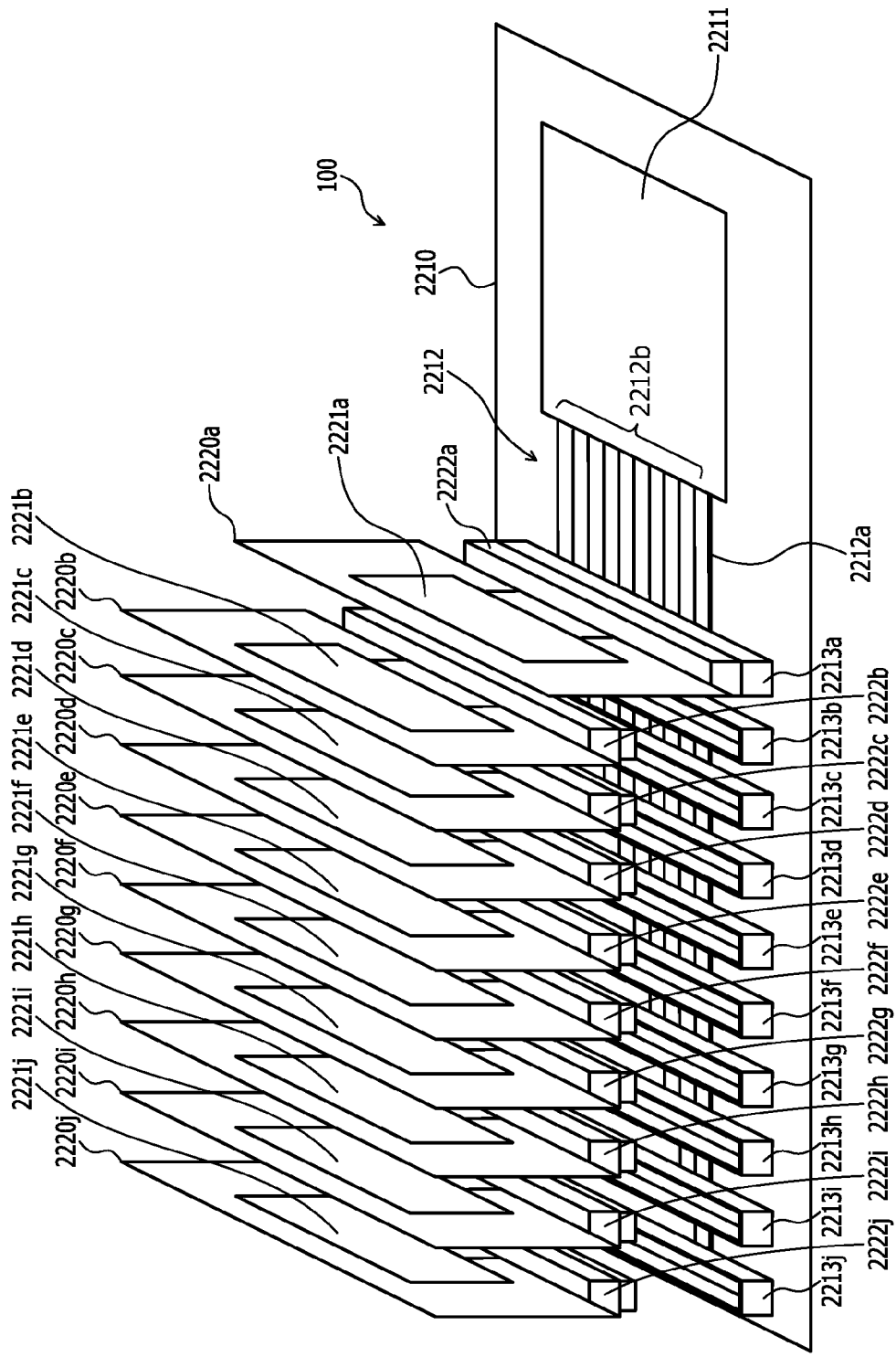
FIG. 22 is a diagram illustrating an example of an apparatus configuration of a transmission apparatus according to the fifth embodiment.

FIG. 22 is a diagram illustrating an example of an apparatus configuration of a transmission apparatus according to the fifth embodiment. As illustrated in FIG. 22, the transmission apparatus 100 according to the fifth embodiment includes a motherboard 2210 and plug-in units 2220 (2220a to 2220j). The motherboard 2210 includes a receiving end circuit 2211, a transmission path 2212, and connectors 2213 (2213a to 2213j).

The transmitting end circuits 2111 to 211n illustrated in FIG. 21 may be realized by, for example, the plug-in units 2220. The receiving end circuit 2120 illustrated in FIG. 21 may be realized by, for example, the receiving end circuit 2211. The transmission path 2101 illustrated in FIG. 21 may be realized by, for example, the transmission path 2212.

Each of the plug-in units 2220 is a circuit that generates a transmission signal and that transmits the generated transmission signal to the receiving end circuit 2211. At the time of transmitting, for example, the transmission signal to the receiving end circuit 2211, each of the plug-in units 2220 transmits the transmission signal to the receiving end circuit 2211 after asserting a communication initiation notice for the receiving end circuit 2211. The transmission path 2212 is a bus that connects the receiving end circuit 2211 and each of the plug-in units 2220 and that transmits signals therebetween.

The transmission path 2212 includes a common signal line 2212a and individual signal lines 2212b. The common signal line 2212a is, for example, a signal line that sends data signals from transmitting end circuits 2221 (2221a to 2221j) in the plug-in units 2220 to the receiving end circuit 2211. The common signal line 104 illustrated in FIG. 1 may be realized by the common signal line 2212a.

The individual signal lines 2212b are allocated to the respective plug-in units 2220. The individual signal lines 2212b are, for example, signal lines that send, from the receiving end circuit 2211 to the respective plug-in units 2220, measurement results of undefined time periods during which the levels of the data signals transmitted from the respective plug-in units 2220 via the common signal line 2212a are undefined in the receiving end circuit 2211. While, in FIG. 22, being allocated to the respective plug-in units 2220, the individual signal lines 2212b may be shared in common by the individual plug-in units 2220.

For example, the 10 connectors 2213 (2213a to 2213j) are arranged on the motherboard 2210. The connectors 2213 are connection units connectable to respective connectors 2222 (2222a to 2222j) in the plug-in units 2220.

The plug-in units 2220 each include the corresponding transmitting end circuit 2221 and the corresponding connector 2222. Each of the transmitting end circuits 2221 is a circuit that receives a signal from the motherboard 2210. Each of the connectors 2222 is a connection unit connectable to the corresponding connector 2213 in the motherboard 2210.

Each of the plug-in units 2220 is attachable and detachable to and from the motherboard 2210. For example, in the operation of the transmission apparatus 100, the plug-in units 2220 are connected to the motherboard 2210 or disconnected from the motherboard 2210. For example, up to 10 plug-in units 2220 are connected to the motherboard 2210. The plug-in units 2220 may be realized by, for example, optical modules.

Figure 23:
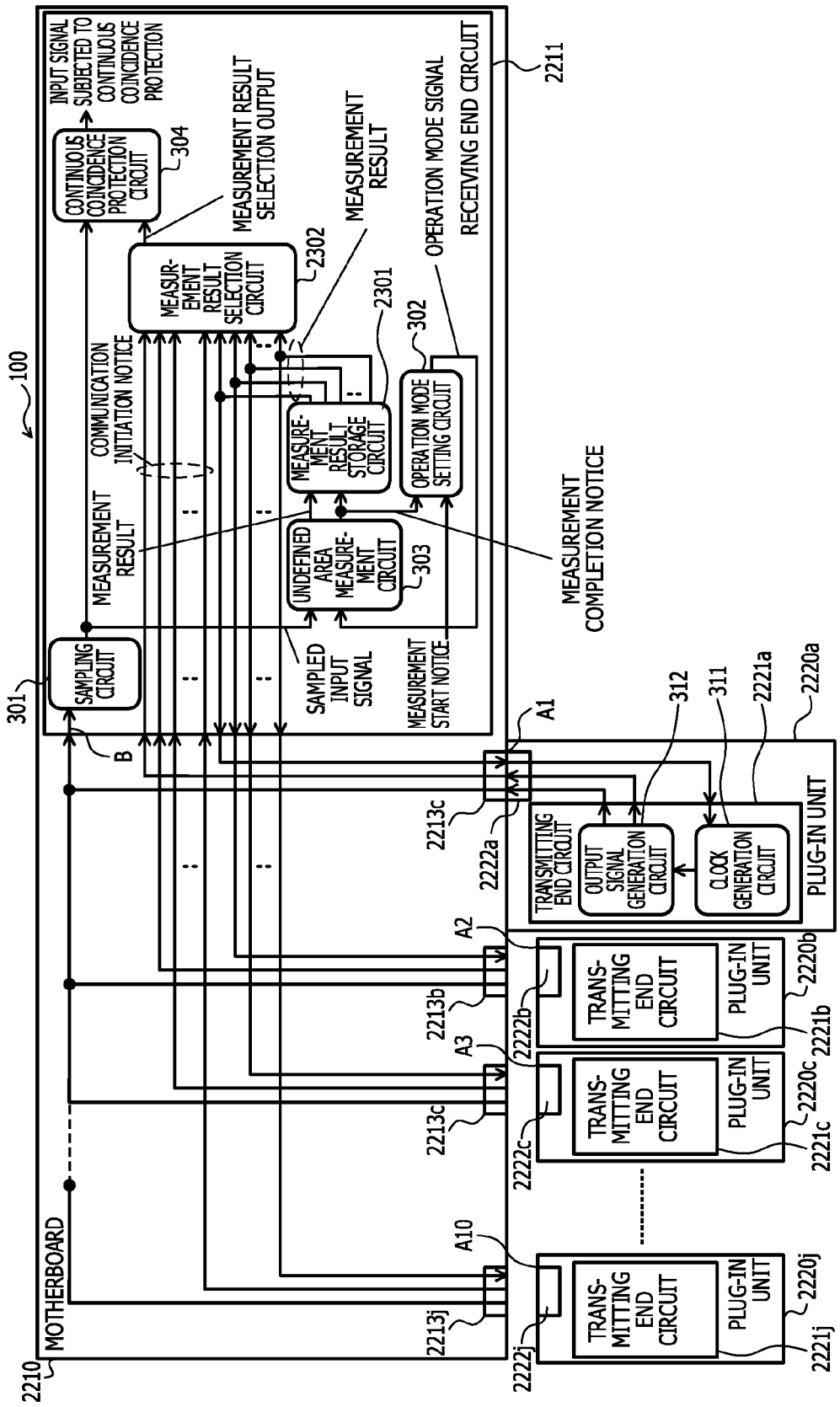
FIG. 23 is a diagram illustrating an example of a circuit configuration of the transmission apparatus according to the fifth embodiment.

FIG. 23 is a diagram illustrating an example of a circuit configuration of the transmission apparatus according to the fifth embodiment. In FIG. 23, the same symbol is assigned to the same portion as a portion illustrated in FIG. 3 or FIG. 22, and the description thereof will be omitted. As illustrated in FIG. 23, the receiving end circuit 2211 in the motherboard 2210 includes the sampling circuit 301, the operation mode setting circuit 302, the undefined area measurement circuit 303, a measurement result storage circuit 2301, a measurement result selection circuit 2302, and the continuous coincidence protection circuit 304. The transmitting end circuit 2221 in each of the plug-in units 2220 includes the clock generation circuit 311 and the output signal generation circuit 312.

The transmitting ends A1 to A10 are transmitting ends of signals corresponding to the connectors 2222a to 2222j in the plug-in units 2220a to 2220j, respectively. The receiving end B is a receiving end of a signal in the receiving end circuit 2211.

The sampling circuit 301 samples signals output from the transmitting ends A1 to A10 of the respective transmitting end circuits 2221 (2221a to 2221j) in the respective plug-in units 2220 (2220a to 2220j).

If a plug-in unit 2220 (transmitting end circuit 2221) is newly added to the transmission apparatus 100 or a plug-in unit 2220 (transmitting end circuit 2221) is disconnected from the transmission apparatus 100, a measurement start notice is issued to the operation mode setting circuit 302.

If an operation mode indicated by the operation mode signal output by the operation mode setting circuit 302 becomes "during measurement of an undefined area", the undefined area measurement circuit 303 sequentially selects a transmitting end circuit connected to the transmission apparatus 100, from among the transmitting end circuits 2221. In addition, the undefined area measurement circuit 303 measures the undefined time periods Tr and Tf of the selected transmitting end circuit.

By requesting, for example, the selected transmitting end circuit to transmit a signal, the undefined area measurement circuit 303 causes the selected transmitting end circuit to transmit a signal to the sampling circuit 301. From this, the undefined area measurement circuit 303 is able to acquire, from the sampling circuit 301, a sampling result for the selected transmitting end circuit. In addition, based on the acquired sampling result, the undefined area measurement circuit 303 measures the undefined time periods Tr and Tf for the selected transmitting end circuit.

Every time the measurement of the undefined time periods Tr and Tf for, for example, one transmitting end circuit is completed, the undefined area measurement circuit 303 transmits a measurement completion notice to the operation mode setting circuit 302 and the measurement result storage circuit 2301. The undefined area measurement circuit 303 transmits, to the measurement result storage circuit 2301, measurement results of the undefined time periods Tr and Tf of each of transmitting end circuits connected to the transmission apparatus 100 and included in the transmitting end circuits 2221.

The measurement result storage circuit 2301 holds (stores therein) the measurement results of the undefined time periods Tr and Tf of each of the transmitting end circuits 2221, received from the undefined area measurement circuit 303. From this, it is possible to perform the measurements of the undefined time periods Tr and Tf of all the transmitting end circuit connected to the transmission apparatus 100 and included in the transmitting end circuits 2221, and it is possible to hold the measurement results of each of the transmitting end circuits 2221.

The measurement results of the undefined time periods Tr and Tf of each of the transmitting end circuits 2221, held by the measurement result storage circuit 2301, are transmitted to the clock generation circuit 311 in the transmitting end circuit 2221 that serves as a measurement target and that is included in the transmitting end circuits connected to the transmission apparatus 100. The measurement results of the undefined time periods Tr and Tf for, for example, the transmitting end circuit 2221a are transmitted to the clock generation circuit 311 in the transmitting end circuit 2221a. The measurement results of the undefined time periods Tr and Tf for the transmitting end circuit 2221b are transmitted to the clock generation circuit 311 in the transmitting end circuit 2221b.

One of the transmitting end circuits 2221, which has a signal to be transmitted to the receiving end circuit 2211 and which is included in the transmitting end circuits connected to the transmission apparatus 100, asserts a communication initiation notice for the measurement result selection circuit 2302 in the receiving end circuit 2211. In addition, the clock generation circuit 311 in the relevant transmitting end circuit 2221 references the measurement results of the undefined time periods Tr and Tf for the relevant transmitting end circuit 2221, received from the measurement result storage circuit 2301, and controls a clock rate.

In response to this, from among the measurement results of the undefined time periods Tr and Tf, held in the measurement result storage circuit 2301, the measurement result selection circuit 2302 selects measurement results corresponding to the relevant transmitting end circuit 2221 that asserts the communication initiation notice and that is included in the transmitting end circuits 2221. In addition, the measurement result selection circuit 2302 outputs, to the continuous coincidence protection circuit 304, the selected measurement results of the undefined time periods Tr and Tf (measurement result selection outputs). Based on the measurement results of the undefined time periods Tr and Tf, received from the measurement result selection circuit 2302, the continuous coincidence protection circuit 304 performs continuous coincidence protection on the sampled input signal output by the sampling circuit 301.

By measuring the undefined time periods Tr and Tf of each of the transmitting end circuits every time a measurement start notice is received, it becomes possible to optimally adjust a transmission rate for each of the transmitting end circuits that each transmit a transmission signal. From this, it becomes possible to improve the amount of transmission signals receivable by the receiving end circuit. As described above, the transmission apparatus 100, which is subjected to the many-to-one bus connection and is able to disconnect transmitting end circuits, has a characteristic that the voltage level of a reflection noise is low in a case of a connection of a transmitting end circuit, compared with a case of a disconnection thereof, and the undefined time periods Tr and Tf of an input signal decrease. Therefore, it becomes possible to increase an optimally adjusted and set transmission rate with an increase in the number of connected transmitting end circuits, and it becomes possible to improve the amount of transmission signals receivable by the receiving end circuit.

The acquisition unit 111 illustrated in FIG. 1 is realized by, for example, the undefined area measurement circuit 303, the measurement result storage circuit 2301, and the measurement result selection circuit 2302. The first control unit 112 illustrated in FIG. 1 is realized by the continuous coincidence protection circuit 304. The second control unit 113 illustrated in FIG. 1 is realized by the undefined area measurement circuit 303, the measurement result storage circuit 2301, and the measurement result selection circuit 2302. For example, the undefined area measurement circuit 303, the measurement result storage circuit 2301, and the measurement result selection circuit 2302 transmit, to the corresponding clock generation circuit 311, signals for instructing to adjust the clock signal in accordance with the measurement results of the undefined time periods Tr and Tf, thereby realizing the function of the second control unit 113.

In the transmission apparatus 100 illustrated in FIG. 23, a reflection noise in a case where all the transmitting end circuits 2221 (plug-in units 2220) are disconnected is the same as a reflection noise illustrated in, for example, FIG. 10. Both the undefined time periods Tr and Tf of an input signal are, for example, 1 [mS].

In the transmission apparatus 100 illustrated in FIG. 23, a reflection noise in a case where all the transmitting end circuits 2221 (plug-in units 2220) are connected is the same as a reflection noise illustrated in, for example, FIG. 11. Both the undefined time periods Tr and Tf of an input signal are, for example, 0.7 [mS].

FIG. 24 is a diagram illustrating examples of measurement results of undefined time periods for each of transmitting end circuits according to the fifth embodiment. FIG. 25 is a diagram illustrating an example of a calculation result of a transmission rate for each of the transmitting end circuits according to the fifth embodiment. It is assumed that a measurement result 2400 illustrated in FIG. 24 is obtained by, for example, the measurement result storage circuit 2301 and the measurement result 2400 is held in the measurement result selection circuit 2302.

Transmitting end circuits #1 to #10 illustrated in FIG. 24 correspond to, for example, the transmitting end circuits 2221a to 2221j, respectively, illustrated in FIG. 23. In the measurement result 2400, the measurement results of the undefined time periods Tr and Tf are associated with each of the transmitting end circuits (transmitting end circuits #1 to #10) connected to the transmission apparatus 100. Both the measurement results of the undefined time periods Tr and Tf of, for example, the transmitting end circuit #1 are 0.7 [mS]. Both the measurement results of the undefined time periods Tr and Tf of, for example, the transmitting end circuit #2 are 0.4 [mS].

In the digital signal transmission circuit of the related art, a transmission rate is calculated based on a case where the voltage level of a reflection noise becomes a maximum (the case exemplified in, for example, FIG. 10). Therefore, both the undefined time periods Tr and Tf of an input signal are 1 [mS]. It is assumed that both the H level signal mask protection time period and the L level signal mask protection time period are 1 [mS], and the margin is 0.5 [mS].

In this case, the transmission rate of a transmission signal receivable by a receiving end circuit in a digital signal transmission circuit that uses input signal mask protection for the receiving end circuit of the related art may be calculated using the above-mentioned Expression (2).

$$Th \text{ [bps]}=1/(Tr \text{ [S]}+\text{an } H \text{ level protection time period [S]}+Tf \text{ [S]}+\text{an } L \text{ level protection time period}+\text{a margin [S]})=1/(1 \text{ [mS]}+1 \text{ [mS]}+1 \text{ [mS]}+0.5 \text{ [mS]})\approx 222.2 \text{ [bps]}$$

On the other hand, in the transmission apparatus 100 according to the fifth embodiment, a transmission rate in a case where all the 10 transmitting end circuits 2221 are connected is calculated based on cases exemplified in FIG. 11 and FIG. 24. In a case where, for example, it is assumed that both the undefined time periods Tr and Tf of an input signal are 0.7 [mS] and a margin is 0.5 [mS], the transmission rate of a transmission signal from the transmitting end circuit #1 may be calculated using the above-mentioned Expression (2).

$$Th \text{ [bps]}=1/(Tr \text{ [S]}+\text{an } H \text{ level protection time period [S]}+Tf \text{ [S]}+\text{an } L \text{ level protection time period}+\text{a margin [S]})=1/(0.7 \text{ [mS]}+0.7 \text{ [mS]}+0.7 \text{ [mS]}+0.7 \text{ [mS]}+0.5 \text{ [mS]})\approx 303.0 \text{ [bps]}$$

Results obtained by calculating transmission rates for the transmitting end circuits #2 to #10 in the same way are illustrated in a calculation result 2500 in FIG. 25. As for, for example, the transmitting end circuit #2 in which the undefined time periods Tr and Tf thereof are shorter than those of the transmitting end circuit #1, a transmission rate (476.2 [bps]) higher than the transmission rate (303.0 [bps]) of the transmitting end circuit #1 is calculated.

Figure 26:
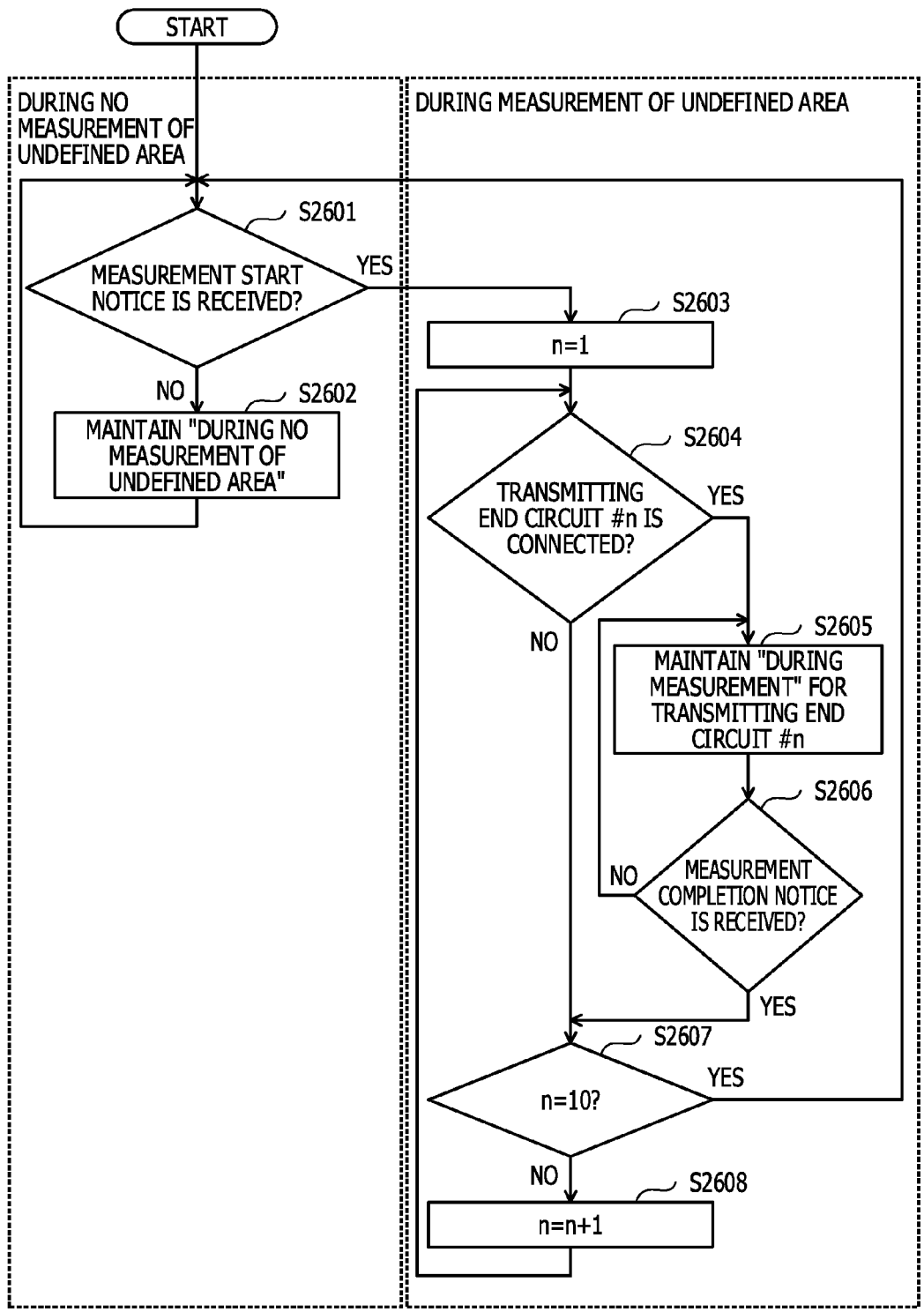
FIG. 26 is a flowchart illustrating an example of an operation of an operation mode setting circuit according to the fifth embodiment.

FIG. 26 is a flowchart illustrating an example of an operation of an operation mode setting circuit according to the fifth embodiment. In a case where the transmitting end circuits #1 to #10 are able to be connected to the transmission apparatus 100, the operation mode setting circuit 302 according to the fifth embodiment performs individual steps illustrated in, for example, FIG. 26. First, the operation mode setting circuit 302 is put into the operation mode of "during no measurement of an undefined area" and determines whether or not a measurement start notice is received (S2601).

In a case where, in S2601, no measurement start notice is received (S2601: No), the operation mode setting circuit 302 maintains the operation mode of "during no measurement of an undefined area" (S2602) and returns to S2601. In a case where the measurement start notice is received (S2601: Yes), the operation mode setting circuit 302 makes a transition to the operation mode of "during measurement of an undefined area" and sets "1" in "n" (S2603). "n" is the index of one of the transmitting end circuits #1 to #10.

Next, the operation mode setting circuit 302 determines whether or not the transmitting end circuit #n is connected to the transmission apparatus 100 (S2604). In a case where no transmitting end circuit #n is connected (S2604: No), the operation mode setting circuit 302 makes a transition to S2607. In a case where the transmitting end circuit #n is connected (S2604: Yes), the operation mode setting circuit 302 maintains a state during measurement during which the undefined area measurement circuit 303 is caused to measure the undefined time periods Tr and Tf for the transmitting end circuit #n (S2605).

Next, the operation mode setting circuit 302 determines whether or not a measurement completion notice for the transmitting end circuit #n is received from the undefined area measurement circuit 303 (S2606). In a case where no measurement completion notice is received (S2606: No), the operation mode setting circuit 302 returns to S2605. In a case where the measurement completion notice is received (S2606: Yes), the operation mode setting circuit 302 determines whether or not "n" reaches 10 (S2607).

In a case where, in S2607, "n" does not reach 10 (S2607: No), it may be determined that measurements of the undefined time periods Tr and Tf for all the transmitting end circuits connected to the transmission apparatus 100 are not completed. In this case, the operation mode setting circuit 302 adds "1" to "n" (S2608) and returns to S2604.

In a case where, in S2607, "n" reaches 10 (S2607: Yes), it may be determined that measurements of the undefined time periods Tr and Tf for all the transmitting end circuits connected to the transmission apparatus 100 are completed. In this case, the operation mode setting circuit 302 makes a transition to the operation mode of "during no measurement of an undefined area" and returns to S2601.

Figure 27:
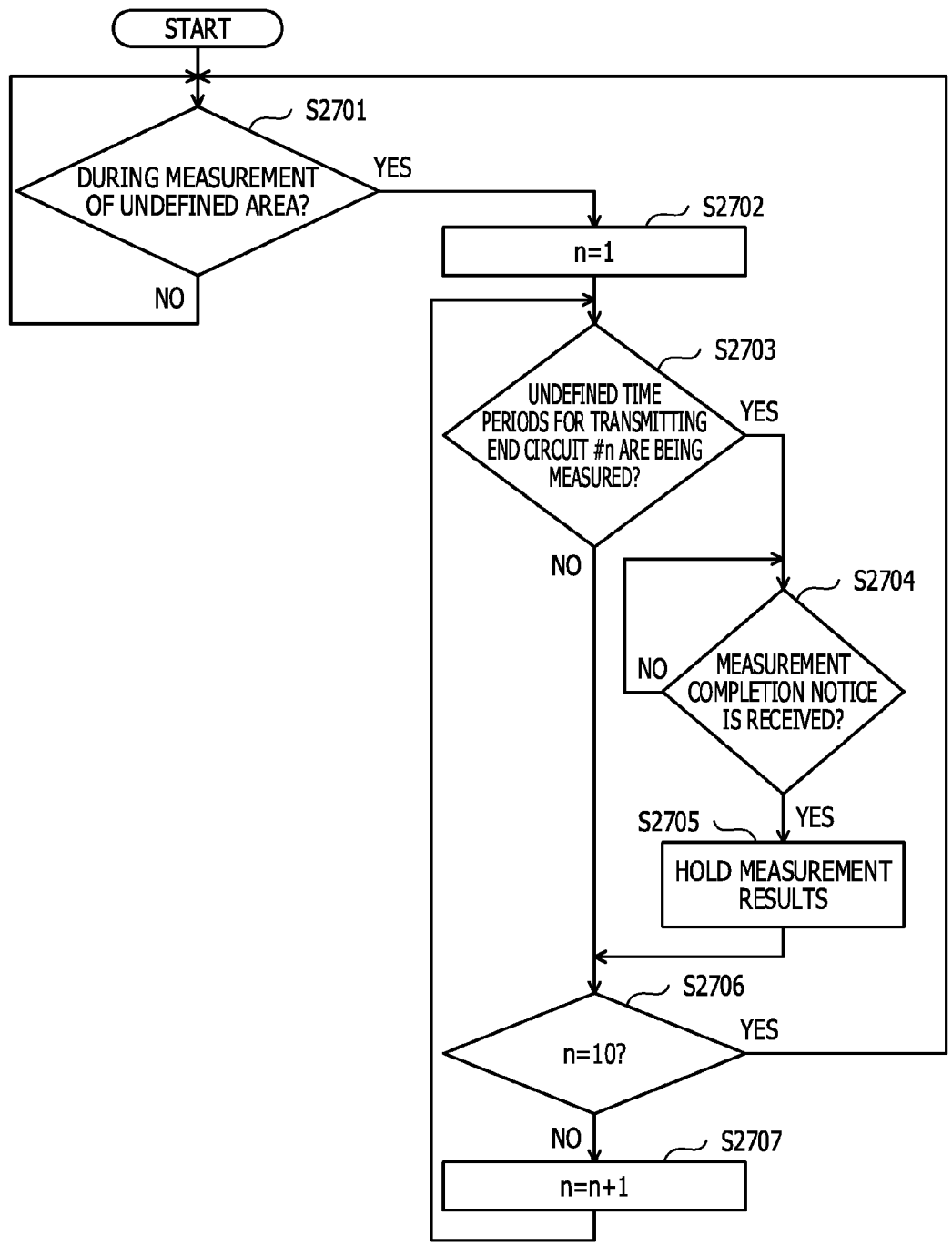
FIG. 27 is a flowchart illustrating an example of an operation of a measurement result storage circuit according to the fifth embodiment.

FIG. 27 is a flowchart illustrating an example of an operation of a measurement result storage circuit according to the fifth embodiment. In a case where the transmitting end circuits #1 to #10 are able to be connected to the transmission apparatus 100, the measurement result storage circuit 2301 according to the fifth embodiment performs individual steps illustrated in, for example, FIG. 27. First, the measurement result storage circuit 2301 determines whether or not the operation mode of the operation mode setting circuit 302 is "during measurement of an undefined area" (S2701). In addition, the measurement result storage circuit 2301 waits until the operation mode of the operation mode setting circuit 302 becomes "during measurement of an undefined area" (S2701: No loop).

The determination in S2701 may be performed based on, for example, the operation mode signal output by the operation mode setting circuit 302. In a case of being determined as "during measurement of an undefined area" (S2701: Yes), the measurement result storage circuit 2301 sets "1" in "n" indicating the index of one of the transmitting end circuits #1 to #10 (S2702).

Next, the measurement result storage circuit 2301 determines whether or not the undefined time periods Tr and Tf for the transmitting end circuit #n are being measured (S2703). The determination in S2703 may be performed based on, for example, a state of the operation mode setting circuit 302 or the undefined area measurement circuit 303. In a case where it is determined that the undefined time periods Tr and Tf for the transmitting end circuit #n are not being measured (S2703: No), the measurement result storage circuit 2301 makes a transition to S2706.

In a case where, in S2703, it is determined that the undefined time periods Tr and Tf for the transmitting end circuit #n are being measured (S2703: Yes), the measurement result storage circuit 2301 makes a transition to S2704. In other words, the measurement result storage circuit 2301 determines whether or not a measurement completion notice of the undefined time periods Tr and Tf for the transmitting end circuit #n is received from the undefined area measurement circuit 303 (S2704) and waits until receiving the measurement completion notice (S2704: No loop).

In a case where, in S2704, it is determined that the measurement completion notice is received (S2704: Yes), the measurement result storage circuit 2301 holds the measurement results of the undefined time periods Tr and Tf for the transmitting end circuit #n, output by the undefined area measurement circuit 303 (S2705). Next, the measurement result storage circuit 2301 determines whether or not "n" reaches 10 (S2706).

In a case where, in S2706, it is determined that "n" does not reach 10 (S2706: No), it may be determined that measurement results for all the transmitting end circuits connected to the transmission apparatus 100 are not held. In this case, the measurement result storage circuit 2301 adds "1" to "n" (S2707) and returns to S2703. In a case where it is determined that "n" reaches 10 (S2706: Yes), it may be determined that measurement results for all the transmitting end circuits connected to the transmission apparatus 100 are held. In this case, the measurement result storage circuit 2301 returns to S2701.

Figure 28:
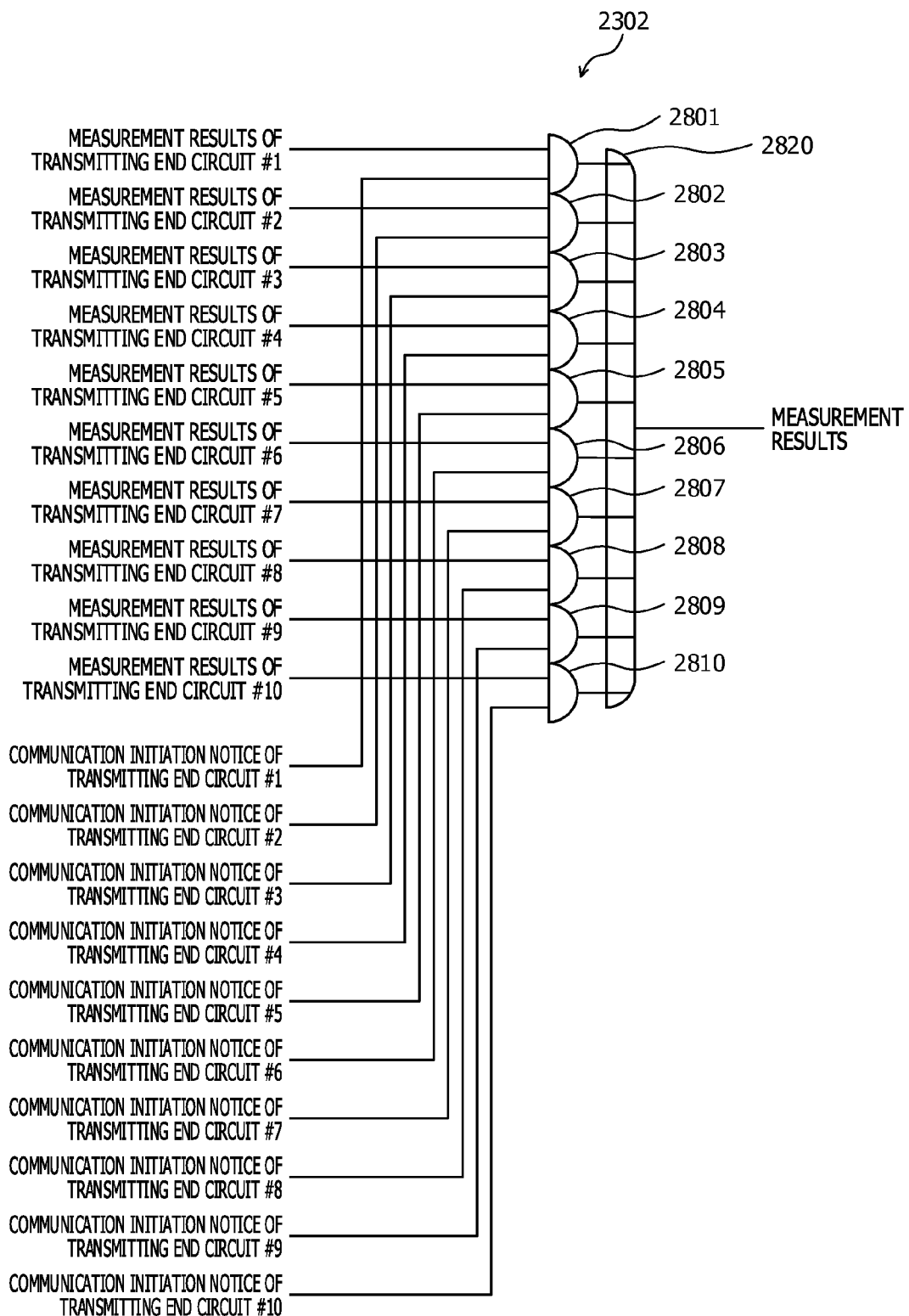
FIG. 28 is a diagram illustrating an example of a measurement result selection circuit according to the fifth embodiment.

FIG. 28 is a diagram illustrating an example of a measurement result selection circuit according to the fifth embodiment. The measurement result selection circuit 2302 illustrated in FIG. 23 may be realized by logical product units 2801 to 2810 (AND circuits) and a logical addition circuit 2820 (OR circuit) as illustrated in, for example, FIG. 28. Measurement results of the undefined time periods Tr and Tf for the respective transmitting end circuits #1 to #10 are input to first input units of the respective logical product units 2801 to 2810 by the measurement result storage circuit 2301.

Communication initiation notices from the respective transmitting end circuits #1 to #10 are input to second input units of the respective logical product units 2801 to 2810. Each of the logical product units 2801 to 2810 outputs, to the logical addition circuit 2820, a result of multiplication between the first input unit and second input unit thereof. In other words, only in a case where a communication initiation notice is input to the corresponding second input unit, each of the logical product units 2801 to 2810 outputs, to the logical addition circuit 2820, a measurement result input to the corresponding first input unit.

The logical addition circuit 2820 outputs a result of addition of the logical product units 2801 to 2810 to the continuous coincidence protection circuit 304 (see, for example, FIG. 23). From this, it is possible to select a measurement result of a transmitting end circuit for which a communication initiation notice is asserted, from among measurement results for respective transmitting end circuits, held in the measurement result storage circuit 2301, and to output the selected measurement result to the continuous coincidence protection circuit 304.

In this way, according to the transmission apparatus 100 according to the fifth embodiment, in a configuration in which transmitting end circuits (first communication apparatuses) are connectable to a shared signal line, it is possible to acquire the lengths of undefined time periods for each of connected transmitting end circuits.

In addition, based on the lengths of undefined time periods for a transmitting end circuit that transmits a signal to a receiving end circuit (second communication apparatus), the lengths of undefined time periods being included in the lengths of undefined time periods for the individual connected transmitting end circuits, it is possible to control the lengths of protection time periods. In accordance with the lengths of protection time periods based on the lengths of undefined time periods for the relevant transmitting end circuit that transmits a signal to the receiving end circuit, it is possible to control the rate of a signal transmitted to the receiving end circuit by the relevant transmitting end circuit.

Accordingly, in a configuration in which transmitting end circuits are connectable to a shared signal line, it is possible to control the lengths of protection time periods and a transmission rate, based on the lengths of undefined time periods for a transmitting end circuit that transmits a signal, the relevant transmitting end circuit being included in transmitting end circuits connected to the shared signal line. From this, compared with a configuration in which protection time periods are preliminarily set to longer time periods under assumption of a maximum time period out of undefined time periods that change depending on a combination of, for example, a connection state of a transmitting end circuit and a transmitting end circuit to transmit a signal, it is possible to set protection time periods to shorter time periods. In addition, it is possible to increase a transmission rate in conformity with the set shorter protection time periods. Therefore, it is possible to achieve an improvement in the transmission rate.

Figure 29:
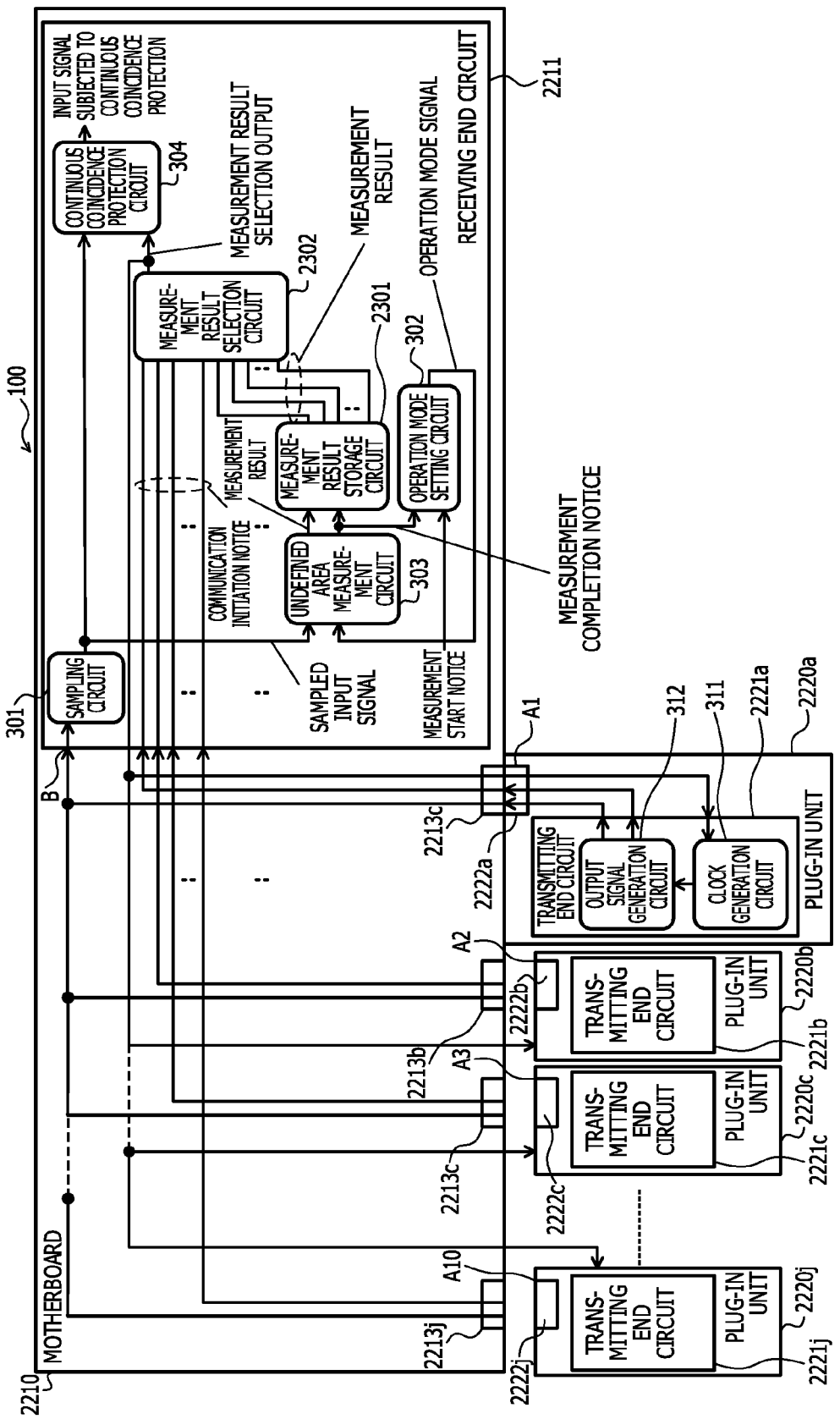
FIG. 29 is a diagram illustrating another example of the circuit configuration of the transmission apparatus according to the fifth embodiment.

FIG. 29 is a diagram illustrating another example of the circuit configuration of the transmission apparatus according to the fifth embodiment. In FIG. 29, the same symbol is assigned to the same portion as a portion illustrated in FIG. 23, and the description thereof will be omitted. As illustrated in FIG. 29, measurement results of the undefined time periods Tr and Tf held by the measurement result storage circuit 2301 do not have to be directly transmitted to the corresponding transmitting end circuit 2221 by the measurement result storage circuit 2301 and may be transmitted to the corresponding transmitting end circuit 2221 via the measurement result selection circuit 2302.

In this case, if a communication initiation notice is asserted by one of the transmitting end circuits 2221, the measurement result selection circuit 2302 acquires measurement results of the undefined time periods Tr and Tf for each of the transmitting end circuits 2221, held by the measurement result storage circuit 2301. The measurement result selection circuit 2302 transmits measurement results, selected from among acquired measurement results, to the continuous coincidence protection circuit 304 and the clock generation circuit 311 in the transmitting end circuit 2221 that asserts the communication initiation notice.

The measurement result selection circuit 2302 selects, for example, a measurement result of a maximum length from among the acquired measurement results. A measurement result for each of the undefined time periods Tr and Tf may be held by the measurement result storage circuit 2301. In this case, from among measurement results of the undefined time periods Tr and Tf for the individual transmitting end circuits 2221, the measurement result selection circuit 2302 selects measurement results in which the sum, the average, or a maximum value of the undefined time periods Tr and Tf is a maximum.

Based on the measurement results of the undefined time periods Tr and Tf, received from the measurement result selection circuit 2302, the continuous coincidence protection circuit 304 performs continuous coincidence protection on the sampled input signal output from the sampling circuit 301. The clock generation circuit 311 in the transmitting end circuit 2221 that asserts a communication initiation notice references the measurement results of the undefined time periods Tr and Tf, received from the measurement result selection circuit 2302, and controls the clock rate.

From this, it is possible to increase the amount of a transmission signal receivable by the receiving end circuit 2211, and it becomes possible to reduce a signaling amount taken to transmit measurement results to each of the transmitting end circuits 2221. The measurement result selection circuit 2302 transmits, for example, the same measurement results to each of the transmitting end circuits 2221. Therefore, using a signal line (for example, the signal line 2212a) common to the individual transmitting end circuits 2221, the measurement result selection circuit 2302 is able to transmit measurement results.

While a configuration in which measurement results of the undefined time periods Tr and Tf, selected by the measurement result selection circuit 2302, are transmitted to one of the transmitting end circuits 2221, which asserts a communication initiation notice, is described, a configuration is not limited to such a configuration. Every time the undefined time periods Tr and Tf are measured, the measurement result selection circuit 2302 may transmit, to each of the transmitting end circuits 2221, measurement results selected from among, for example, measurement results of the undefined time periods Tr and Tf of the individual transmitting end circuits 2221.

In this way, in the transmission apparatus 100 according to the fifth embodiment, the lengths of protection time periods and a transmission rate may be controlled based on a maximum length of the lengths of undefined time periods for individual connected transmitting end circuits. In this case, in a configuration in which transmitting end circuits are connectable to a shared signal line, it is possible to uniformly control the lengths of protection time periods and a transmission rate in conformity with the length of a maximum undefined time period out of the lengths of undefined time periods of individual transmitting end circuits connected to the shared signal line.

From this, compared with a configuration in which protection time periods are preliminarily set to longer time periods under assumption of a maximum time period out of undefined time periods that change depending on, for example, connection states of transmitting end circuits, it is possible to set protection time periods to shorter time periods, and it is possible to increase a transmission rate in conformity with the set shorter protection time periods. Therefore, it is possible to achieve an improvement in the transmission rate. A maximum length out of the lengths of undefined time periods for the individual connected transmitting end circuits only has to be notified to another apparatus. Therefore, it becomes possible to reduce a signaling amount taken to notify the lengths of undefined time periods to the other apparatus.

Figure 30:
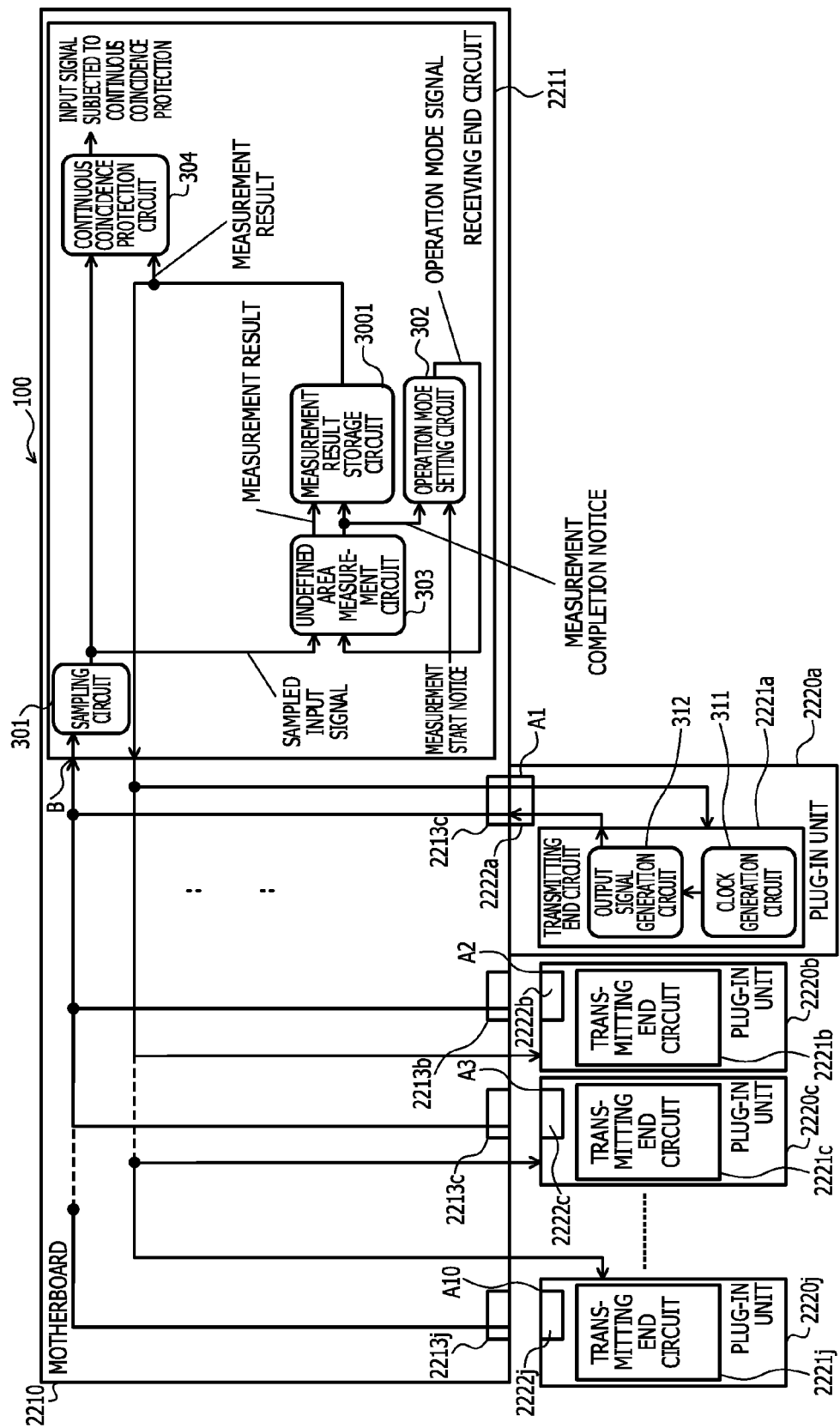
FIG. 30 is a diagram illustrating yet another example of the circuit configuration of the transmission apparatus according to the fifth embodiment.

FIG. 30 is a diagram illustrating yet another example of the circuit configuration of the transmission apparatus according to the fifth embodiment. In FIG. 30, the same symbol is assigned to the same portion as a portion illustrated in FIG. 23 or FIG. 29, and the description thereof will be omitted. As illustrated in FIG. 30, the transmission apparatus 100 according to the fifth embodiment may include a measurement result selection storage circuit 3001 in place of the measurement result storage circuit 2301 and the measurement result selection circuit 2302 illustrated in FIG. 23 or FIG. 29.

The measurement result selection storage circuit 3001 stores therein only one of measurement results of each of the undefined time periods Tr and Tf output by the undefined area measurement circuit 303. Every time measurement results of the undefined time periods Tr and Tf are newly transmitted by the undefined area measurement circuit 303, the measurement result selection storage circuit 3001 compares previously stored measurement results and the measurement results newly output by the undefined area measurement circuit 303 with each other. In addition, the measurement result selection storage circuit 3001 holds only a longer measurement result out of the compared measurement results and discards a shorter measurement result out of the compared measurement results.

From this, a measurement result of a maximum length out of measurement results of the undefined time periods Tr for the individual transmitting end circuits 2221 and a measurement result of a maximum length out of measurement results of the undefined time periods Tf for the individual transmitting end circuits 2221 are only held in the measurement result selection storage circuit 3001. Measurement results held by the measurement result selection storage circuit 3001 are transmitted to the continuous coincidence protection circuit 304 and the clock generation circuit 311 in each of the transmitting end circuits 2221 connected to the transmission apparatus 100.

Based on the measurement results of the undefined time periods Tr and Tf received from the measurement result selection storage circuit 3001, the continuous coincidence protection circuit 304 performs continuous coincidence protection on the sampled input signal output by the sampling circuit 301. The clock generation circuit 311 in each of the transmitting end circuits 2221 that perform communication references the measurement results of the undefined time periods Tr and Tf received from the measurement result selection storage circuit 3001 and controls the corresponding clock rate.

From this, in the same way as the transmission apparatus 100 illustrated in FIG. 23 or FIG. 29, it is possible to increase the amount of a transmission signal receivable by the receiving end circuit 2211, and it becomes possible to reduce a signaling amount taken to transmit measurement results to each of the transmitting end circuits 2221. Since it is possible to select measurement results of maximum lengths without having to hold measurement results of the undefined time periods Tr and Tf for each of the transmitting end circuits 2221, it is possible to reduce a memory capacity taken to select measurement results of maximum lengths.

Figure 31:
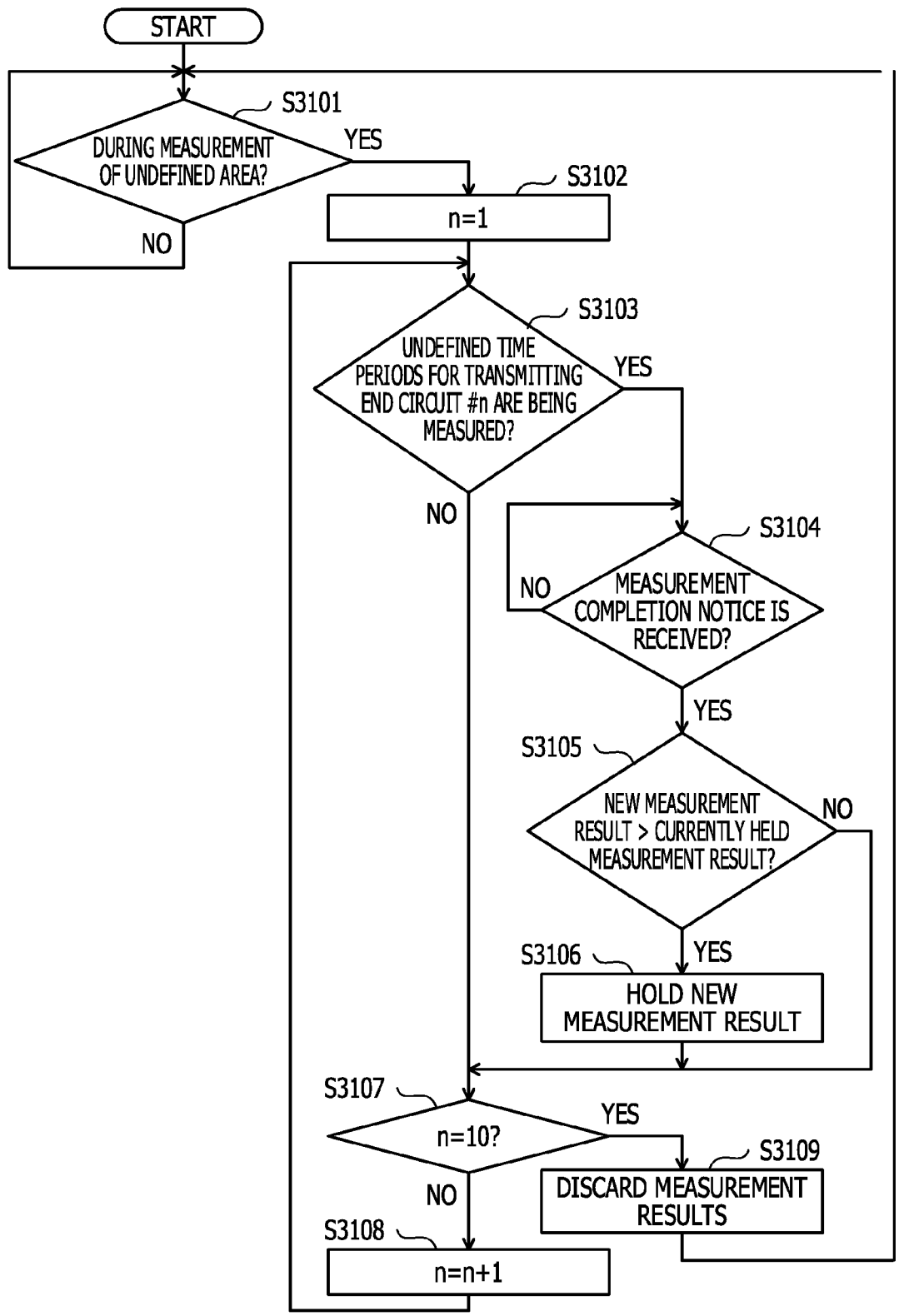
FIG. 31 is a flowchart illustrating an example of an operation of a measurement result selection storage circuit according to the fifth embodiment.

FIG. 31 is a flowchart illustrating an example of an operation of a measurement result selection storage circuit according to the fifth embodiment. In a case where the transmitting end circuits #1 to #10 are able to be connected to the transmission apparatus 100, the measurement result selection storage circuit 3001 illustrated in FIG. 30 performs individual steps illustrated in, for example, FIGS. 31. S3101 to S3104 illustrated in FIG. 31 are the same as S2701 to S2704, respectively, based on the measurement result storage circuit 2301 and illustrated in FIG. 27.

In a case where, in S3104, a measurement completion notice is received (S3104: Yes), the measurement result selection storage circuit 3001 makes a transition to S3105. In other words, the measurement result selection storage circuit 3001 determines whether or not a new measurement result of the undefined time period Tr or Tf for the transmitting end circuit #n, output by the undefined area measurement circuit 303, is longer than a corresponding previous measurement result of the undefined time period Tr or Tf, currently held (S3105). At the time of n=1, the measurement result selection storage circuit 3001 holds no measurement results of the undefined time periods Tr and Tf. However, in this case, the measurement result selection storage circuit 3001 determines that new measurement results are longer than respective previous measurement results currently held.

In a case where, in S3105, neither of new measurement results is longer than a corresponding previous measurement result currently held (S3105: No), the measurement result selection storage circuit 3001 makes a transition to S3107. In a case where a new measurement result is longer than a corresponding previous measurement result currently held (S3105: Yes), the measurement result selection storage circuit 3001 holds the relevant new measurement result of the undefined time period Tr or Tf (S3106) and makes a transition to S3107. In S3106, the measurement result selection storage circuit 3001 discards the corresponding previous measurement result previously held.

S3107 and S3108 illustrated in FIG. 31 are the same as S2706 and S2707, respectively, illustrated in FIG. 27. In a case where, in S3107, "n" reaches 10 (S3107: Yes), the measurement result selection storage circuit 3001 discards the currently held measurement results of the undefined time periods Tr and Tf (S3109) and returns to S3101.

In this way, every time the lengths of undefined time periods are newly acquired, the transmission apparatus 100 according to the fifth embodiment compares the newly acquired lengths of undefined time periods with the respective previously acquired lengths of undefined time periods. In addition, the transmission apparatus 100 may hold, from among the compared lengths of each of the undefined time periods, only the longer length of the relevant undefined time period. In addition, based on the held lengths of undefined time periods, the transmission apparatus 100 controls the lengths of protection time periods and transmission rates. From this, in the same way as the transmission apparatus 100 illustrated in FIG. 29, it is possible to uniformly control the lengths of protection time periods and transmission rates in conformity with the lengths of maximum undefined time periods, and it is possible to reduce a memory capacity taken to select the lengths of maximum undefined time periods.

The fifth embodiment may be implemented by being combined with the configuration of one of the above-mentioned embodiments. In the fifth embodiment, in such a manner as in, for example, the third embodiment, a configuration in which the mask protection time period is set using the signal change point mask pulse generation circuit may be adopted.

In the fifth embodiment, in such a manner as in, for example, the fourth embodiment, a configuration in which the operation mode setting circuit 302 and the undefined area measurement circuit 303 are included not in the receiving end circuit 2211 but in one of the transmitting end circuits 2221 may be adopted. In this case, for example, a configuration in which the measurement result storage circuit 2301 and the measurement result selection circuit 2302 illustrated in FIG. 23 or FIG. 29 or the measurement result selection storage circuit 3001 illustrated in FIG. 30 is included in the relevant transmitting end circuit 2221 may be adopted.

While the configuration of the many-to-one bus connection is described in the fifth embodiment, the configuration of a many-to-many bus connection in which, for example, the second to fourth embodiments are combined with the fifth embodiment may be adopted. In this case, the undefined time periods Tr and Tf change depending on a combination of connection states of transmitting end circuits and receiving end circuits, a transmitting end circuit to transmit a signal, and a receiving end circuit to receive the signal. In response to this, the transmission apparatus 100 measures the undefined time periods Tr and Tf for each combination of, for example, a transmitting end circuit that transmits a signal and a receiving end circuit that receives the signal.

In addition, in a case where a transmitting end circuit transmits a signal to a receiving end circuit, the transmission apparatus 100 controls the lengths of protection time periods and a transmission rate, based on measurement results of the undefined time periods Tr and Tf corresponding to the combination of the relevant transmitting end circuit and the relevant receiving end circuit. Alternatively, in a case where a transmitting end circuit transmits a signal to a receiving end circuit, the transmission apparatus 100 may control the lengths of protection time periods and a transmission rate, based on measurement results of maximum lengths out of measurement results of the undefined time periods Tr and Tf measured for individual combinations of transmitting end circuits and receiving end circuits.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A control apparatus that controls one or more first communication apparatuses connectable to communication apparatuses via a shared signal line and one or more second communication apparatuses configured to be coupled to the shared signal line and to identify a logic level of a signal received via the shared signal line, the control apparatus comprising:
   a memory; and
   a processor coupled to the memory and configured to:
      acquire, from one of the one or more second communication apparatuses, a length of an undefined time period during which a level of the signal is undefined;
      determine, based on the length of the undefined time period, a length of a protection time period indicating a time period during which a logic level of the signal received by the second communication apparatus is maintained at a same level; and
      determine, based on the length of the protection time period, a rate of a signal transmitted to one of the one or more second communication apparatuses by one of the one or more first communication apparatuses.

2. The control apparatus according to claim 1, wherein the processor is configured to acquire, in a case where a connection of one of the one or more first communication apparatuses is detected, the length of the undefined time period after the connection.

3. The control apparatus according to claim 1, wherein the processor is configured to acquire, in a case where a disconnection of a communication apparatus from one of the one or more first communication apparatuses is detected, the length of the undefined time period after the disconnection, and
the second communication apparatus is a communication apparatus different from the communication apparatus disconnected from one of the one or more first communication apparatuses.

4. The control apparatus according to claim 1, wherein one of the one or more second communication apparatuses is a communication apparatus whose transmission distance from the first communication apparatuses on the shared signal line is a minimum and that is included in communication apparatuses connected to the first communication apparatuses.

5. The control apparatus according to claim 1, wherein the processor is configured to:
   acquire the length of the undefined time period for each of other communication apparatuses included in the one or more second communication apparatuses;
   determine the length of the protection time period, based on the length of the undefined time period acquired from one of the one or more second communication apparatuses and a maximum length out of the lengths of the undefined time period acquired from the other communication apparatuses included in the one or more second communication apparatuses; and
   determine, based on the length of the protection time period, the rate of the signal transmitted to the one or more second communication apparatuses by one of the one or more first communication apparatuses.

6. The control apparatus according to claim 1, wherein the processor is configured to:
   acquire two or more measurement results of the length of the undefined time period;
   determine the length of the protection time period, based on a maximum length out of the lengths of the undefined time period indicated by the acquired measurement results; and
   determine, based on the length of the protection time period, the rate of the signal transmitted to one of the one or more second communication apparatuses by one of the one or more first communication apparatuses.

7. The control apparatus according to claim 1, wherein the processor is configured to:
   acquire the length of the undefined time period for each of other communication apparatuses included in the one or more first communication apparatuses connected to the shared signal line;
   determine the length of the protection time period, based on the length of the undefined time period acquired from one of the one or more first communication apparatuses and a length of an undefined time period for a communication apparatus that transmits a signal to one of the one or more second communication apparatuses, the latter length of the undefined time period being included in the lengths of the undefined time period acquired from the other communication apparatuses included in the one or more first communication apparatuses; and determine, in accordance with the length of the protection time period based on a length of an undefined time period for the communication apparatus that transmits the signal to one of the one or more second communication apparatuses, a rate of the signal transmitted to one of the one or more second communication apparatuses by the communication apparatus.

8. The control apparatus according to claim 1, wherein the processor is configured to:
   acquire the length of the undefined time period for each of other communication apparatuses included in the one or more first communication apparatuses connected to the shared signal line;
   determine the length of the protection time period, based on the length of the undefined time period acquired from one of the one or more first communication apparatuses and a maximum length out of the lengths of the undefined time period acquired from the other communication apparatuses included in the one or more first communication apparatuses; and
   determine, in accordance with the length of the protection time period based on a length of an undefined time period for a communication apparatus that transmits a signal to one of the one or more second communication apparatuses, a rate of the signal transmitted to one of the one or more second communication apparatuses by the communication apparatus.

9. The control apparatus according to claim 1,
   wherein the undefined time period is a time period during which a signal received by each of the one or more second communication apparatuses does not become a constant level even though the one of the one or more first communication apparatus transmits a signal of a constant level.

10. An electronic device, comprising:
    one or more first communication apparatuses connectable to communication apparatuses via a shared signal line;
    one or more second communication apparatuses configured to be connected to the shared signal line and to identify a logic level of a signal received via the shared signal line;
    a control apparatus configured to control the one or more first communication apparatuses and the one or more second communication apparatuses,
    wherein the control apparatus includes:
      a memory; and
      a processor coupled to the memory and configured to:
        acquire, from one of the one or more second communication apparatuses, a length of an undefined time period during which a level of the signal is undefined;
        determine, based on the length of the undefined time period, a length of a protection time period indicating a time period during which a logic level of the signal received by the second communication apparatus is maintained at a same level; and
        determine, based on the length of the protection time period, a rate of a signal transmitted to one of the one or more second communication apparatuses by one of the one or more first communication apparatuses.

11. A control method executed by a control apparatus that controls one or more first communication apparatuses connectable to communication apparatuses via a shared signal line and one or more second communication apparatuses configured to be coupled to the shared signal line and to identify a logic level of a signal received via the shared signal line, the control method comprising:
    acquiring, from one of the one or more second communication apparatuses, a length of an undefined time period during which a level of the signal is undefined;
    determining, based on the length of the undefined time period, a length of a protection time period indicating a time period during which a logic level of the signal received by the second communication apparatus is maintained at a same level; and
    determining, based on the length of the protection time period, a rate of a signal transmitted to one of the one or more second communication apparatuses by one of the one or more first communication apparatuses.

* * * * *